US005475454A

United States Patent [19]
Ezawa

[11] Patent Number: 5,475,454
[45] Date of Patent: Dec. 12, 1995

[54] FILM MAGAZINE AND CAMERA

[75] Inventor: Akira Ezawa, Shim, Japan

[73] Assignee: Nikon Corporation, Tokyo, Japan

[21] Appl. No.: 344,607

[22] Filed: Nov. 18, 1994

Related U.S. Application Data

[63] Continuation of Ser. No. 728,208, Jul. 10, 1991, abandoned, which is a continuation-in-part of Ser. No. 652,135, Feb. 7, 1991, abandoned.

[30] Foreign Application Priority Data

| Feb. 9, 1990 | [JP] | Japan | 2-030508 |
| Apr. 2, 1990 | [JP] | Japan | 2-087860 |
| Apr. 2, 1990 | [JP] | Japan | 2-087861 |
| Jul. 16, 1990 | [JP] | Japan | 2-185415 |

[51] Int. Cl.⁶ ............................................. G03B 7/00
[52] U.S. Cl. .................................... 354/21; 354/275
[58] Field of Search ............................ 354/21, 275, 212, 354/289.1

[56] References Cited

U.S. PATENT DOCUMENTS

| 4,338,015 | 7/1982 | Holmes | 354/275 |
| 4,482,232 | 11/1984 | Engelsmann et al. | 354/275 |
| 4,678,300 | 7/1987 | Beach | 354/21 |
| 4,768,300 | 9/1988 | Rutili | 40/546 |
| 4,832,275 | 5/1989 | Robertson | 242/71.1 |
| 4,860,037 | 8/1989 | Harvey | 354/21 |
| 4,864,332 | 9/1989 | Harvey | 354/21 |
| 4,878,075 | 10/1989 | Cannon | 354/173.1 |
| 4,887,110 | 12/1989 | Harvey | 354/275 |
| 4,965,600 | 10/1990 | Smart et al. | 354/21 |
| 4,994,828 | 2/1991 | Smart | 354/21 |
| 5,032,854 | 7/1991 | Smart et al. | 354/21 |
| 5,083,721 | 1/1992 | Okutsu et al. | 354/275 |
| 5,106,030 | 4/1992 | Pagano et al. | 354/275 |
| 5,220,371 | 6/1993 | Tanii et al. | 354/275 |

FOREIGN PATENT DOCUMENTS 3210882 10/1982 Germany .
3-179434 6/1991 Japan .

Primary Examiner—David M. Gray
Attorney, Agent, or Firm—Shapiro and Shapiro

[57] ABSTRACT

A film magazine comprises an output unit for outputting "unused" information when built-in film is unused or "used" information when built-in film is used, and a display unit for displaying use information based on the information sent from the output unit.

79 Claims, 31 Drawing Sheets

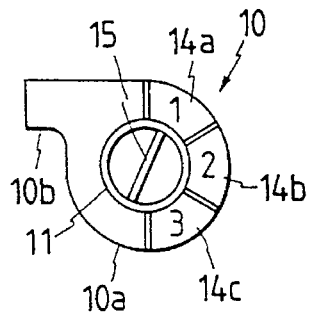
FIG. 1A
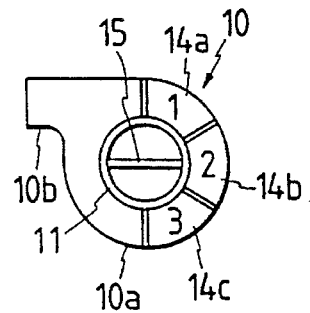
FIG. 1B
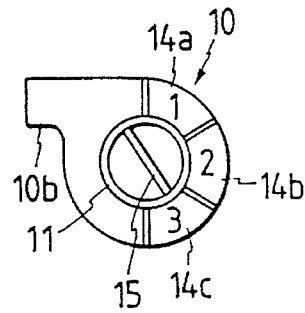
FIG. 1C
FIG. 2
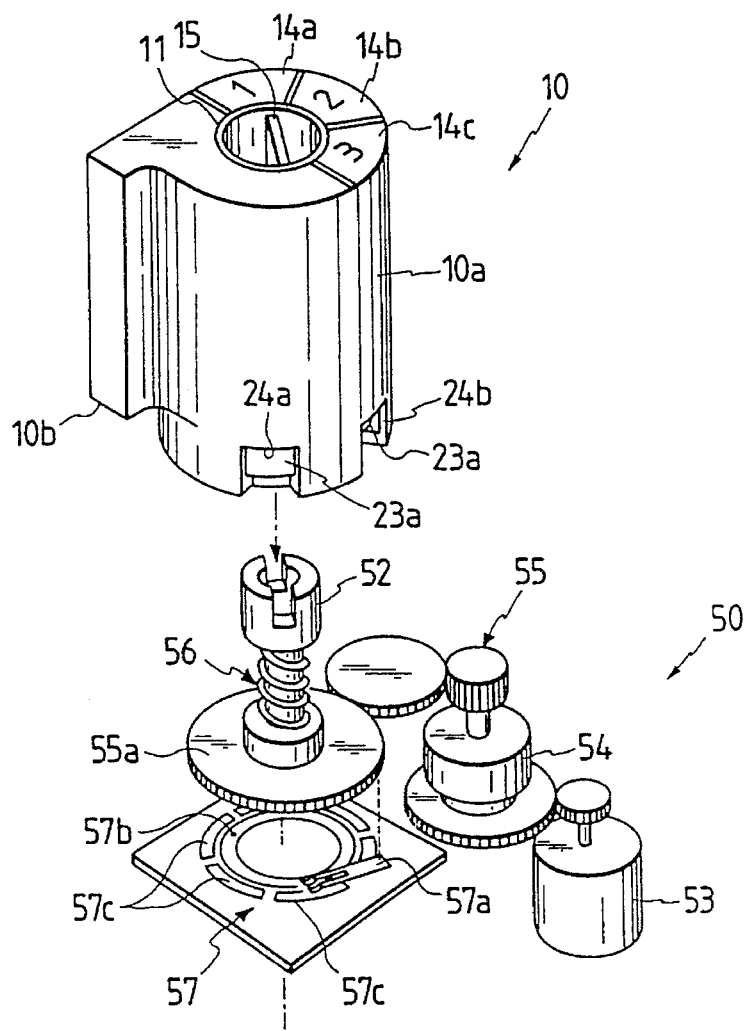

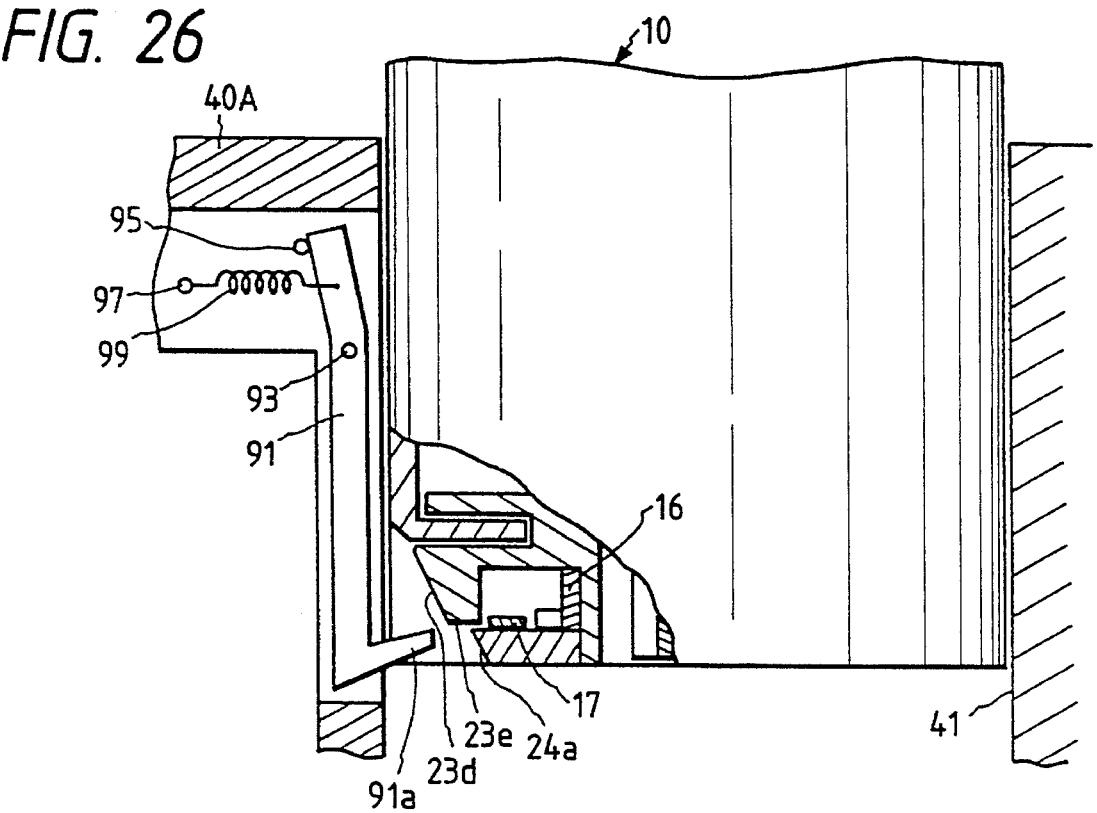
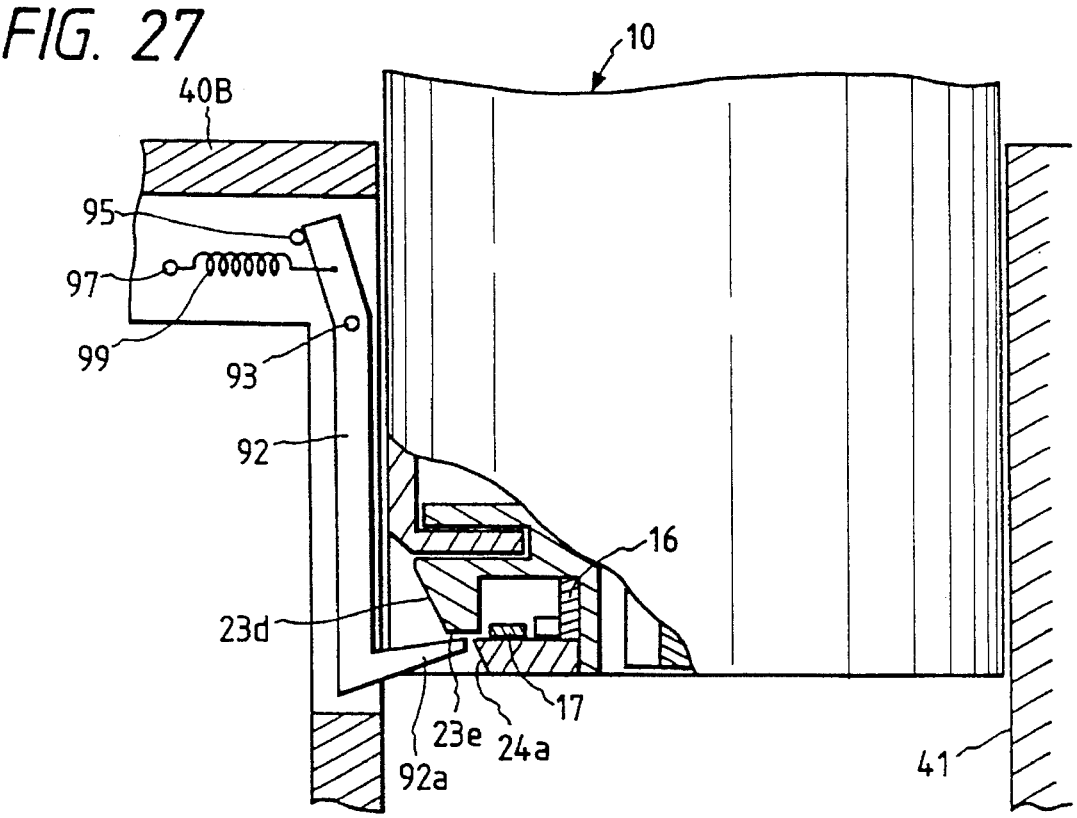

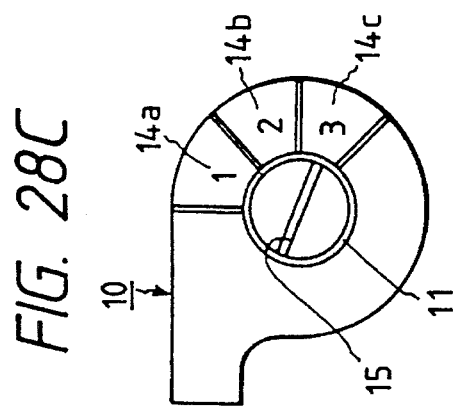
FIG. 28A  FIG. 28B  FIG. 28C
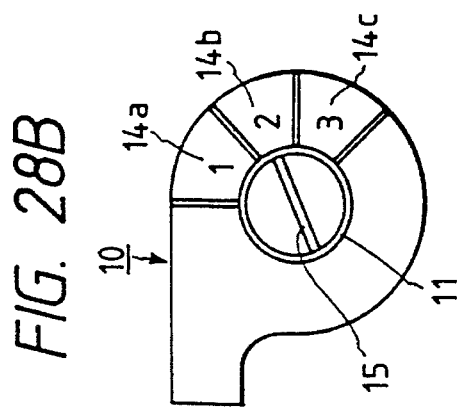
FIG. 31A  FIG. 31B  FIG. 31C
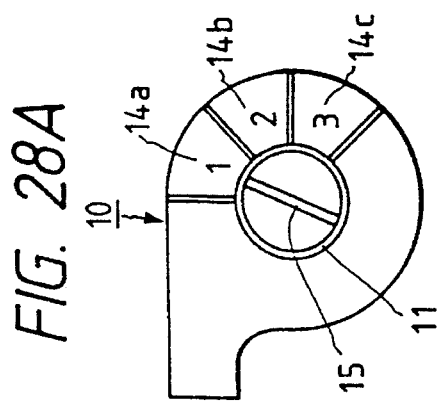

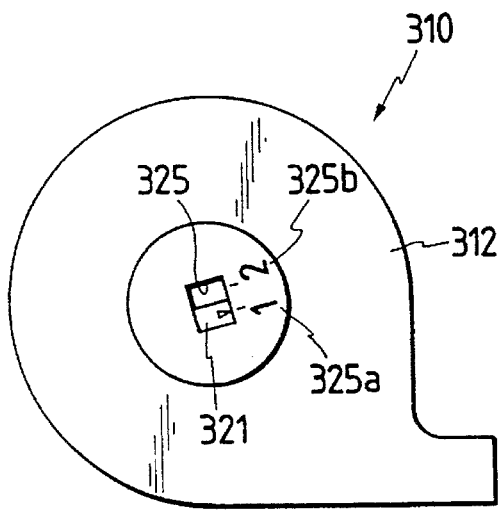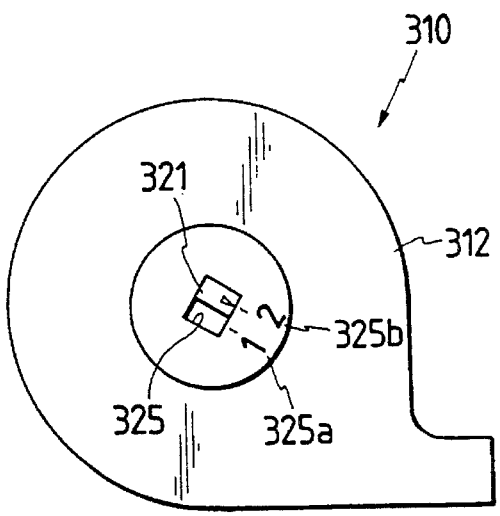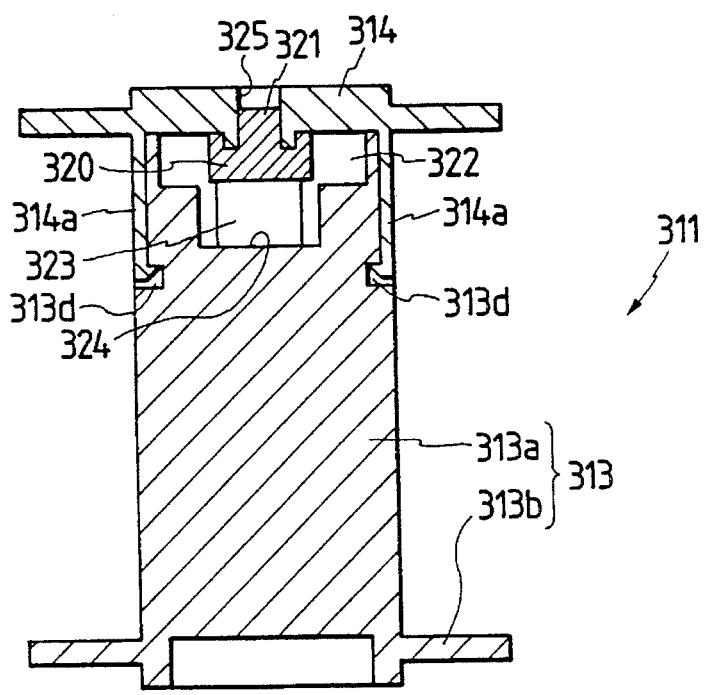

FILM MAGAZINE AND CAMERA

CROSS-REFERENCE TO RELATED APPLICATIONS

This is a continuation of application Ser. No. 07/728,208 filed Jul. 10, 1991, now abandoned, which is a continuation-in-part of application Ser. No. 07/652,135 filed Feb. 7, 1991, now abandoned.

Reference is also made to commonly assigned U.S. Pat. No. 5,159,365 issued Oct. 27, 1992, entitled "Camera with Device for Identifying Used Film Magazine".

BACKGROUND OF THE INVENTION

1. Field of the Invention

The present invention relates to a film magazine which contains photographic film wound around a spool in the form of a roll and a camera to which the film magazine is attached. More particularly, this invention is concerned with a film magazine having a function which indicates the film use status distinguishing whether the film is unused, used partially and extracted in the middle, or used up fully (exposed), and a camera to which the film magazine is attached.

2. Related Background Art

In general, photographic film is handled in a state in which the film is contained in a magazine or a simple container having a shading function, and well-protected from being exposed when it is attached to or extracted from a camera, kept in storage, or carried here and there.

For the film magazine, it must be identified whether film contained in the magazine is unused or used up (exposed). For a typical 35-mm film magazine, by checking whether the film end comes out of a slot of the magazine, it is determined whether film contained inside is unused or exposed. That is to say, when film is rewound at completion of exposure, the film and the film end inclusive are usually wound up into the magazine. By checking whether the film end is wound up or not, it can be distinguished whether the film is unused or exposed.

However, when a film use status is distinguished by checking whether the film end comes out of the magazine as mentioned above, if the film is rewound at completion of photography, the film end must be wound up inside the magazine without fail. This operation, however, lacks for certainty. Therefore, this method cannot be said to be reliable. In particular, assuming that the film end comes out of a magazine for some reason, if the film is extracted from a camera and stored temporarily, the film may be recognized as an unused film mistakenly. If such a magazine is attached to the camera, since photography can be done, a problem of a double exposure occurs.

Some photographers do not expose film attached to a camera up to the last frame, but rewind it in the middle Of feeding and extract it from the camera. Then, the film is re-attached to the camera and the remaining portion of the film is exposed. During the rewinding, a special precaution is needed so as not to wind the film end into the magazine. In this case, the film is always stored with its end out of the magazine. The magazine cannot be differentiated from a new one.

Therefore, some photographers write the use status of film in a magazine down on the outer surface of the magazine or a housing case. This is a nuisance. Some measure must be taken to solve these problems.

A magazine for containing film is proposed, for example, in the specification of the U.S. Pat. Nos. 4,832,275 or 4,482,232, wherein the film end is always drawn into the magazine when the magazine is unattached. In such a magazine, a distinguishing method using the film end cannot be adopted for the foregoing 35-mm film magazine. Even if exposed film is attached to a camera, photography can be performed. This is accompanied with the aforesaid problem of a double exposure. In this type of a magazine, some measure must be taken to allow a photographer to check whether film is unused, extracted in the middle, or used lap fully (exposed).

SUMMARY OF THE INVENTION

The object of the present invention is to provide a film magazine which indicates whether film is unused or used up.

Other object of the invention is to provide a camera for outputting information to the film magazine, whereby when an unused film magazine is attached and exposed, the film magazine will be treated as a used one thereafter.

Another object of the invention is to provide a camera for inhibiting attachment of a used film magazine.

A film magazine relating to the present invention is provided with at least two display portions for displaying a use status of film in the magazine on the outer surface of the magazine, and includes a pointing means which rotates according to the movement of a spool around which film is wound, is positioned at one of the display portions depending on the rotation stop position of the spool, and then indicates the film use status. In addition, a means is selectively provided to restrain the shift of a position to which the pointing means points except when the magazine is attached to a camera. A camera relating to the invention to which the film magazine is attached comprises a spool drive unit for rotating a spool of the magazine, and a controller for controlling the spool rotation stop position according to the use status of film.

A film magazine relating to the invention includes a fitting means as part of the housing of the magazine which assumes either of two states of fitted or unfitted, thus permitting or inhibiting attachment of the magazine to a camera. A camera relating to the invention comprises a means for changing the fitting means of the film magazine to either the fitted or unfitted state depending on the use status of film, and a means for permitting attachment of the magazine to be a magazine chamber when the fitting means is in unfitted state or inhibiting the attachment when the fitting means is in fitted state.

According to the present invention, a use status of a film in a magazine, that is; "unused," "extracted in the middle," or "used up (exposed)," can be indicated easily using a pointing means on the outer surface of the film magazine which is stopped selectively at a given rotating position by a spool drive unit in a camera according to the movement of a spool, and at least two display portions to which the pointing means selectively points.

According to the invention, a fitting means installed as part of the housing of a magazine is changed to the fitted or unfitted state depending on whether the film use status indicates "unused," "extracted in the middle," or "used up," thus inhibiting reattachment of a used film magazine when a film is attached to a magazine chamber in a camera.

A film magazine relating to the invention comprises a displacement member for indicating a film use status which is displaceable to at least two positions within a magazine and indicates the displaced state externally of the magazine, and a means for displacing the displacement means from one position to another position in association with the rotation of a spool when the magazine is attached. In addition, a means is selectively provided to restrain a positional shift of the displacement member within the magazine, and stops and holds the displacement member at either of the displacement positions except when the film magazine is attached to the camera. The camera relating to the invention to which the foregoing film magazine is attached, includes a means which releases the fitted state of the displacement member in the magazine and puts the displacement member into a displaceable state along with the rotation of the spool.

A film magazine relating to the invention includes a displacement member which can displace a fitting unit for fitting a member of a camera to either the fitted or unfitted state within the magazine depending on the use state of film. When the fitting unit is unfitted to the member of the camera, it is permitted to attach the magazine to the camera. When the fitting unit is fitted, it is inhibited to attach the magazine to the camera. In addition, the foregoing displacement member is selectively provided with a display portion for displaying a film use status externally of the magazine depending on the displaced position within the magazine. The camera relating to the invention to which the aforesaid film magazine is attached, includes a means which permits attachment of the; magazine to a magazine chamber when the fitting portion of the displacement member which displaces within the magazine is in unfitted state, or inhibits the attachment when the displacement member is in fitted state.

According to the present invention, a use status of film in a magazine, that is; "unused" or "used up (exposed)," can be indicated selectively, properly, and accurately by displacing a displacement member inside a film magazine along with the movement of a spool when the film magazine is attached to a camera. Using a means for holding the displacement member at each displacement position, and a means for releasing the displacement member from the fitted state at a time of attachment to the camera and putting the member into a displaceable state, the display function for distinguishing a film use status using the displacement member can be optimized without interrupting a film feed or rewind operation.

According to the invention, owing to a fitting unit provided in a displacement member which displaces within a magazine depending on a film use status, and a means in a camera which can selectively inhibit attachment of the magazine depending on whether the fitting unit is in fitted or unfitted state, it is permitted to attach an unused film magazine, but it is inhibited definitely to re-attach a used film magazine.

In a film magazine relating to the invention, a displacement member which senses that film has been wound up around a spool and displaces from the first position to the second position is displaceable as part of the spool. Also included is a display portion which displays a use status of a film by indicating the displaced state of the displacement member at the first or second position externally of the magazine. In addition, an inhibition means is selectively provided to elastically stop the movement of the displacement member within the magazine and prevent the displacement member from making a shift at any displacement position with an external force other than a force for winding a film around a spool.

According to the invention, a displacement member is displaced within a magazine from the first to second position by winding up film around a spool on an early state of winding or rewinding, and the displaced state is displayed externally using a display portion. Thus, a use status of film in the magazine, that is; "unused" or "used up (exposed)," can be distinguishably displayed.

BRIEF DESCRIPTION OF THE DRAWINGS

FIGS. 1A, 1B and 1C are schematic plan views for explaining a film use status display function in an embodiment of a film magazine relating to the invention. FIG. 2 is a schematic perspective view showing the relationship between the film magazine and a film rewinding mechanism of a camera. FIGS. 13, 4A and 14B are a schematic perspective view showing a modified embodiment of the fitting structure for fitting a fork to a spool, and diagrams for explaining the fitted state.

FIGS. 26 and 27 are main cross sectional views showing a shape and an operation of inhibiting means for a magazine. FIGS. 28A, 28B and 28C are schematic plan views of the fourth embodiment showing a use state of a magazine. FIGS. 31A, 31B and 31C are schematic plan views of the fifth embodiment showing a use state of a magazine.

FIGS. 49A and 49B are end views of the magazine, showing the display state of the display portion depending on the movement of the displacement member within the spool. FIG. 50 shows a longitudinal section with respect to the IV—IV line of the assembled state of FIG. 47.

DESCRIPTION OF THE PREFERRED EMBODIMENTS

Figure 3:
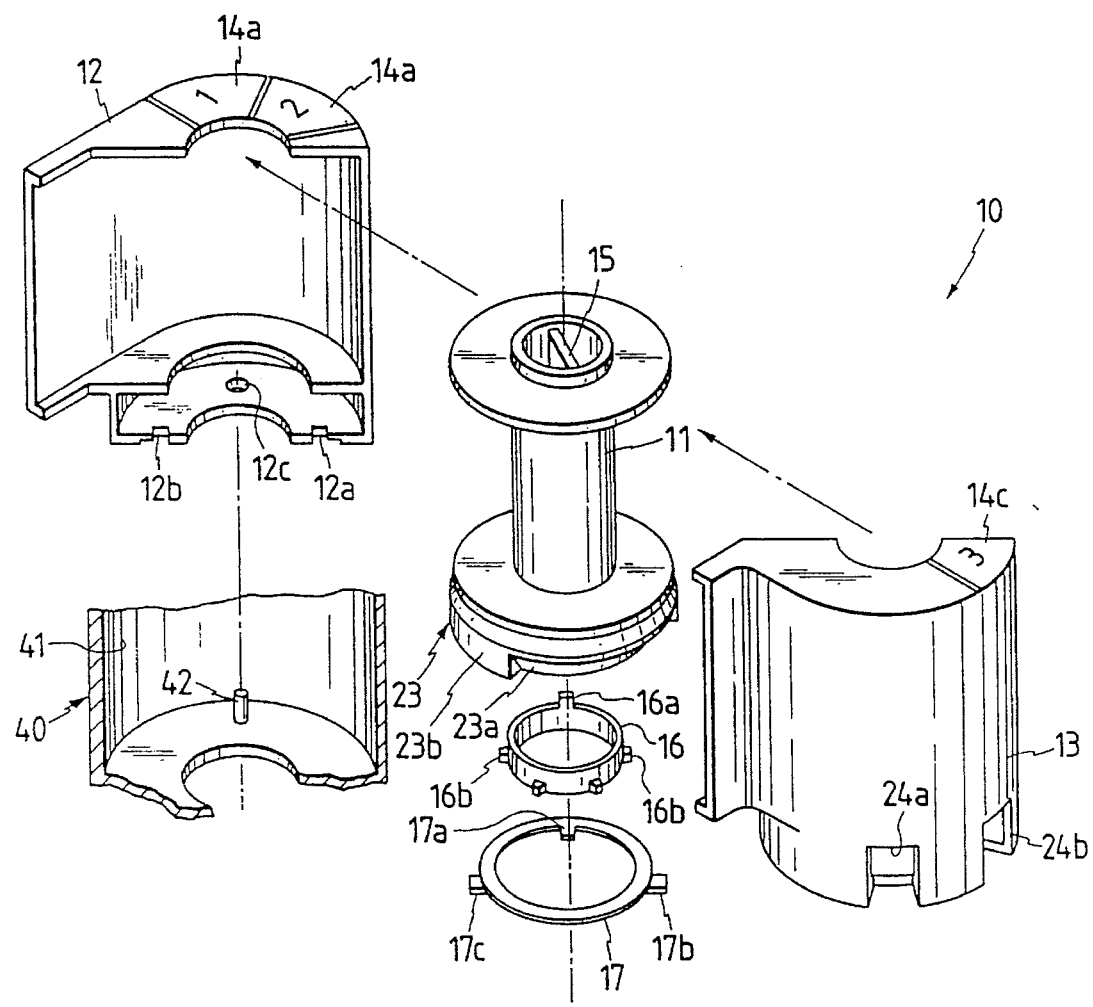
FIG. 3 is a schematic exploded perspective view showing the film magazine and part of a magazine chamber in a camera.

FIGS. 1A, 1B, 1C, 11A and 11B show an embodiment of a film magazine relating to the invention and a camera to which the film magazine is attached. A film magazine 10 employed in this embodiment is disclosed, for example, in the specification of the U.S. Pat. No. 4,832,275, wherein the film end is caught in the magazine 10 from the beginning. When a spool 11 rotates, film end is fed and rewound. The magazine 10 consists of a cylindrical main body 10a and a lip-type film feeder 10b protruding as part of the main body 10a. As shown in FIG. 3, the magazine 10 consists of a pair of cases 12 and 13 or two-divided portions. Internally, a storage space for film wound around the spool 11 (not illustrated) is formed and a film feed mechanism (not illustrated) is built in. The details are omitted.

According to the invention, in the aforesaid film magazine, as apparent from FIGS. 1 and 3, about half the circumference of the top end surface is divided into three portions. The portions acts as multiple display portions for displaying use statuses of a film in the magazine 10 (three portions in this embodiment) and is printed with display symbols of 14a, 14b and 14c or "1", "2" and "3". A key 15 on the top end of the spool axis is used as a pointing means which indicates a film use status by pointing to any of the display symbols 14a, 14b and 14c depending on the rotation stop position of the spool 11. The key 15, and the display symbols 14a, 14b and 14c are used in combination to indicate a use status of a film, that is; "unused (unexposed)," "extracted in the middle (partially used)," and "used up fully (exposed)."

The aforesaid display symbols 14a, 14b and 14c represent a new unused (unexposed) film, a film which is exposed more by more than one frame but not up to the last frame, and then extracted from a camera, and a used (exposed) film which is exposed up to the last frame. In FIGS. 1A, 1B and 1C, the symbols are pointed to respectively. In addition to numbers 1, 2 and 3, characters of "unused," "middle," and "used up" or other symbols can be used as the display symbols.

Among the display symbols, in status 2 or an "extracted in the middle" status, the magazine 10 may be re-attached to the camera and photography may be continued to expose the unexposed portion of the film. For this purpose, means for recording and storing information on the number of frames already exposed, and transferring it to the camera to which the magazine is re-attached are included in a camera 40A and the magazine 10. Specifically, a means for recording and reading information is included in the camera 40A, and various information recording media including EEPROM, RAM, or a magnetic storage are included in the magazine 10. A method used in an embodiment of the Japanese Patent Application No. 1-317805 may be applied.

However, the aforesaid configuration is not always necessary. If a camera 40B is of the simplified type, information recording mentioned above is not performed. When film is extracted in the middle, the film is not re-attached because this may cause a double exposure. Then, the film is developed. When this type of a camera is concerned, a display symbol 2 for an "extracted in the middle" status becomes unnecessary. Only two symbols will be enough.

The invention applies to two types of cameras 40A and 40B which are characterized by whether information recording can be done or not. According to the type, status display is performed. The camera 40A which can do information recording permits attachment to a magazine chamber 41 of the camera 40A in status 1 or 2, but inhibits the attachment in status 3. The camera 40B which cannot perform information recording, permits the attachment to the magazine chamber 41 only in status 1.

Figure 7:
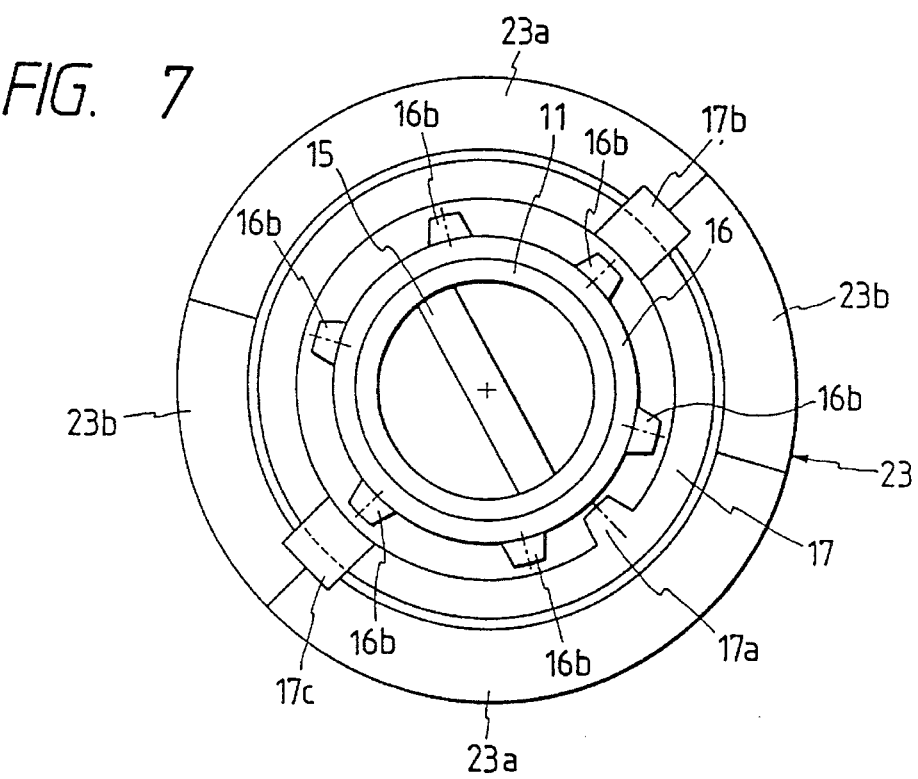

On the other hand, for the present invention, it is recommended to selectively install a means which restrains the shift of a position pointed to by a key 15 or a pointing means for showing a rotating position of a spool 11 when the magazine is not attached to a camera 40A or 40B. In the drawings, 16 represents a ring engaged with the bottom of the spool 11 in the lower chamber of a magazine 10. 16a is a protrusion which is fitted into a groove 11a formed in the lower part of the spool 11 and rotates the ring 16 and spool 11 as a unit. 17 is a stoppage ring made of spring material whose inner circumference is provided with a claw 17a which is selectively fitted to a stoppage protrusion 16b and arranged on the outer circumference of the ring 16. Hooks 17b and 17c are protruding from the outer circumference of the stoppage ring 17, and fitted into hook ditches 12a, 12b, 13a and 13b formed in the contact part in the lower part of the cases 12 and 13 constituting the magazine 10 as shown in FIG. 5. As apparent from FIG. 4, when the magazine is unattached to a camera, the claw 17a is positioned so that it may touch the stoppage protrusion 16b of the ring 16, thus restricting the rotation of the spool 11. In this state, as seen in FIG. 7, the stoppage ring 16 can rotate merely within an interval of stoppage protrusions 16b on the ring 16. When a rewinding completes, the movement of the spool 11 can be restricted within the interval whereby, the stop position of the spool 11i will not deviate from an area of display symbol 14a, 14b or 14c pointed by a key 15 on the spool 11l. Due to the rotation restriction, when the magazine is unattached, a position pointed at by the key 15 does not deviate, for example, from 1 to other position indicating 2 or 3.

Figure 4:
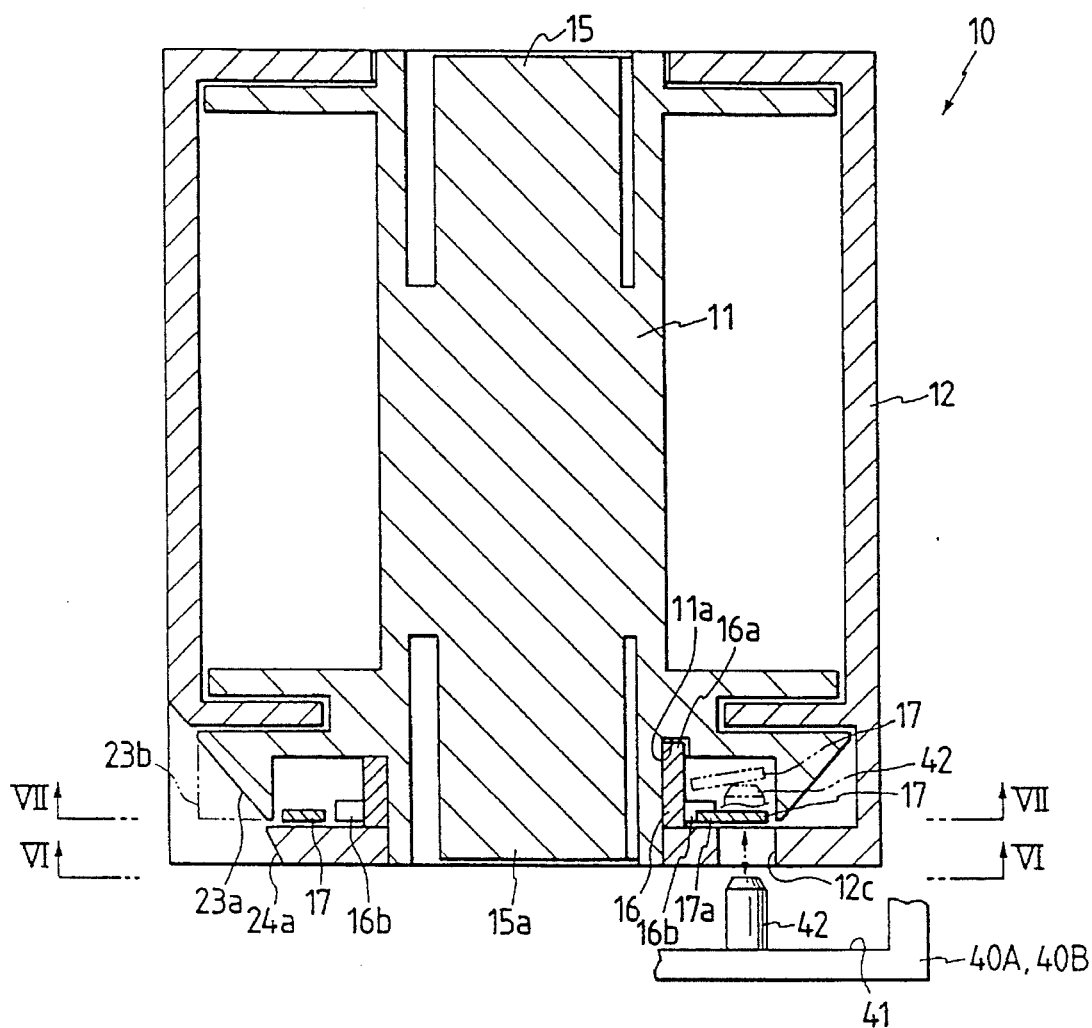
FIGS. 4 and 5 show a longitudinal section of the magazine and a cross section of the major components viewed from another direction (cross-sectional views with respect to the IV—IV line and V—V line of FIG. 6).
Figure 5:
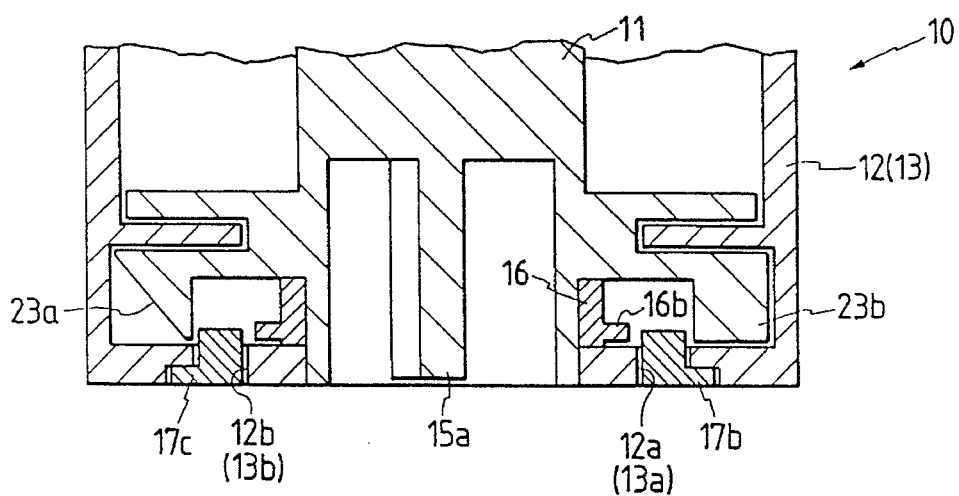

In the aforesaid configuration, when a magazine 10 is attached to a magazine chamber 41, a restriction release pin 42 protruding from the bottom of the magazine chamber 41, fits into a hole 12c of the magazine 10, and pushes up the stoppage ring 17 against the spring elasticity as shown with an imaginary line in FIG. 4, and holds the claw 17a at a position where the claw 17a will not touch a stoppage protrusion 16b. This enables the spool 11 to rotate freely. In this case, the stoppage ring 17 is securely stopped and held by cases 12 and 13, and will not cause a friction or load unfavorable for rotation of the spool 11.

Figure 8:
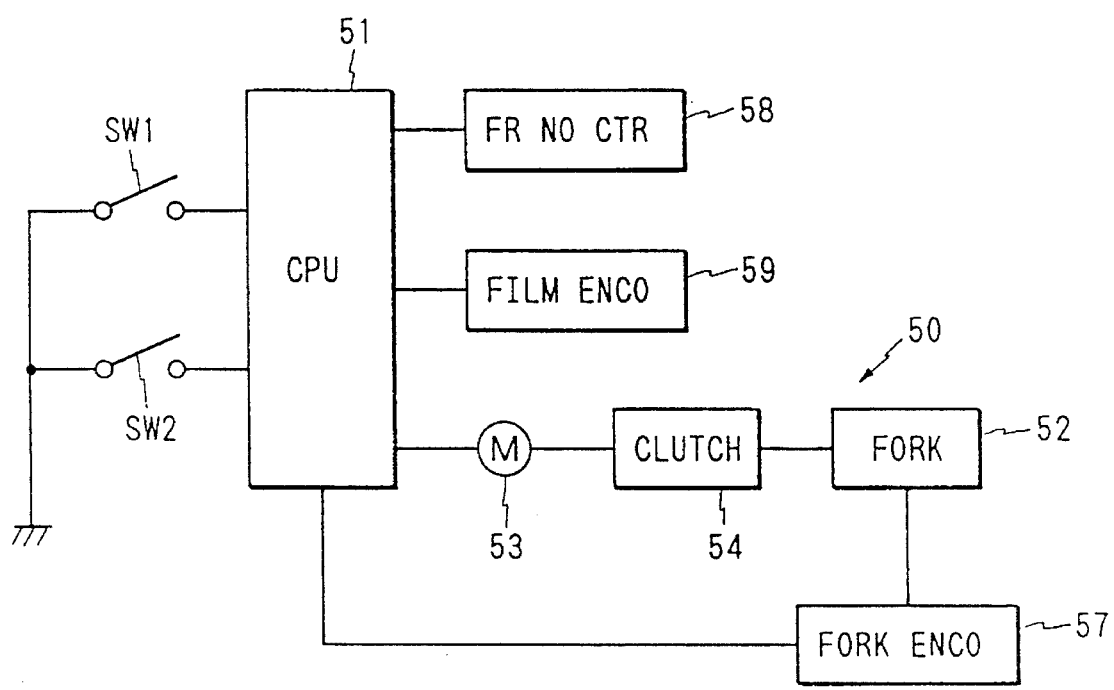
FIG. 8 is a block diagram showing a spool drive unit of a camera and a controller.

A camera 40A or 40B embodying the invention to which the aforesaid film magazine 10 is attached, as shown in FIGS. 2 and 8, comprises a spool drive unit 50 for rotating a spool 11 of a magazine 10 and a controller 51 for controlling the rotation stop position of the spool 11depending on a film use status. The configuration is detailed below. 52 in FIG. 2 is a fork. The fork 52 fits into a key 15a which is installed in the lower part of the spool 11 in correspondence with an upper key 15 or a pointing means and rotated unitedly with the upper key 15. The fork 52 receives the rotation of a film rewinding motor 53 via a reduction gear mechanism 55 having a clutch 54. Then, the fork 52 rotates the spool 11 in rewinding direction. 56 is a known fork withdrawal mechanism which absorbs a phase shift between the key 15a and fork 52 at a time of attachment of a magazine. The absorption continues until rotation starts, then the key 15a and fork 52 fit each other correctly. The interlock between the fork 52 and key 15a is released during rewinding.

The rotating position of the fork 52 is detected by a fork encoder 57 consisting of a brush 57a which rotates unitedly with a last gear (fork gear) 55a of the reduction gear mechanism 55, and a common pattern 57b and a segment pattern 57c formed on a board. In FIG. 8, SW1 is a release switch, and SW2, a middle rewind switch which is actuated to rewind film before the last frame is exposed. When the last frame is exposed, a tension at the end of film is, as already disclosed, detected during the next winding, and thereby rewinding is started automatically. 58 is a frame number counter which counts the number of frames exposed. 59 is a film encoder which detects the amount of film moved, which is used to feed film frame by frame. The information obtained by the above units is sent to an arithmetic and control circuit CPU. Based on the arithmetic result, the stop position of the fork 52 which is rotated by a motor 53 is controlled.

Figure 9:
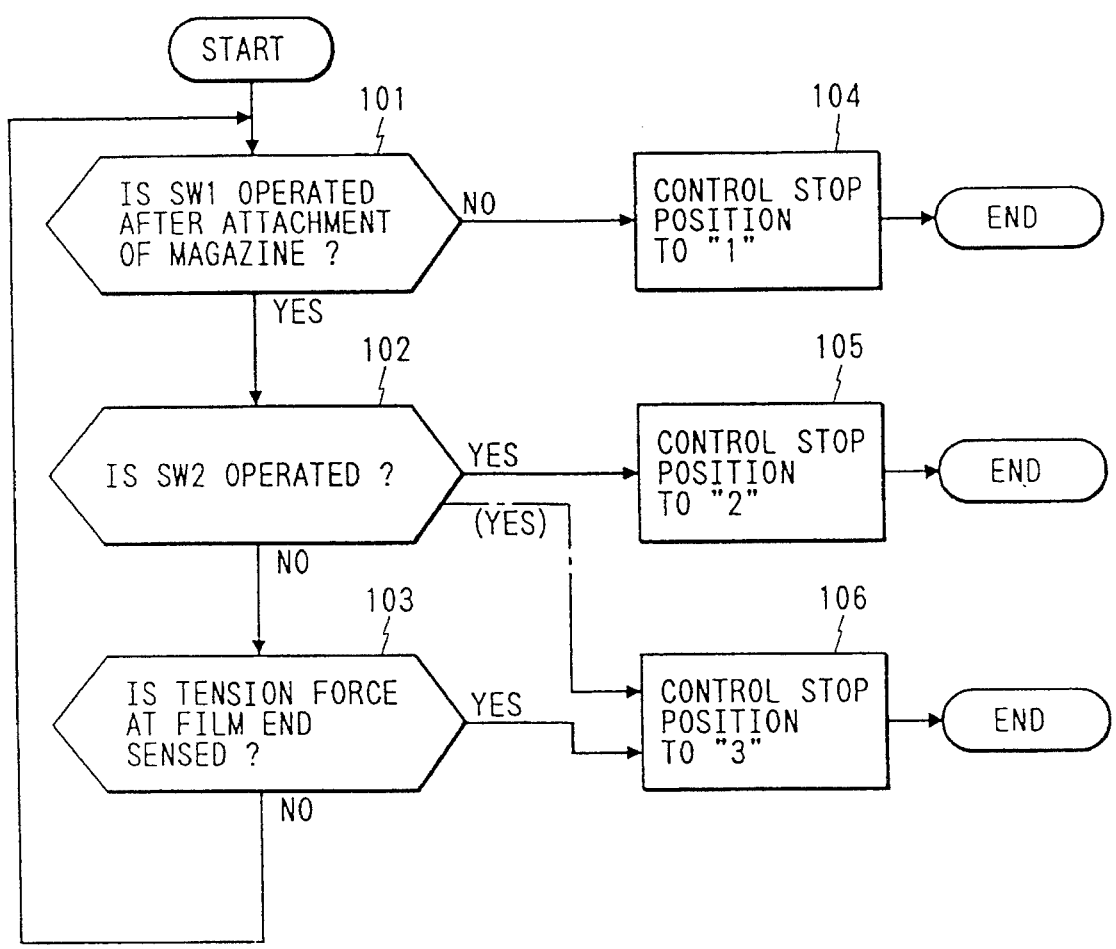
FIG. 9 is a flowchart showing the procedure of determining a film use status.
Figure 10:
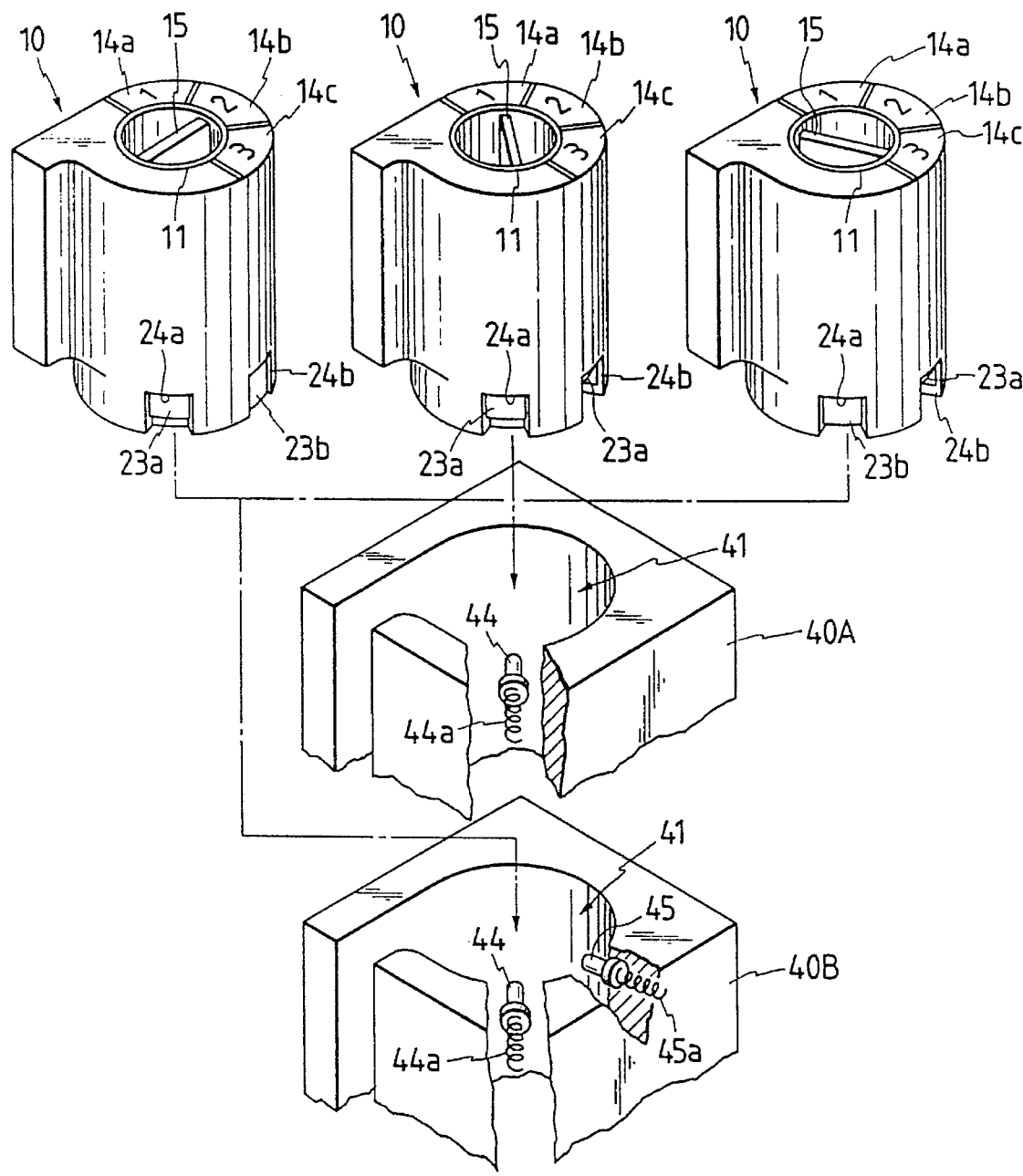
FIG. 10 is a schematic exploded perspective view showing the magazine in various states and attachment inhibition means for two types of cameras.

Then, in the aforesaid configuration, when winding completes, a controller 51 of a camera 40A determines the use status of film and controls a spool 11 to the corresponding position. FIG. 9 shows the procedure of determination. At a step 101, it is checked if a release switch SW1 is actuated after attachment of the magazine. If the switch SW1 is not actuated, control is passed to a step 104. Then, the stop position is set to 1. If the switch SW1 is actuated, control is passed to a step 102. Then, it is checked if a middle rewind switch SW2 is actuated. If it is determined in affirmative, control is passed to a step 105. The stop position of a key 15 or a pointing means is set to 2. If SW2 is not actuated, it is checked at a step 103 if the tension at the film end is detected. If it is determined in affirmative, the stop position is set to 3 at a step 106. If the tension is not detected, control is returned to the step 101. For a camera 40B which does not have an information recording means as mentioned previously, if it is determined at the step 102 that SW2 is actuated, control is passed to the step 106. Instead of the operation of the step 103, a Dx or other means may be used to read the number of film frames that can be exposed. Then, it may be checked if the number coincides with the value of a frame number counter 58.

The key 15 of the spool 11 can be controlled to stop within the generous angle of a display portion the spool 11 can stop as shown in FIG. 7. Each generous stop angle range on the spool is consistent with the corresponding angle on a pattern 57c of a fork encoder 57 shown in FIG. 2. When the spool 11 is stopped, a brush 57a indicates if the spool 11 is placed on a given pattern 57c. If the spool 11 goes beyond the specific range, the spool 11 may be rerotated.

Due to the aforesaid configuration, although the configuration is very simple, a use status of film in a magazine 10, that is; "unused," "extracted in the middle," or "used up (exposed)," or display symbol 1, 2 or 3, can be distinguished easily and accurately merely by monitoring the top end of the magazine 10 as shown in FIGS. 1A, 1B and 1C. This permits an adequate film management, and eliminates a problem that a used magazine 10 is mistakenly attached to a camera 40 and double exposed.

According to the invention, a fitting means (consisting of a slope 23a, a non-slope 23b, and windows 24aand 24b) which assumes either of two states of fitted or unfitted depending on a film use status to permit or inhibit attachment of a magazine 40 to a magazine chamber 41 of a camera. 40 is formed as part of the housing of a film magazine 10 (in this embodiment, in the side part of the bottom). The camera 40 to which the magazine 10 is attached comprises a means which changes the fitting means of the magazine 10 to the fitted or unfitted state depending on the film use status (in this embodiment, depending on the rotation of a spool 11 ), and a means ( attachment inhibition pins 44 and 45) for permitting attachment of the magazine 10 to the magazine chamber 41 when the fitting means is in unfitted state or inhibits the attachment when the fitting means is in fitted state.

The aforesaid configuration is described below in conjunction with FIGS. 6, 7, 10, 11A and 11B. On the bottom of a spool 11, a fitting area 23 consisting of slopes 23a and non-slopes 23b is formed having the angulation relationship as shown in FIG. 7. The slopes 23a or non-slopes 23b appear selectively from the first or second window 24a or 24b which are spaced by a given distance on the bottom side part of a case 13 constituting a magazine 10. The magazine 10 is inserted in an arrow direction in FIG. 10 and accommodated in a magazine chamber 41 of a camera 40A or 40B. In the magazine chamber 41 of the camera 40A, the first attachment inhibition pin 44 which is pressed by a spring 44a is protruding in a direction orthogonal to the magazine inserting direction from a part through which the first window 24a passes. Therein, the first attachment inhibition pin 44 can withdraw freely. In the camera 40B, the first and second attachment inhibition pins 44 and 45 which are pressed with springs 44a and 45a are protruding from parts through which the first and second windows 24a and 24b of the magazine 10 pass.

Figure 11A:
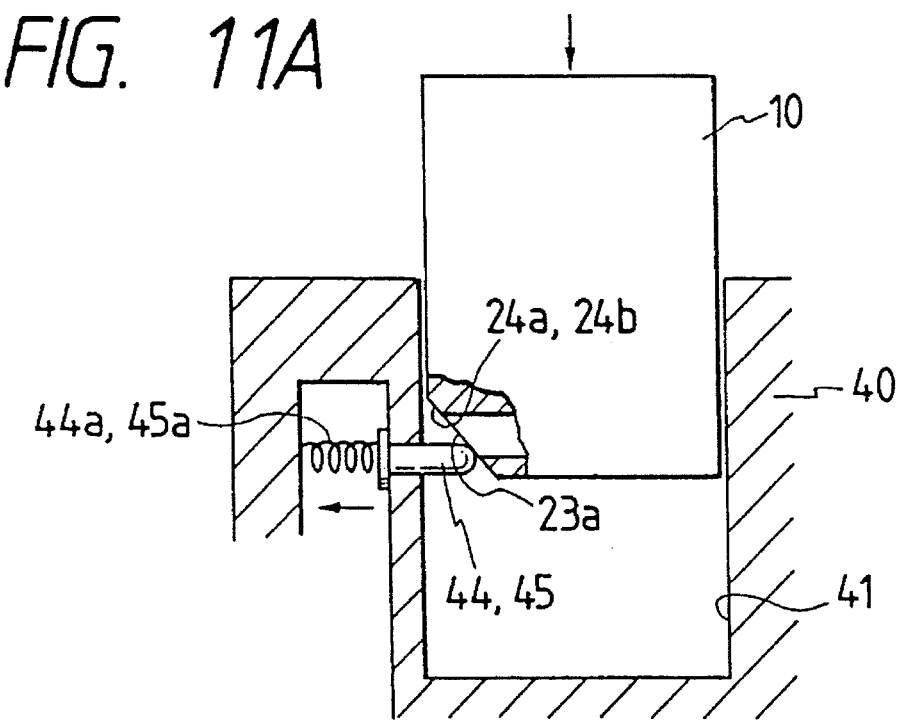
FIGS. 11A and 11B are schematic diagrams for explaining the operations of the attachment inhibition means.
Figure 11B:
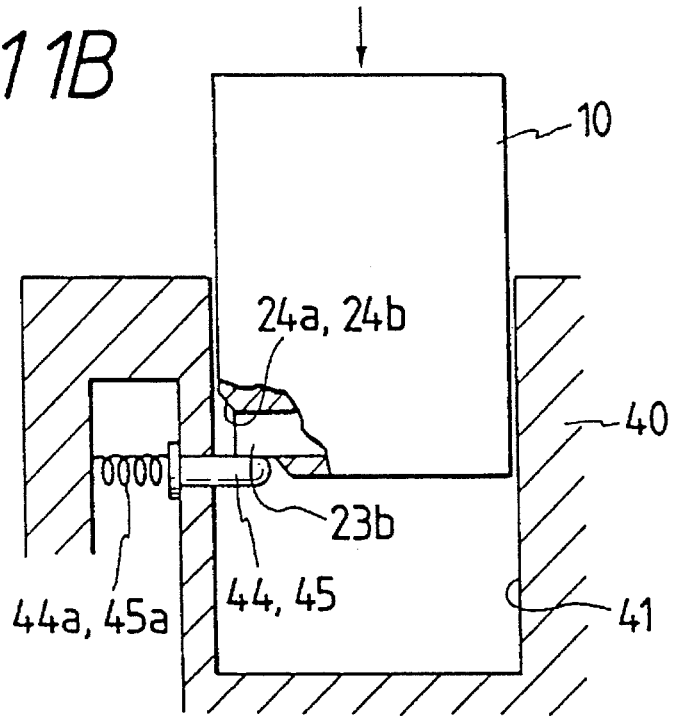

In the aforesaid configuration, as shown in FIGS. 11A and 11B, when the non-slopes 23b of the fitting area 23 are exposed from the window 24a and 24b, attachment is inhibited. When the slopes 23a appear, attachment is permitted. In this embodiment, in status 1, 2 or 3, the slopes 23a or non-slopes 23b are exposed from the windows 24a and 24b as shown in Table 1.

TABLE 1

| Status | Window 24a | Window 24b |
| --- | --- | --- |
| 1 | Slope 23a | Slope 23a |
| 2 | Slope 23a | Non-slope 23a |
| 3 | Non-slope 23b | Slope 23a |

Due to the aforesaid configuration, although the configuration is very simple, when a magazine is attached to a camera, depending on the film use status of "unused,"

"extracted in the middle," or "used up," a fitting means of the magazine can be changed selectively to a fitted or unfitted state. Thus, re-attachment of a used film magazine can be inhibited definitely and a double exposure can be prevented without fail.

In the embodiment described above, a fork 52 and a key 15a of a spool 11 are fitted or aligned each other by a bar-shape fitting as conventionally. Therefore, the key 15a fits to the fork 52 at every 180° rotation. It cannot be specified at which angle the key 15a is fitted in position on the fork 52 provided in a camera. Therefore, to stop a magazine 10 selectively at three positions in rotating direction, a 180° range instead of a 360° range is divided into three portions and set as display portions.

Figure 12:
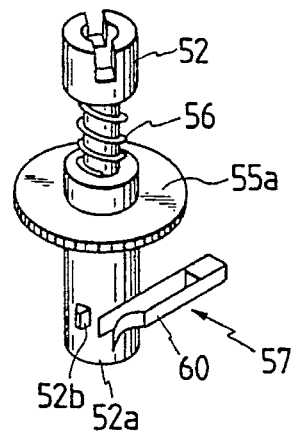
FIG. 12 is a schematic perspective view showing a simplified and modified embodiment of a fork encoder.

In FIG. 12, the fork encoder 57 in the aforesaid embodiment is simplified. For a camera 40B, a magazine 10 which has once been attached to the camera is unconditionally controlled to status 3. In this case, when rewinding completes, a spool 11 is always controlled to status 3. Therefore, the encoder 57 is provided with a protrusion 52b protruding from part of a fork axis 52a and a switch part 60 which is turned ON/OFF by the protrusion 52b. Thus, when the spool 11 is set at positions 3, the switch part 60 is turned ON. With the ON signal, the rotating position of the spool 11 is controlled. Thus, the fork encoder 57 can be greatly simplified.

Figure 13:
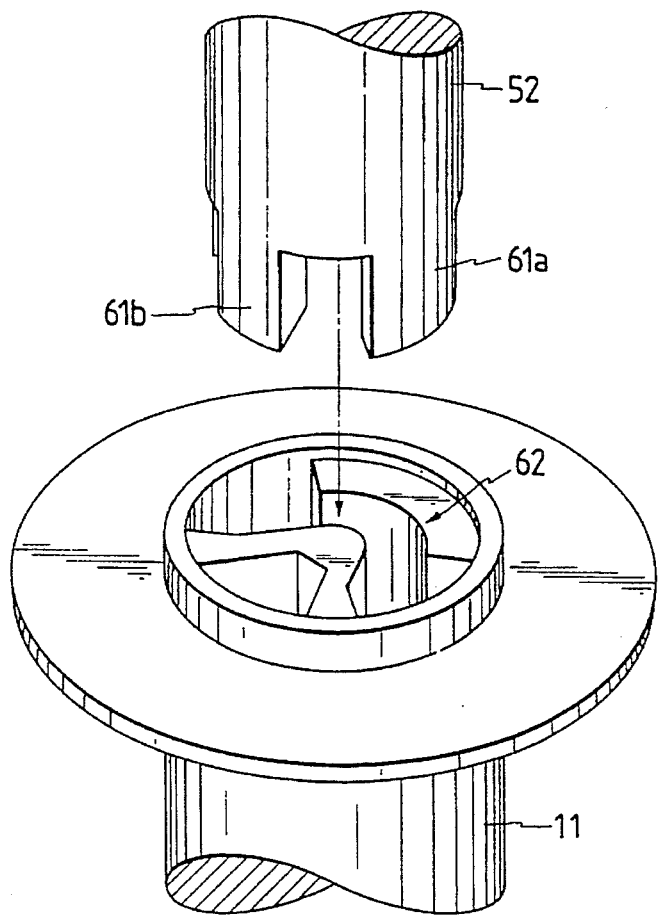
Figure 14A:
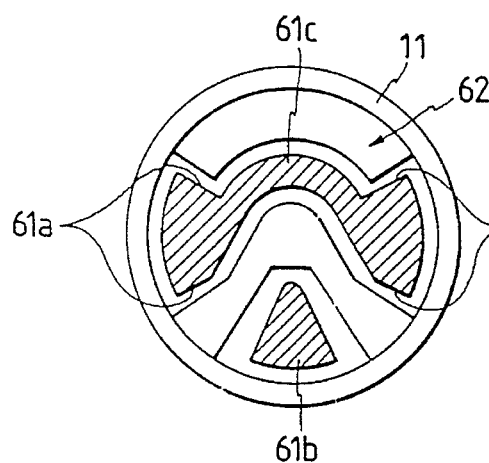
Figure 14B:
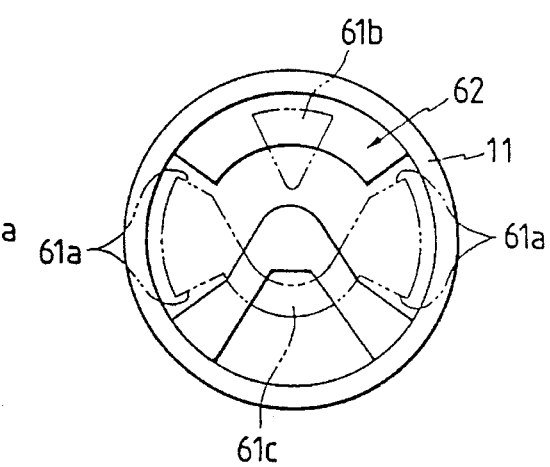

FIGS. 13, 14A and 14B show a modified embodiment of the fitting portions of a fork 52 and a spool 11. The fitting portion of the fork 52 consists of a rotation transmitting section 61a and an error fitting prevention sections 61b and 61c. The fitting portion 62 of the spool 11 has a shape to be fitted to the fitting portion of the fork 52. The fitting portions fit each other once through a 360° rotation. With this configuration, unlike the previous embodiment (FIGS. 1A to 1C) in which a 180° range is divided into three areas of 1, 2 and 3, a 360° range is divided into three areas. Therefore, the three display portions measure wider respectively. Compared with the previous embodiment, the stop accuracy of the spool 11 is made rough. This yields a great advantage in practice. In this embodiment, assuming that a magazine 10 rotates the spool 11 bidirectionally, the rotation transmitting section 61a is rotatable bidirectionally. The structure of the fitting portion is, needless to say, not limited to that of this embodiment.

Figure 15A:
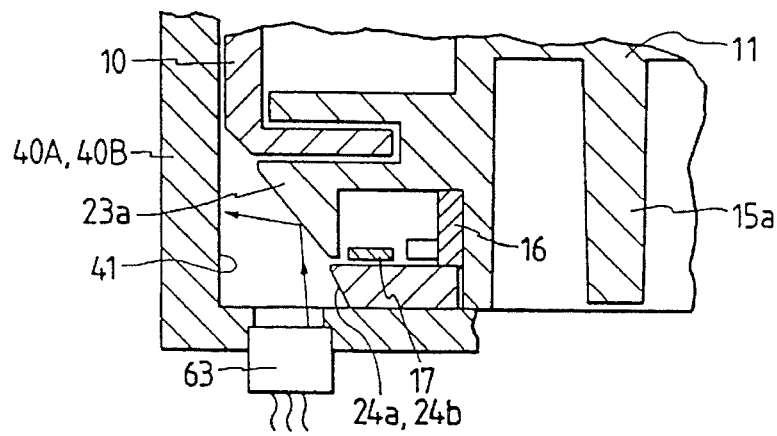
FIGS. 15A and 15B show modified embodiments for detecting a spool position and thereby stopping the spool.
Figure 15B:
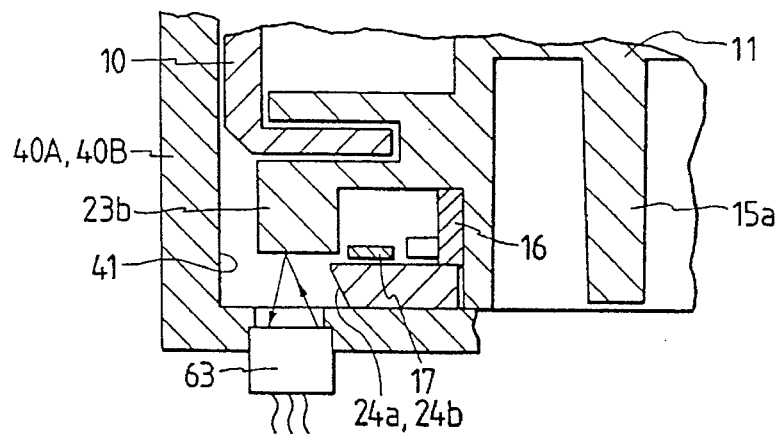

In FIGS. 15A and 15B, a photosensor 63 is provided at a position on the bottom of a magazine chamber 41 which corresponds to a window 24a or 24b constituting the aforesaid attachment inhibition means. Using the photosensor 63, the movements of slopes 23a and non-slopes 23b are detected to stop a fork 52. A configuration substantially similar to this one is acceptable as far as the movement of a spool 11 can be detected with the photosensor 63. The movement of the spool 11 is directly detected to control the stop position. Even for a configuration which allows the fork 52 and spool 11 to fit each other twice through a 360° rotation, a 360° range can be allocated to three areas of 1, 2 and 3. A ring 16 is provided with three stoppage protrusions 16b on its circumference. In a camera is not provided with the aforesaid attachment inhibition pins 44 and 45, or other mechanical attachment inhibition means the photosensor in FIGS. 15A and 15B is used to distinguish a slope 23a or a non-slope 23b and thereby identify the rotating position of the spool 11. Thus, the status of the magazine 10 attached is determined whereby, photography is permitted or inhibited. This kind of an indirect attachment inhibition mechanism is also useful.

Figure 16:
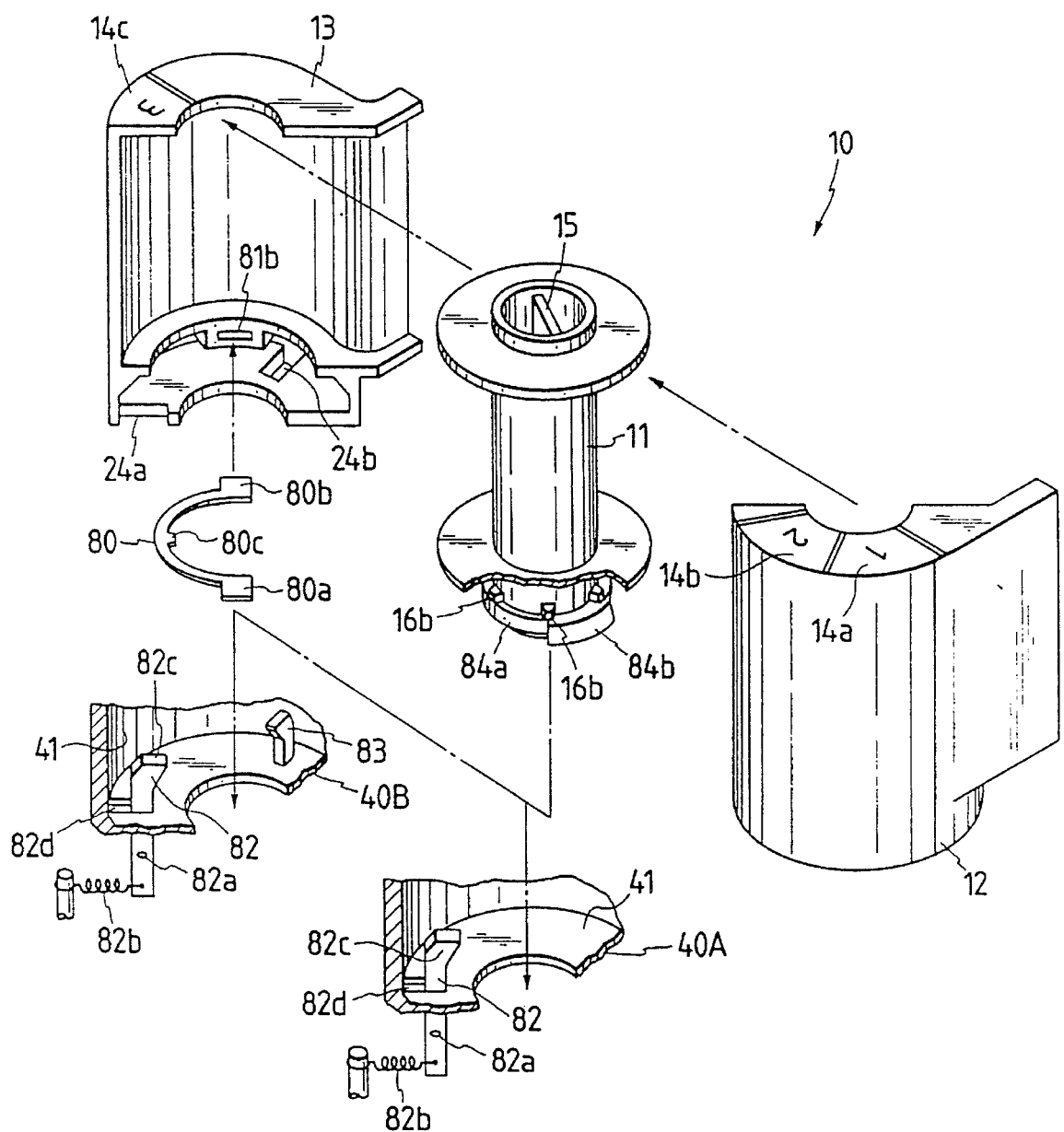
FIG. 16 is a schematic exploded perspective view showing another embodiment of the invention.
Figure 17:
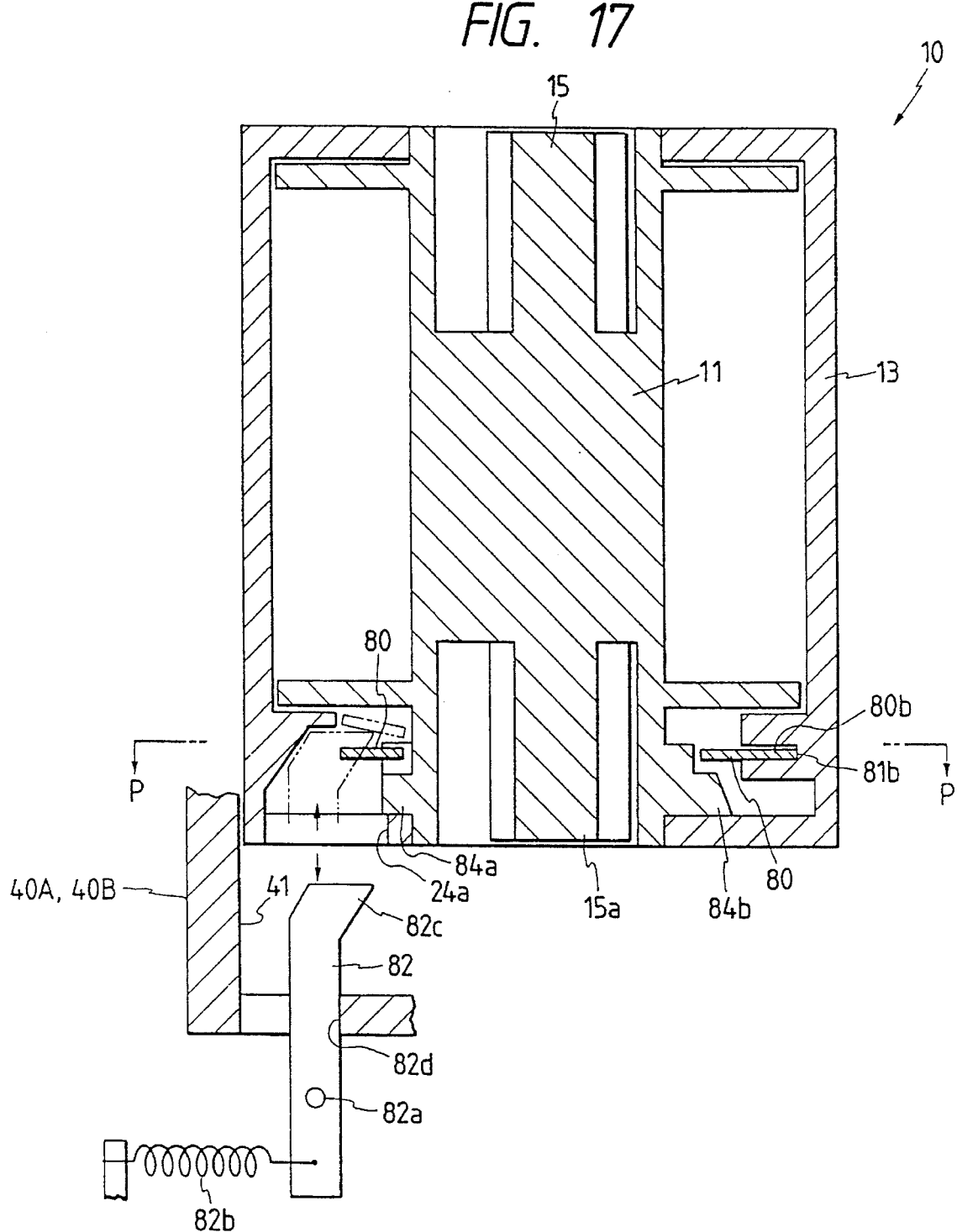
FIG. 17 shows a schematic longitudinal section with respect to the Q—Q line of FIG. 20.

FIGS. 16 to 20 show another embodiment of the invention. The same components as those in the previous embodiments are assigned the same numbers. The description thereof is omitted. In this embodiment, an arc-shaped stoppage spring means 80 is used as a means to restrain a spool 11 at a given rotation stop position. The ends 80a and 80b of the spring means 80 are fitted into stoppage grooves 81a and 81b of cases 12 and 13. A claw 80c which touches a stoppage protrusion 16b (which is united into the spool 11 in this embodiment) is provided on the internal center of the spring means 80. The first attachment inhibition lever 82 is used as a means for releasing the spring means 80 when a magazine 10 is attached to a magazine chamber 41, which also serves as an inhibition means for inhibiting attachment to the magazine chamber 41 when the magazine 10 is a used one. The lever 82 is supported by a supporting axis 82a in such a way that it can swing on the bottom of the magazine chamber 41. The lever tip 82c is normally pressed centripetally by a spring 82b and fitted to a groove 82d on the bottom of the chamber 41. In FIG. 16, a camera 40B has the second attachment inhibition lever 83 unitedly with the bottom of the magazine chamber 41.

In this embodiment, the spool 11 is provided with non-protrusions 84a and protrusions 84b instead of a fitting area consisting slopes and non-slopes. Due to the configuration, in status 1, 2 or 3, the non-protrusion 84a or protrusion 84b comes to the window 24a or 24b as listed below.

| Status | Window 24a | Window 24b |
| --- | --- | --- |
| 1 | Non-protrusion 84a | Non-protrusion 84a |
| 2 | Non-protrusion 84a | Protrusion 84b |
| 3 | Protrusion 84b | Non-protrusion 84a |

At the tip 82c of the first attachment inhibition lever 82, a slope is formed so that the lever 82 can touch the protrusion 84b and swing away when a magazine 10 is taken out.

The operations of the embodiment having the foregoing configuration are described below.

First, an attempt is made to attach a magazine 10 in status 1 to a camera 40A or 40B. Non-protrusions 84a are positioned at windows 24a and 24b, and protrusions 84b do not interfere with attachment inhibition levers 82 and 83. Therefore, it is permitted to attach the magazine 10 to the camera 40A or 40B. When the magazine 10 is attached, the attachment inhibition lever 82 pushes up a spring means 80 as indicated with a phantom line in FIG. 17. This releases a spool 11 from a rotation restraint state.

Figure 18:
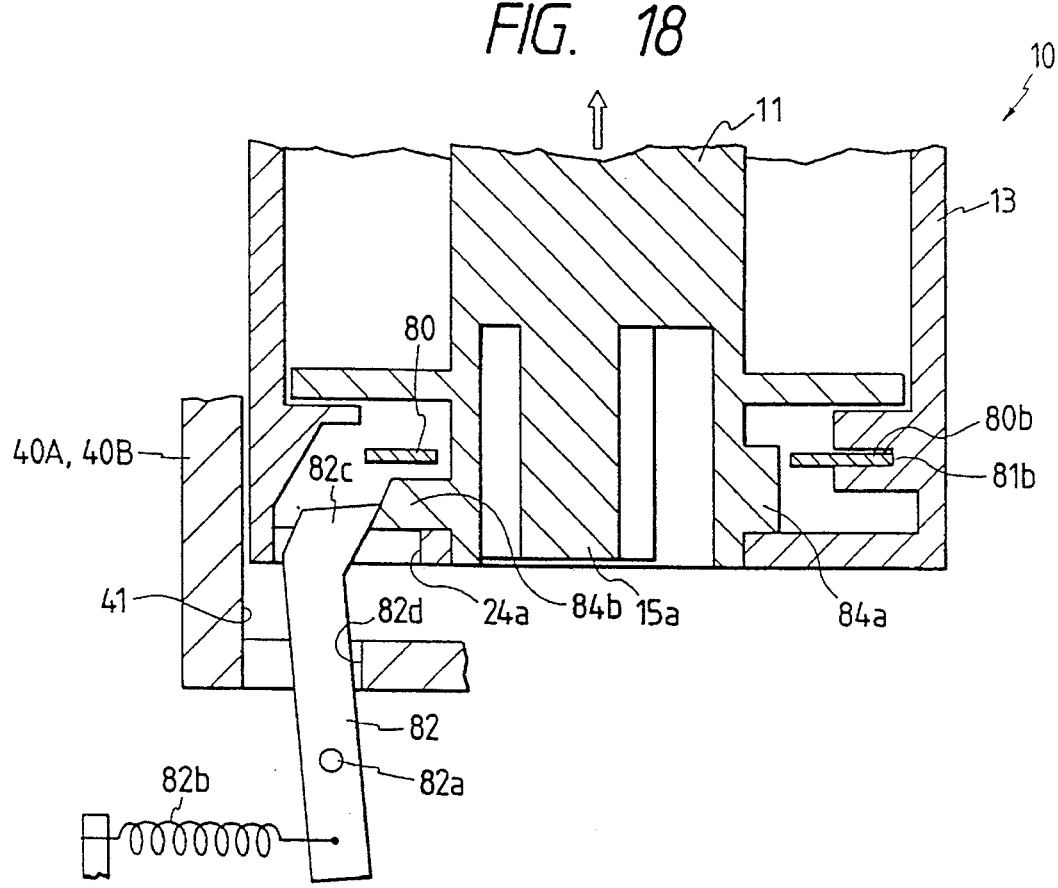
FIGS. 18 and 19 show schematic longitudinal sections for explaining the operating state.

After photography, the spool 11 is set to status 2 or 3 by a camera 40A, or to status 3 by a camera 40B. After that, the magazine is taken away. When the spool 11 is controlled to status 3 by either camera 40A or 40B, as shown in FIG. 18, the protrusion 84b is positioned at the window 24a. The attachment inhibition lever 82, however, swings due to the shape of the slope. This helps extract the magazine 10 smoothly. In the camera 40B, after photography, the spool 11 is never set to status 2 but always to status 3. Therefore, the protrusion 84b cannot be positioned at the window 24b when the magazine 10 is extracted. Unlike the attachment inhibition lever 82, the second attachment inhibition lever 83 needs not be configured to swing.

Next, it is attempted to attach a magazine 10 in status 2 to the camera 40A. The non-protrusion 84a is positioned at the window 24a, permitting attachment. In the camera 40B, the second attachment inhibition lever 83 interferes with the protrusion 84b positioned at the window 24b, thus inhibiting attachment.

Figure 19:
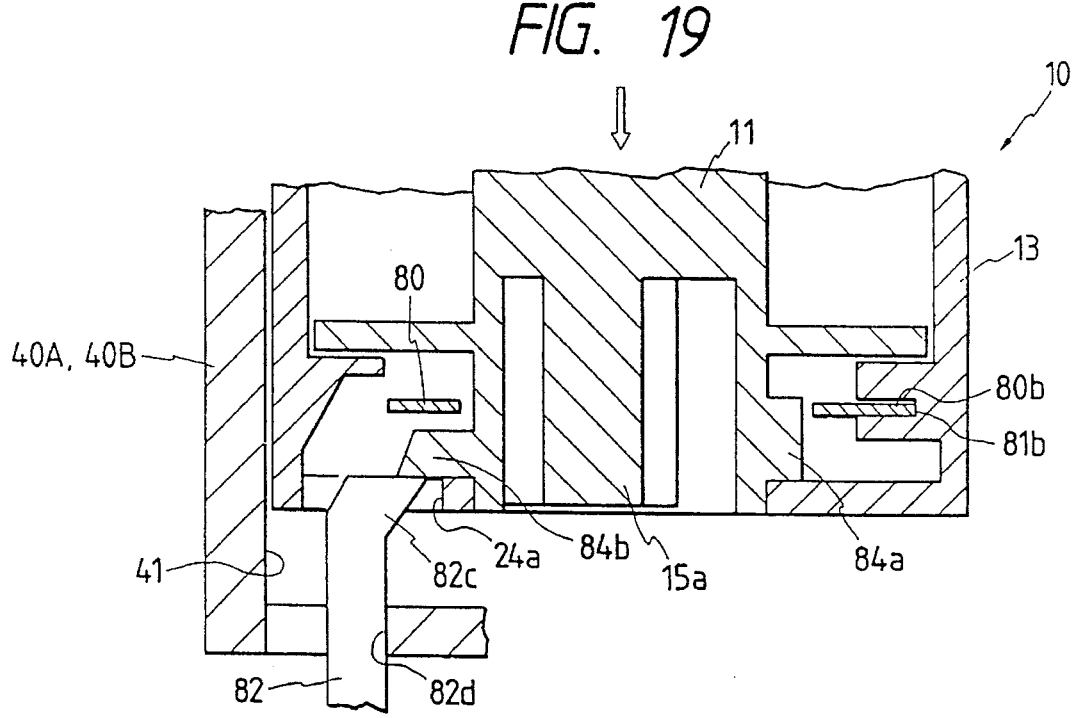
Figure 20:
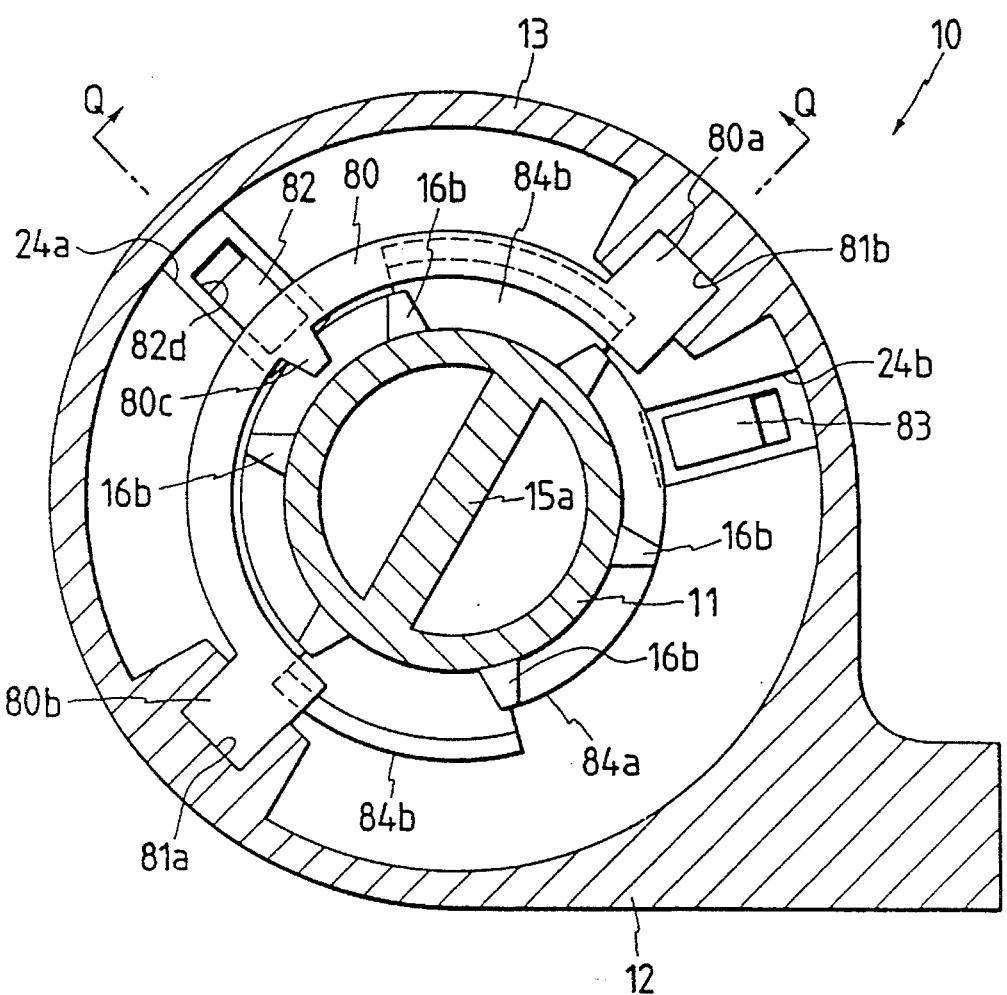
FIG. 20 shows a cross sectional with respect to the P—P line of FIG. 17.

Finally, an attempt is made to attach a magazine 10 in status 3 to the camera 40A or 40B. The attachment inhibition lever 82 interferes with the protrusion 84b positioned at the window 24a as shown in FIG. 19. This inhibits attachment to either the camera 40A or 40B.

As mentioned above, this embodiment yields the same effects as the previous embodiments.

FIGS. 21 to 27 illustrate a third embodiment of the present invention, wherein same or equivalent components as those in the foregoing embodiments are represented by same numbers and will not be explained further.

The present embodiment is to provide, in the configurations of the foregoing embodiments, an improvement in the fitting means for inhibiting the attachment of the magazine 10 to the camera after the start of use of the film, and in the means for inhibiting said attachment.

In the aforementioned first embodiment (FIGS. 1 to 11) and second embodiment (FIGS. 16 to 20), the camera 40A only requires the attachment inhibition pin 44 or the attachment inhibition lever 82, namely one attachment inhibition means, for inhibiting the attachment of the magazine in the state "3". Also, the camera 40B requires the attachment inhibition pins 44, 45 or the attachment inhibition levers 82, 83, namely two attachment inhibition means, for inhibiting the attachment of the magazine 10 in the states "2" and "3", and the increased number of components may be undesirable for the configuration of the camera. For this reason, this embodiment improves the configuration of the aforementioned first embodiment thereby enabling, in the camera 40B, to inhibit the attachment of the magazine 10 in the states "2" and "3" by a single attachment inhibition means.

Figure 6:
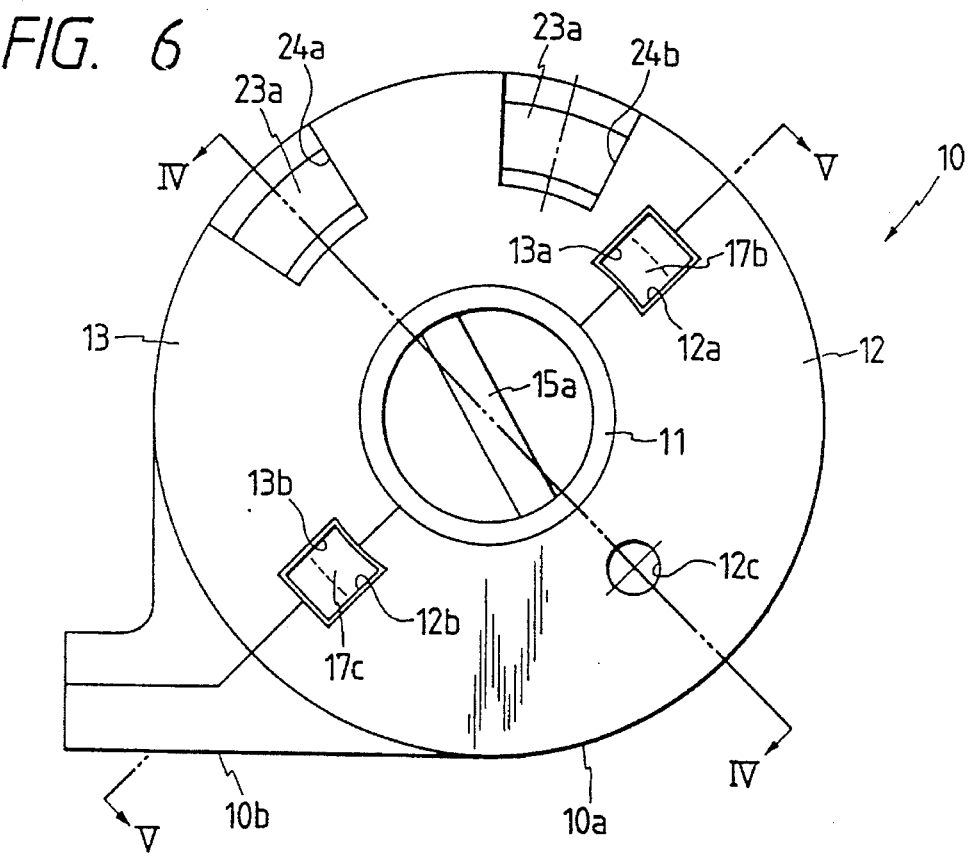
FIGS. 6 and 7 show cross sections with respect to the VI—VI and VII—VII lines of FIG. 4.
Figure 21:
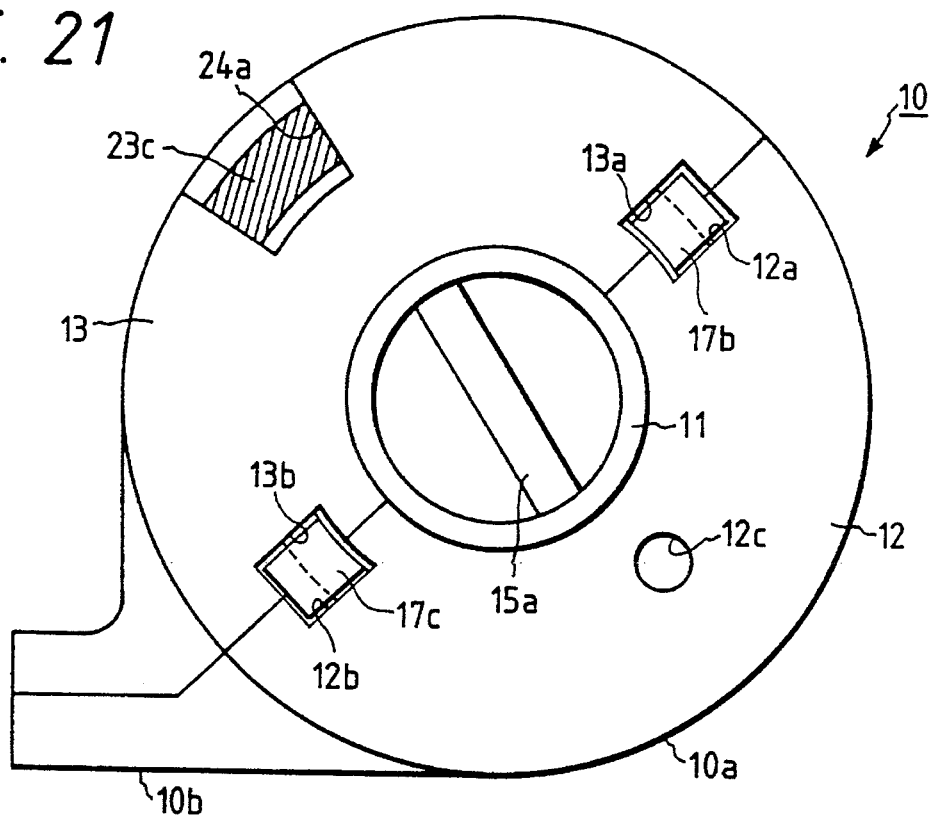
FIGS. 21 and 22 are cross sectional views for explaining the third embodiment of the invention.
Figure 22:
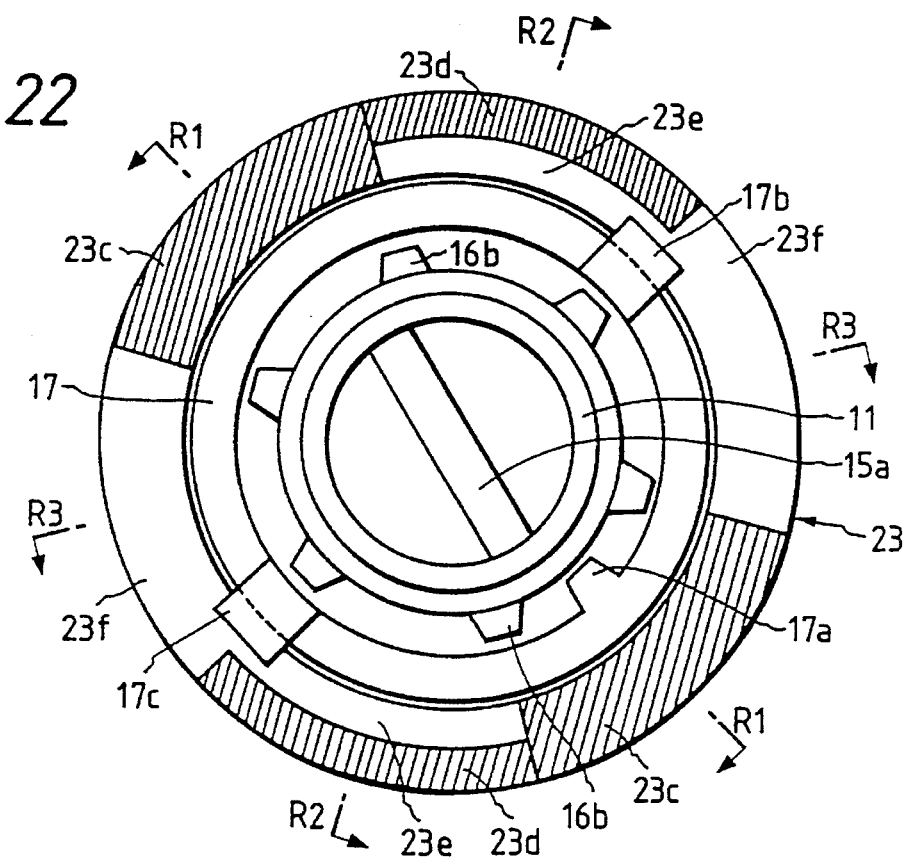
Figure 23:
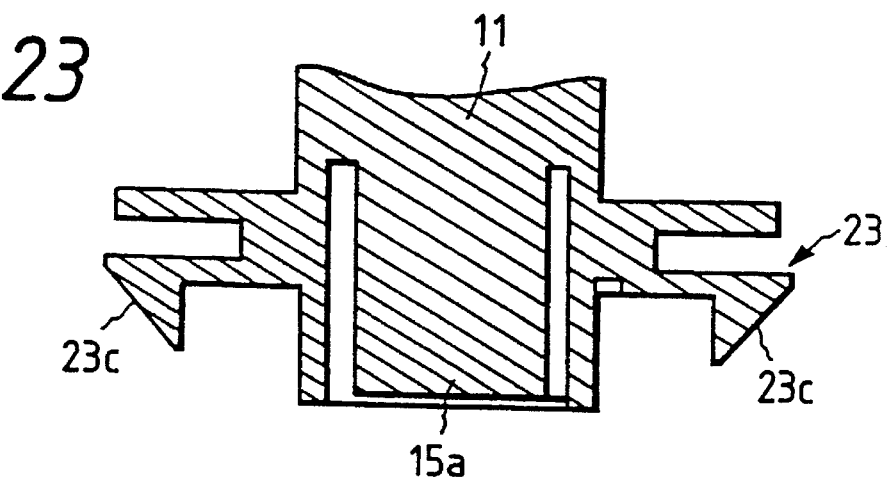
FIG. 23 is a schematic cross sectional view of an abutting portion, taken along line R1—R1.
Figure 24:
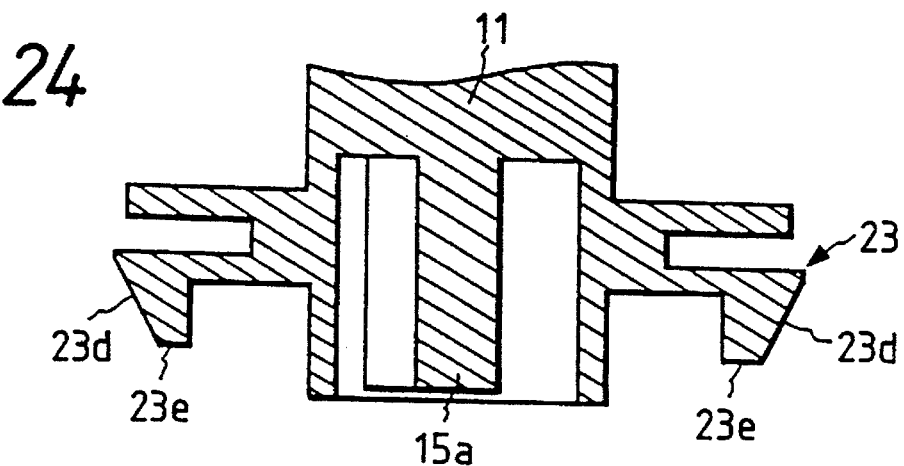
FIG. 24 is a schematic cross sectional view of an abutting portion, taken along line R2—R2.
Figure 25:
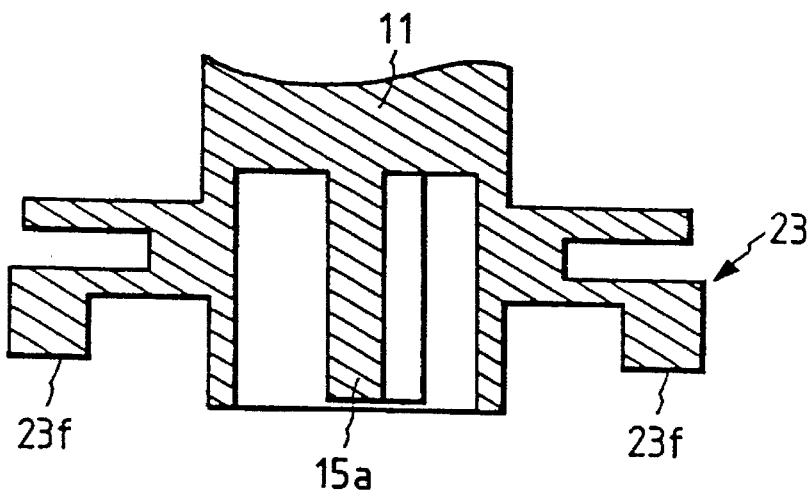
FIG. 25 is a schematic cross sectional view of an abutting portion, taken along line R3—R3.

The difference of the magazine 10 in this embodiment from that in the first embodiment will be explained with reference to FIGS. 21 and 22 (corresponding to FIGS. 6 and 7 in the first embodiment). As shown in FIG. 21, the case 13 is provided with only one window 24a. On the other hand, the fitting area 23 is composed, in succession in sectors of ⅙ of the circle, of a sloped face 23c continuous in the radial direction, a non-sloped face 23e and a radially outside sloped face 23d, and a non-sloped face 23f continuous in the radial direction. This will be apparent from FIGS. 23, 24 and 25 showing cross sections at R1, R2 and R3 in FIG. 22. FIG. 21 shows the magazine 10 in the state "1".

In the magazine 10 of the above-explained configuration, the fitting area 23 exposed in the window 24a in each state, is shown in Table 2.

TABLE 2

| Status | Window 24a |
|---|---|
| 1 | Sloped face 23c |
| 2 | Non-sloped face 23e and sloped face 23d |
| 3 | Non-sloped face 23f |

In the following there will be explained, with reference to FIGS. 26 and 27, the attachment inhibition means provided in the magazine chamber of the camera 40A or 40B. In the wall portion where the window 24a passes through at the attachment of the magazine 10 into the magazine chamber 41, there is provided an inhibition lever 91 or 92 respectively in the camera 40A or 40B. Said inhibition lever is rotatably supported by a fixed pin 93, is biased clockwise by a spring 99 mounted on another pin 97, and is limited in rotation by a limiting pin 95. Said levers 91, 92 are provided, at the lower end thereof, respectively with a short protrusion 91a and a long protrusion 92a, protruding into the magazine chamber 41. The length of protrusions 91a, 92a is so determined, when the magazine 10 is attached in the state "2" where the non-sloped face 23e and the sloped face 23d are exposed in the window 24a, as shown in FIGS. 26 and 27, that the protrusion 91a of the inhibition lever 91 of the camera 40A only touches the sloped face 23d while the protrusion 92a of the inhibition lever 92 of the camera 40B extends to and engages with the non-sloped face 23e.

Because of the above-explained configuration of the magazine 10, and the cameras 40A, 40B, following functions are attained at the attachment of the magazine 10 in each status.

In the status "1" of the magazine 10 where the sloped face 23c is exposed from the window 24a, the protrusions 91a, 92a of the inhibitions levers 91, 92 of the cameras 40A, 40B come into contact with said sloped face 23c, whereby, at the attaching operation for the magazine 10, the inhibition levers 91, 92 are rotated clockwise by the action of said sloped face 23c and against the biasing force of the spring 99, so that the attachment of the magazine 10 is permitted in both cameras 40A, 40B.

In the status "2" of the magazine 10 where the non-sloped face 23e and the sloped face 23d are exposed in the window 24a, and, in case of the camera 40A, the protrusion 91a of the inhibition lever 91 comes into contact with the sloped face 23d and is rotated clockwise by the action thereof and against the biasing force of the spring 99, whereby the attachment of the magazine 10 is permitted. On the other hand, in case of the camera 40B, the protrusion 92a of the inhibition lever 92 engages with the non-sloped face 23e, whereby the attachment of the magazine 10 is inhibited.

In the status "3" of the magazine 10 where the non-sloped face 23f is exposed in the window 24a, the protrusions 91a, 92a of the inhibition levers 91, 92 of the cameras 40A, 40B come into contact with the non-sloped face 23f, whereby the attachment of the magazine 10 is inhibited in both cameras 40A, 40B.

As explained in the foregoing, the configuration of the present embodiment attains the inhibition of attachment of the magazine as in the foregoing first and second embodiments, by a single attachment inhibition means in either of the cameras 40A, 40B, and is therefore advantageous in the construction of a camera.

The attachment inhibition means of the camera 40A or 40B is composed of an inhibition lever, but it is naturally possible to employ an attachment inhibition pin which is biased by a spring and rendered retractacle as in the first embodiment, and to vary the amount of protrusion thereof shorter in the camera 40A and longer in the camera 40B, corresponding to the lengths of the protrusions 91a, 92a of the inhibitions levers 91, 92.

Figure 29:
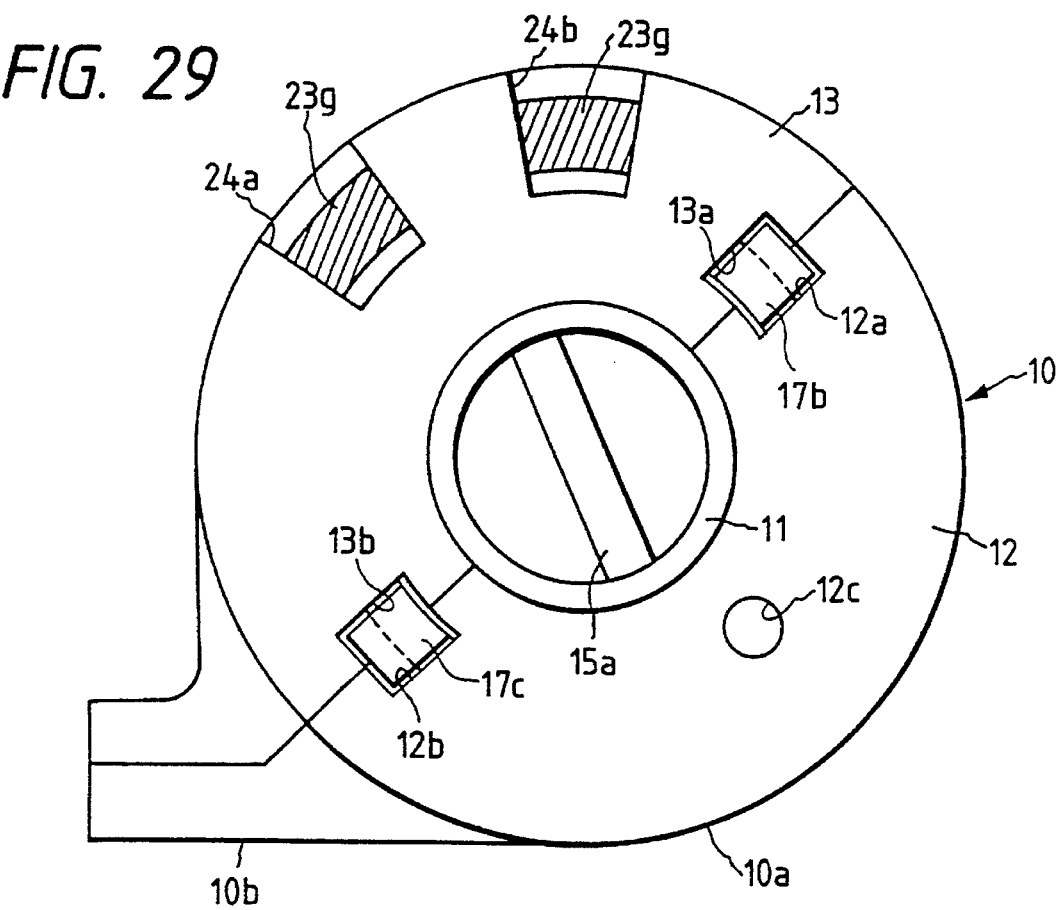
FIGS. 29 and 30 are cross sectional views for explaining the fourth embodiment.
Figure 30:
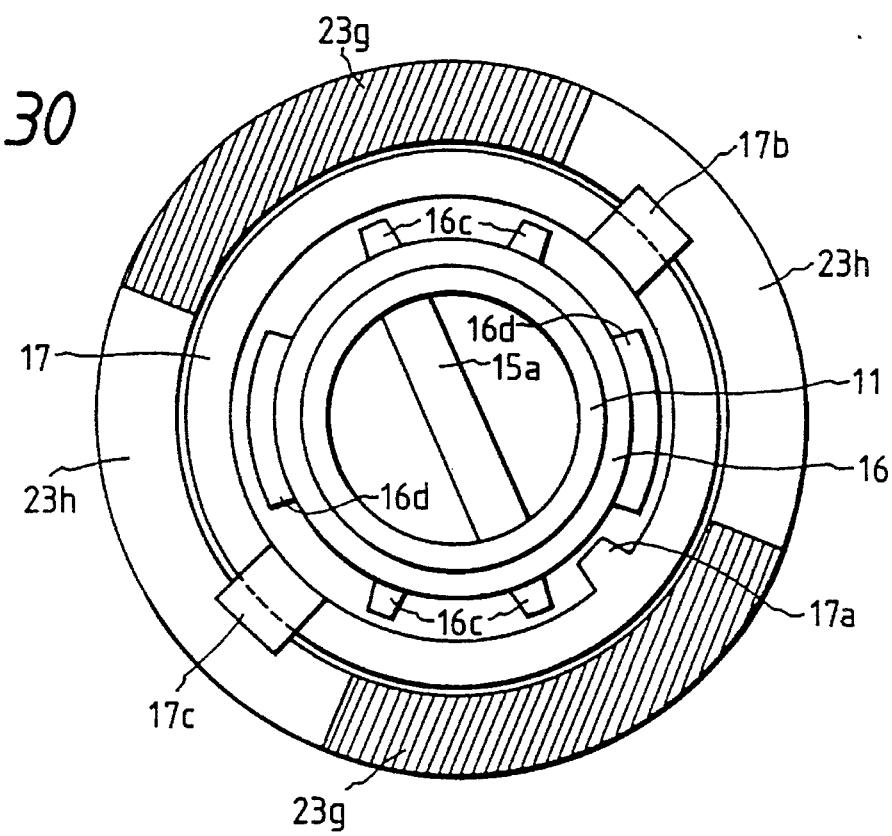

FIGS. 28 to 30 illustrate a fourth embodiment of the present invention, which improves the configuration of the first embodiment by a different method from the above-explained third embodiment, for attaining the attachment inhibiting effect as in the first or second embodiment by providing the camera 40A or 40B with an attachment inhibition means.

Difference of the magazine 10 of this embodiment from that of the first embodiment will be explained with reference to FIGS. 28 to 30. In the first embodiment explained before, about a half of the periphery of the upper end face of the magazine 10 is divided into three sections which are respectively allotted to the states "1", "2" and "3". In the present embodiment, about a half of the periphery of the upper end face of the magazine 10 is divided into four sectors, of which three sectors are used for "1", "2" and "3", and the remaining sector is not used. The function of the key 15 as pointing means is same as in the first embodiment.

In the lower part of the case 13, as shown in FIG. 29, windows 24a, 24b are formed with a mutual angle of about 45°. Also as shown in FIG. 30, on the fitting area 23, a sloped face 23g and a non-sloped face 23h are formed in successive sectors of about 90° each, with shapes respectively corresponding to the sloped face 23a and the non-sloped face 23b of the first embodiment. Also the stoppage protrusions 16c, 16d of the ring 16 for preventing the displacement from the pointed position when the magazine 10 is unattached are provided, as shown in FIG. 30, in positions to prevent the spool 11 from rotation among three areas shown in FIG. 28 when the magazine is unattached.

In the magazine 10 of the above-explained configuration, the fitting area 23 exposed in the windows 24a, 24b in each state is shown in Table 3.

TABLE 3

| Status | Window 24a | Window 24b |
| --- | --- | --- |
| 1 | Sloped face 23g | Sloped face 23g |
| 2 | Sloped face 23g | Non-sloped face 23h |
| 3 | Non-sloped face 23h | Non-sloped face 23h |

FIG. 29 explained above shows the status "1".

In the camera 40A, 40B, the fork encoder 57 controlling the rotational stop position of the fork 52 at the end of rewinding is so constructed as to stop the spool 11 at the three stop areas therefor, but it will not be illustrated since it is merely different from the first embodiment in the angular position of the segment pattern 57c (cf. FIG. 2). As regards the attachment inhibition pin for inhibiting the magazine attachment, the camera 40A is provided with an attachment inhibition pin 44, biased by a spring 44a, in a portion of the magazine chamber 41 where the window 24a passes through at the attaching operation of the magazine 10. In the camera 40B, there is only provided an attachment inhibition pin 45, biased by a spring 45a, in a portion where the window 24b passes through (see FIG. 10).

Because of the above-explained configuration of the magazine 10 and the cameras 40A, 40B, following functions are attained at the attachment of the magazine 10 in each status.

With the magazine 10 in the status "1", the attachment is permitted in either of the cameras 40A, 40B.

With the magazine 10 in the status "2", the attachment is permitted in the camera 40A but is inhibited in the camera 40B.

With the magazine 10 in the status "3", the attachment is inhibited in either of the cameras 40A, 40B.

The above-explained configuration of this embodiment has the advantage of attaining the effect of attachment inhibition of the magazine as in the foregoing first and second embodiment by providing the camera 40A or 40B with only one attachment inhibition means, thereby being advantageous for the construction of the camera.

Figure 32:
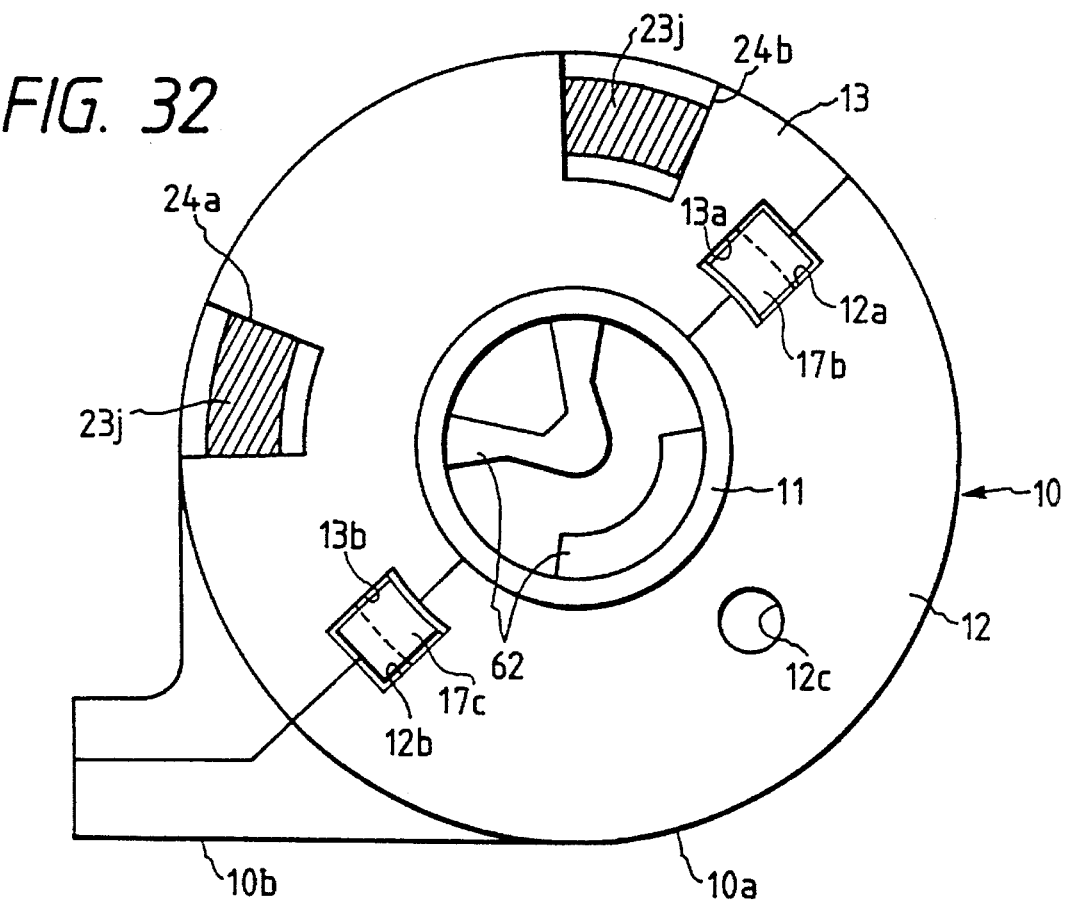
FIGS. 32 and 33 are cross sectional views for explaining the fifth embodiment.
Figure 33:
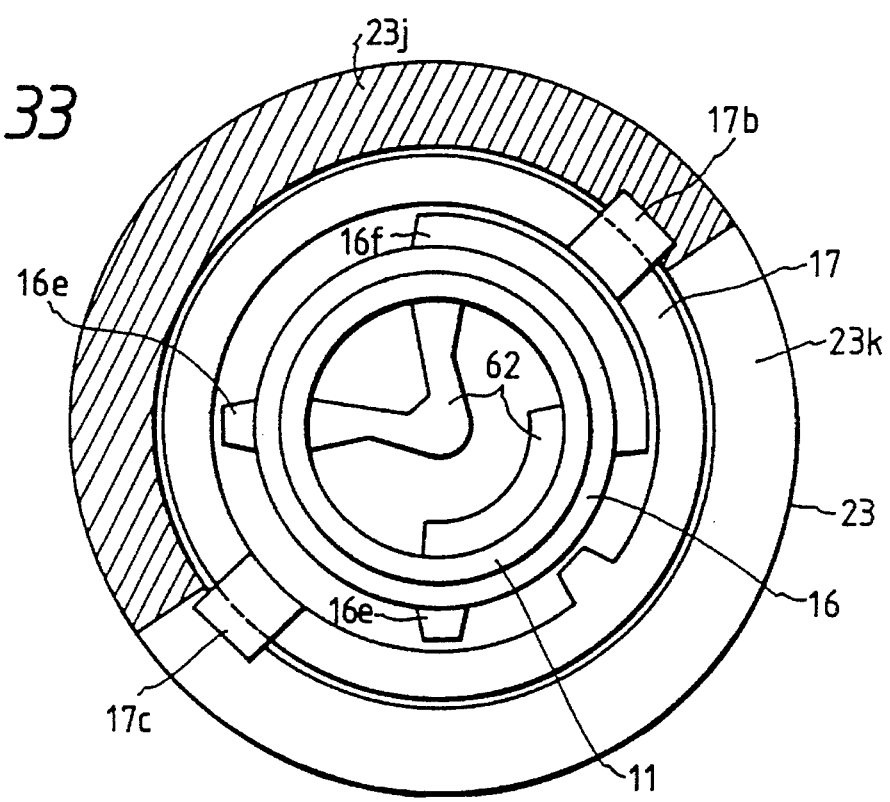
Figure 34:
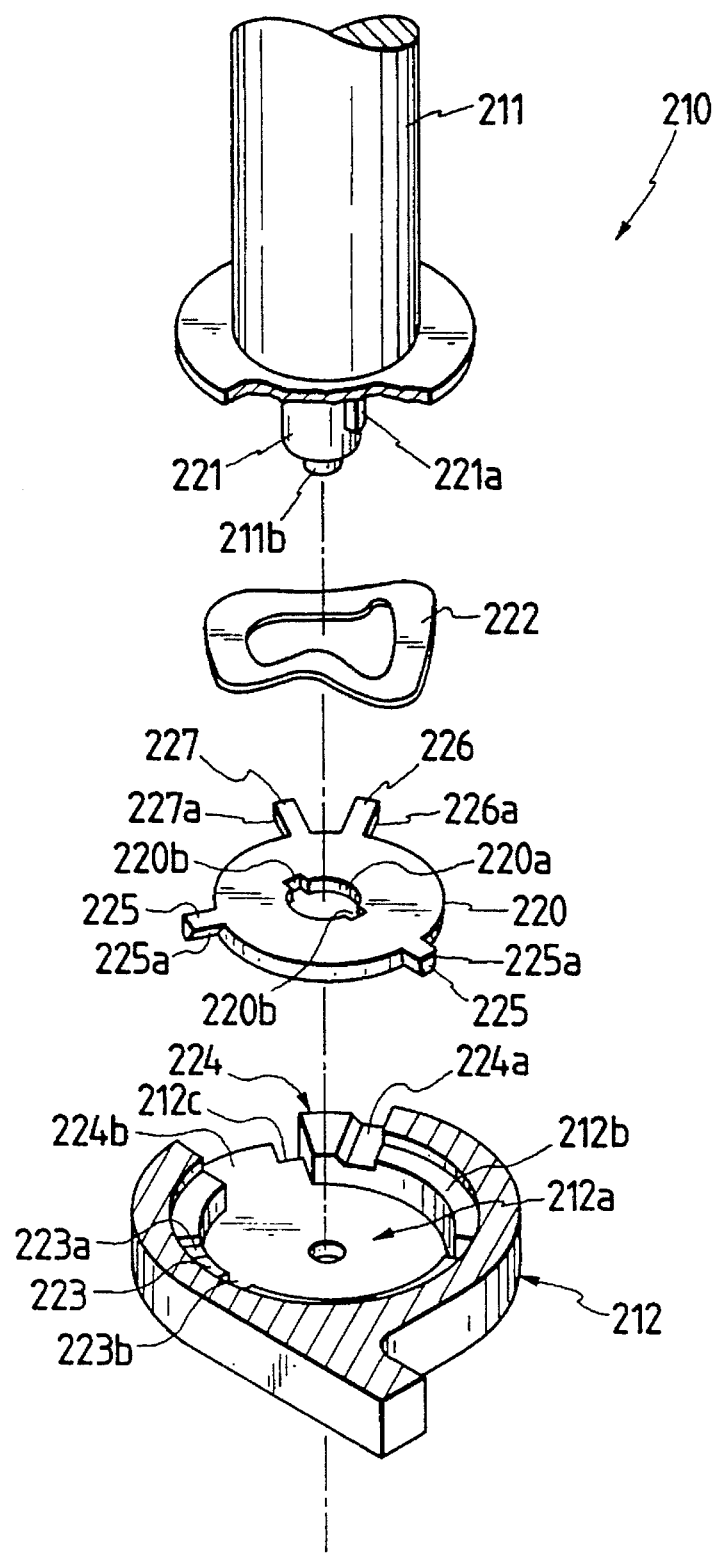
FIG. 34 is a schematic exploded perspective view of the bottom of a magazine in an embodiment of a film magazine relating to the invention.
Figure 35:
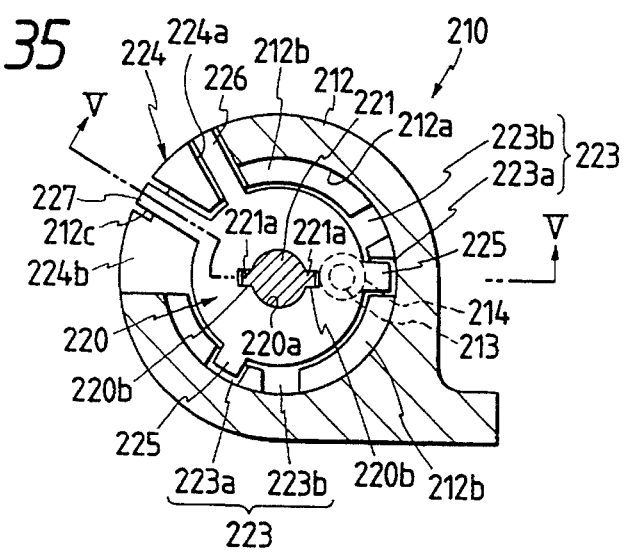
FIG. 35 is a cross-sectional view of major components showing the assembled state.
Figure 36:
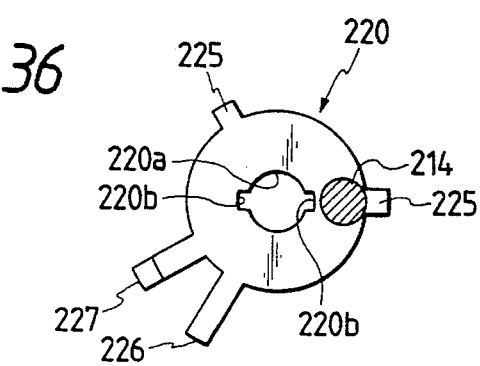
FIG. 36 is a bottom view of a displacement member characterizing the invention.

FIGS. 31 to 33 illustrate a fifth embodiment of the present invention. This embodiment applies, to the above-explained configuration of the fourth embodiment, the configuration shown in FIGS. 13 and 14 in which the spool 11 and the fork 52 are fitted in only one way within a range of 360°, thereby increasing the angular range allotted to the status "1", "2" and "3".

The magazine 10 of this embodiment is different from that of the fourth embodiment in the following manner. As shown in FIG. 31, the entire periphery of the upper end face of the magazine 10 is divided into four sectors, of which three are allotted to the status "1", "2" and "3", and the remaining one is not used.

As the pointing means, an arrow 62a is provided in the upper fitting area 62. On the other hand, the case 13 is provided, as shown in FIG. 32, with windows 24a, 24b with a mutual angular distance of about 90°. Furthermore, as shown in FIG. 33, the fitting area 23 is provided, in halves, with a sloped face 23j and a non-sloped face 23k, which are respectively similar to the sloped face 23a and the non-sloped face 23b in the first embodiment. The stoppage protrusions 16c, 16d of the ring 16 for preventing the displacement of the pointed position when the magazine 10 is unattached are provided, as shown in FIG. 33, in positions to prevent the spool 11 from rotation among three areas shown in FIG. 31 when the magazine is unattached.

In the magazine 10 of the above-explained configuration, the fitting area 23 exposed in the windows 24a, 24b in each status is shown in Table 4.

TABLE 4

| Status | Window 24a | Window 24b |
| --- | --- | --- |
| 1 | Sloped face 23j | Sloped face 23j |
| 2 | Sloped face 23j | Non-sloped face 23k |
| 3 | Non-sloped face 23k | Non-sloped face 23k |

FIG. 32 explained above shows the status "1".

In the cameras 40A, 40B, the fork encoder 57 controlling the rotational stop position of the form 52 at the end of rewinding is so constructed as to stop the spool 11 at the three stop areas therefor, but it will not be illustrated since it is merely different from the first embodiment in the angular position of the segment pattern 57c (cf. FIG. 2). As regards the attachment:inhibition pin for inhibiting the magazine attachment, as in the fourth embodiment the camera 40A is provided with an attachment inhibition pin 44, biased by a spring 44a, in a portion of the magazine chamber 41 where the window 24a passes through at the attaching operation of the magazine 10. In the camera 40B, there is only provided an attachment inhibition pin 45, biased by a spring 45a, in a portion where the window 24b passes through.

Because of the above-explained configuration, the magazine 10 and the cameras 40A, 40B of the present embodiment function in the identical manner as in the foregoing fourth embodiment. Also, because the angle of each of the areas "1", "2" and "3" can be made larger than in the fourth embodiment, the stop position control for the spool 11 can be made rougher at the end of rewinding operation.

In the above-explained fourth and fifth embodiments, the attachment inhibition means of the cameras 40A, 40B is composed of a pin, but it is naturally possible to use a lever as in the foregoing third embodiment.

The present invention is not limited to the configuration of the aforesaid embodiments as will be apparent. The framework of a magazine 10, as well as the shapes and structures of components can be modified freely. Various modified embodiments can be devised. In the aforesaid embodiment, the invention applies to a special-type film magazine 10 in which film feed or rewinding is performed by rotating a spool, and a camera 40A or 40B. The invention is also applicable to a typical 35-mm rolled film magazine, proving effective. In the aforesaid embodiment, three display portions 14a, 14b and 14c are used to distinguish a film use status. The present invention is not limited to this configuration. Any configuration is acceptable as long as two indications indicating "unused" and "used" at least can be done.

As described previously, according to the invention, at least two display portions for displaying film use statuses are formed on the outer surface of a film magazine. A pointing means for rotating according to the movement of a spool around which film is wound is provided to point to any of the display portions depending on the rotation stop position of the spool and thereby indicate the film use status. In addition, a means is selectively provided to restrain the movement of the spool having the pointing means except at a time when attached to a camera. A camera to which the film magazine is attached comprises a spool drive unit for rotating the spool of the magazine, and a controller for controlling the rotation stop position of the spool driven by the spool drive unit according to the film use status. Despite a simple configuration, a use status of film in the magazine, that is, "unused," "extracted in the middle," or "used up (exposed)", can be indicated accurately. The film use status can be recognized merely by monitoring the outer surface of the magazine. This permits adequate film management, and eliminates a problem that a used magazine is mistakenly attached to a camera and exposed double. Other excellent effects will be made available. In particular, according to the invention, the spool of a magazine is used as a display means, and the rewind drive system of a camera is used as a drive means. Thus, existing components are fully utilized to achieve the required effects. This fact that no special component is needed is another great advantage. When a magazine is unattached, a restraint means which is selectively positioned restrains the rotation of the spool. This terminates any risk that the spool may rotate and indicate an incorrect status. This display is performed automatically using the mechanisms of a magazine and a camera. An operator need not do any special operation.

According to the invention, a fitting means which assumes any of two states of fitted and unfitted depending on the use status of film, and permits or inhibits the attachment of a magazine to a camera is provided as part of the housing of the film magazine. The camera to which the film magazine is attached comprises a means which changes the fitting means of the magazine to the fitted or unfitted state depending on the film use status, and a means which permits attachment of a magazine to a magazine chamber when the fitting means is in unfitted state, or inhibits the attachment when the fitting means is in fitted state. Despite the simple configuration, depending on the film use status of "unused," "extracted in the middle," or "used," the fitting means of a magazine can be changed selectively to the fitted or unfitted state. Thus, re-attachment of a used film magazine can be prevented without fail. Then, a problem of a double exposure can be prevented definitely. Thus, various excellent effects are made available.

Figure 37A:
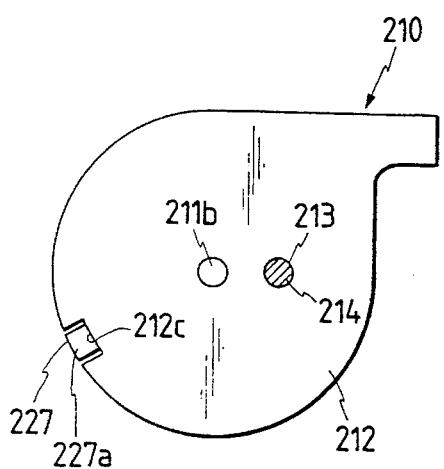
FIGS. 37A and 37B are bottom views of the magazine for explaining the distinguishable display of a film use status using the displacement member.
Figure 37B:
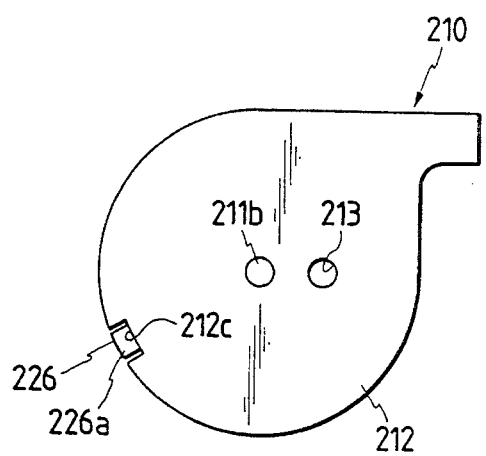
Figure 38:
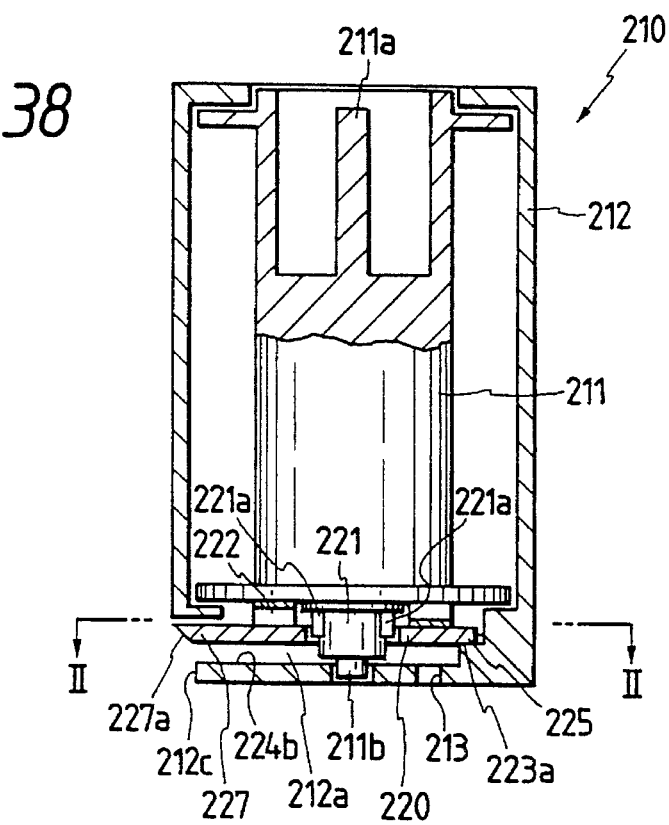
FIG. 38 shows a cross section with respect to the V—V line of FIG. 35.
Figure 39A:
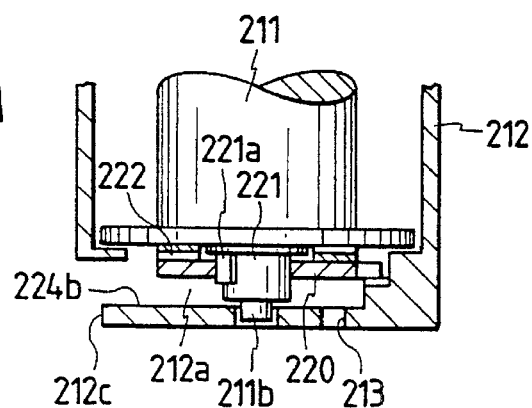
FIGS. 39A and 39B are explanatory diagrams on the movement of the displacement member in the bottom space of the magazine.
Figure 39B:
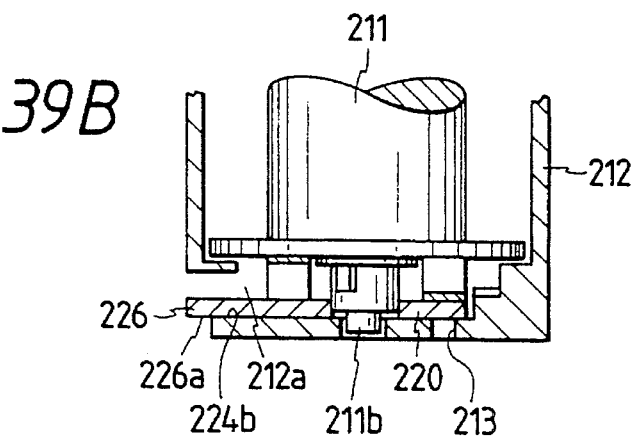

FIGS. 34 to 40A and 40B show an embodiment of a film magazine and a camera which accommodates the film magazine which relates to the invention. In this embodiment, a film magazine 210 has the configuration disclosed, for instance, in the specification of the U.S. Pat. No. 4,832,275. Therein, the film end is caught in the magazine 210 from the beginning, and the film is fed or rewound starting with its end along with the rotation of a spool 211. The magazine 210 includes an outer case 212 consisting of a cylindrical main body and a lip-type film feeder protruding as part of the main body. Internally, a storage space (not illustrated) for film which is wound around the spool 211 is formed, and a film feed mechanism (not illustrated) is build in. The details are omitted. In FIG. 38, 11a represents a key formed on the axis end or the top of the spool 211 which fits to a fork and receives the rotation transmitted from a film feed means (not illustrated) of a camera. In FIG. 37, 11b is an axial support on the bottom of the spool 211, which is supported by the case 212.

According to the invention, as apparent from FIGS. 34 to 38, a film magazine 210 comprises a disk-type displacement member including an indicator 214 as a display portion distinguishable externally for distinguishing the film use status and which is displaceable to at least two positions (first and second positions) within the film magazine 210 (within a bottom space 212a formed on the bottom of a case 212 independently of the film storage space), and a means which displaces the displacement member 220 from the first position to the second position along with the rotation of the spool 211 when the magazine 210 is attached to a camera.

In this embodiment, when a protrusion 221a protruding in axial direction from a lower axis 221 of the spool 211 is fitted into a fitting groove 220b on the periphery of an axial hole 22a of the displacement member 220, the rotation of the spool 211 can be transmitted to the displacement member 220. Also provided is a wavy spring 222 which always presses the displacement member 220 downward within the bottom space of the magazine 210 (in a direction for releasing the fitting groove 220b from the protrusion 221a). On the outer circumference of the displacement member 220, arms 225 each of which fits to a cam groove 223 consisting of a shallows groove 223a and a deep groove 223b which are formed on a step 212b on the periphery within the bottom space 212a of the magazine 210, and an elongate stoppage arm 226 which fits to a cam groove 224 consisting of a shallow groove 224a and a deep groove 224b which are formed as a notch extending to the outer circumference of the case are provided circumferentially with a given spacing and protruding radially. The second stoppage arm 227 swings within the deep groove 224b and protrudes beside the stoppage arm 226. At the end of the stoppage arm 226 or 227, as apparent from FIGS. 38 and 39B, a plane 26a or a slope 227a is formed. The plane 226a or slope 227a is selectively exposed from a notch 212c formed as part of the deep groove 224b. The stoppage arms 226 and 227 constitute a fitting means for permitting or inhibiting attachment of a magazine 210 when they are combined with the member of a camera.

The lower corner on one circumferential side of the aforesaid arm 225 or stoppage arm 226 forms a slope 224a (the arm 225 only is illustrated). This helps displace from the first position of the shallow grooves 223a and 224a to the second position of the deep grooves 223b and 224b within the cam grooves 223 and 224. The shallow groove 223a or 224a and the deep groove 223b or 224b in the cam groove 223 or 224 to which the arm 225 or 226 of the displacement member 220 is fitted bound respective mound positions to confine the movement in rotating direction of the arm 225 or 226 within the step 212b and thereby restrict a positional shift at the displaced position. When the displacement member 220 is rotated forcibly by the spool 211, the displacement member 220 overruns the mound portions against the pressure of the wavy spring 222, rotates by a given angle (substantially 30° in this embodiment), and plunges into the deep grooves 223b and 224b with the pressure of the wavy spring 222. In this state, since the arms 225, 226, and 227 are fitted into the deep grooves 223b and 224b, the displacement member 220 is restrained from shifting at the displaced position and remains held down. The wavy spring 222 is almost completely stretched. The fitting grooves 220b of the displacement member 220 are parted from the protrusion 221a of the spool 11 whereby, a friction or an unnecessary load will not be applied to the film feed rotation of the spool 11. There is no possibility of hampering the rotation of the spool 11.

In this embodiment, when a magazine is attached to a magazine chamber of a camera, the rotation of a spool 11 itself is used as a means for releasing a displacement member 220 from a fitted state within the magazine 210 and making the displacement member 220 displaceable along with the rotation of the spool 11.

With the aforesaid configuration, depending on the displaced position of the displacement member 220, an indicator 214 or a display portion appears selectively from a display hole 213. As shown in FIGS. 37A and 37B, when a magazine is unattached, the displayed status can be identified externally. This helps determine whether film is unused or used. As a result, film management can be performed optimally. Moreover, a problem that a used magazine is attached to a camera and double exposed will be resolved. In this embodiment, the status shown in FIG. 37A in which the indicator 214 is visible externally is defined as "unused," and the status shown in FIG. 37B in which the indicator 214 is invisible, as "used." However, the display of a film use status depending on the displacement position of the displacement member 220 is not limited to the presence or absence of the indicator 214 in the display hole 213. Other embodiments conceivable, for example: a configuration consisting of multiple display portions and an appropriate pointing means for pointing to any of the multiple display portions.

Figure 40A:
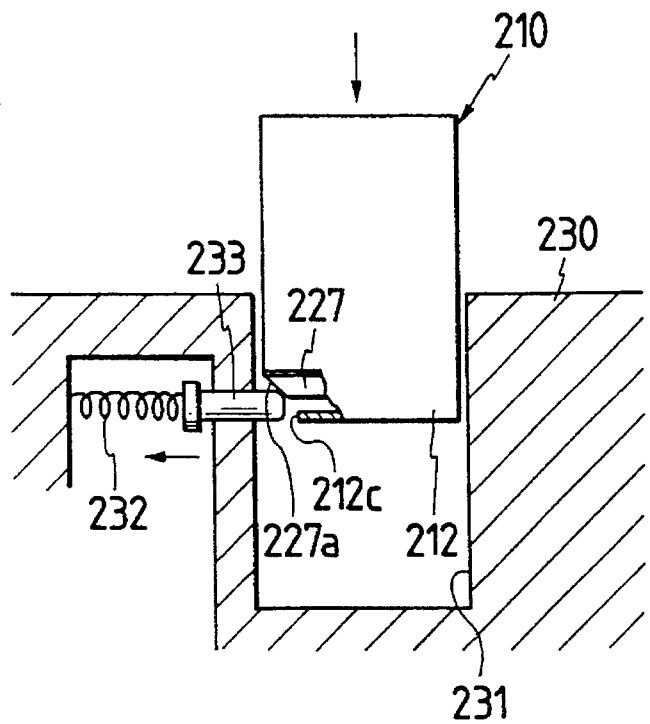
FIGS. 40A and 40B are schematic diagrams for explaining the states of the displacement member permitting and inhibiting attachment of the magazine into a camera.
Figure 40B:
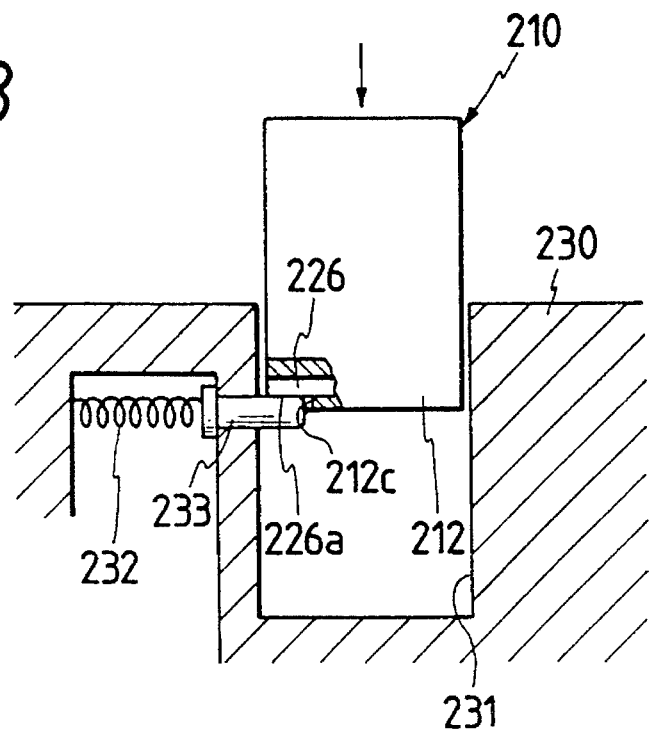
Figure 41:
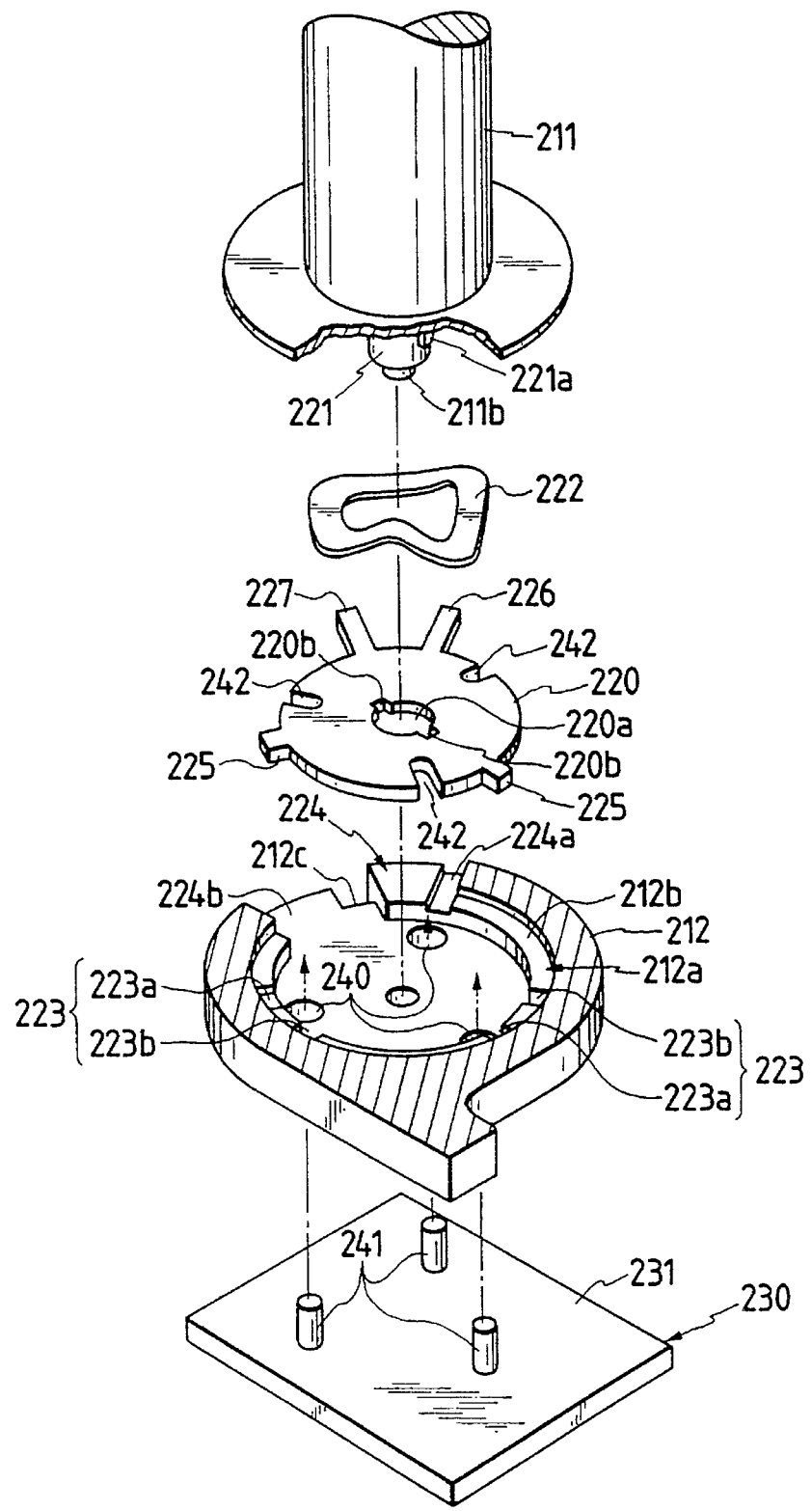
FIG. 41 is a schematic exploded perspective view of the major configuration showing another embodiment of the invention.
Figure 42:
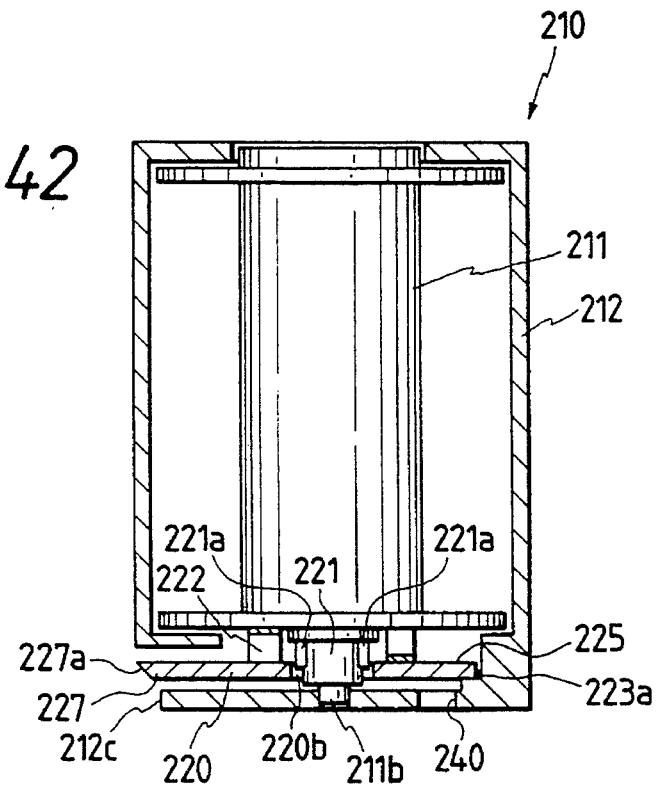
FIGS. 42, 43A and 43B are a longitudinal section view showing the assembled state of the magazine and the explanatory diagrams on the operations.
Figure 43A:
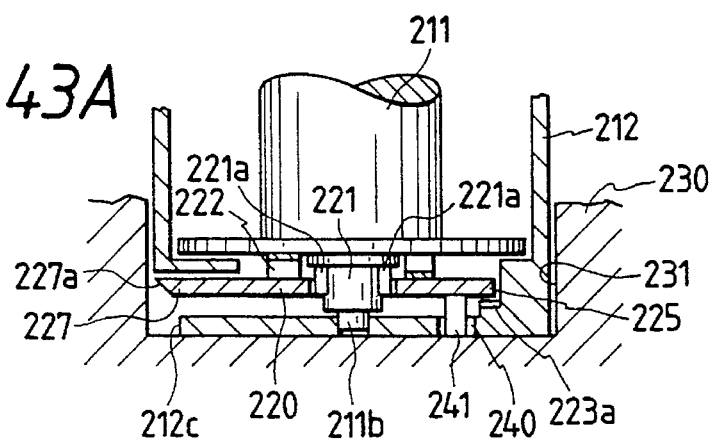
Figure 43B:
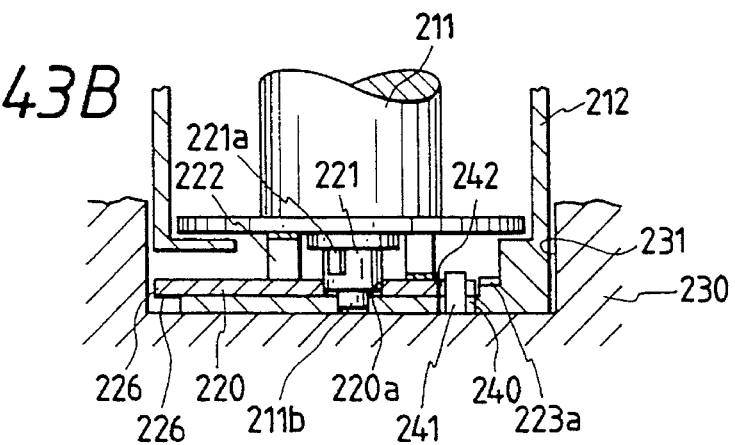

According to the invention, a displacement member 220 within a film magazine 210 includes a stoppage arm 226 which acts as a fitting unit within the magazine 210 to be fitted to a member of a camera 230 depending on the film use status. The stoppage arm 226 is, as shown in FIGS. 40A and 40B, displaced to assume either unfitted or fitted states. When the stoppage arm 226 is unfitted to the member of the camera 230, as shown in FIG. 40A, it is permitted to attach a magazine 210 to a magazine chamber 231 in the camera 230. When the stoppage arm 226 is fitted, as shown in FIG. 40B, it is inhibited to attach the magazine 210 to the magazine chamber 210 in the camera 230. The camera 230 to which a magazine 210 is attached includes a magazine attachment inhibition member for permitting attachment of the magazine 210 to the magazine chamber 231 when the stoppage arm 226 of the displacement member 220, which displaces within the magazine 210 depending on a film use status, is in the unfitted state, or inhibiting the attachment when the stoppage arm 226 is in the fitted state. The magazine attachment inhibition member 233 protrudes inward of the magazine chamber by means of a spring 232 and can be withdrawn freely when the stoppage arm 226 is in the unfitted state.

In the aforesaid configuration, a stoppage arm 226 installed as a fitting unit in a displacement member 220 displaces within a magazine 210 depending on a film use status, and an inhibition means 223 of a camera 230 selectively inhibits attachment of the magazine 210 depending on whether the stoppage arm 226 is in fitted state or facing a notch 212c, or in unfitted state. Therefore, attaching an unused magazine 210 is permitted, while re-attaching a used magazine 210 can be inhibited definitely because the inhibition member 233 interferes with a plane 226a of the stoppage arm 227. When the foregoing stoppage arm 226 is in unfitted state, as shown in FIG. 40A, a slope 227a on the end of the second stoppage arm 227 is facing the notch 212c. In this state, when a magazine 210 is attached to the magazine chamber 231, the slope 227a touches the inhibition member 233. Then, the inhibition member is pushed away and withdrawn from the magazine chamber 231 whereby, the magazine 210 can be attached.

According to the present embodiment, a magazine 210 has a simple configuration and can be assembled easily. Display of a film use status and inhibition of attachment to a magazine chamber 231 can be performed optimally without hampering film feed.

FIGS. 41 to 43A and 43B show a modified embodiment of the preceding one. In this embodiment, multiple (three) fitting holes 240 are drilled in the bottom of a case 212 of a magazine 210. Multiple fitting pins 241 are attached on the bottom of the magazine 210 so that the pins 241 will be fitted into the fitting holes 240 when the magazine 210 is attached to a camera 230. Thus, when the magazine 210 is attached to the camera 230, a displacement member 220 is pushed up with a fitting groove 220b fitted to a protrusion 221a of the spool 211, so that the displacement member 220 can be displaced with the rotation of a spool 211 in the bottom space 212a of the magazine 210. A corresponding notch 242 formed on the displacement member 220 serves as a retreat of each fitting pin 241 so that the displacement member 220 will plunge into the bottom of the case 212 with the pressure of a wavy spring 222 when the displacement member 220 displaces to the second position in association with the rotation of the spool 211.

In this modified embodiment, the lower corner on one circumferential side of an arm 225, or a stoppage arm 226 does not have a slope which is seen in the preceding embodiment. According to this configuration, with a smaller load than that for the preceding embodiment, the displacement member 220 can move from the first position of shallow grooves 223a and 224a to the second position of deep grooves 223b and 224b. At each displaced position, a positional shift can be prevented definitely. In the preceding embodiment, when the displacement member 220 overruns mound areas between the groove 223a and 223b or 224a and 224b, a certain amount of resistance is generated. This causes a load to the rotation of the spool 211. In this embodiment, the arms 225 and 226 are pushed up by the fitting pins 241 and thereby parted from the shallow grooves 223a and 224a. Therefore, the displacement member 220 can be rotated and displaced easily. Using this configuration, some measure may be needed to prevent unintentionally rotating the spool 211. In this embodiment, a status display indicated with the same indicator as that employed in the preceding embodiment (not illustrated) is made externally visible using at least one fitting hole 240.

FIGS. 44 to 46A and 46B show still another embodiment of the invention. In this embodiment, a ring member 250 which is held to be rotatable within a magazine bottom space 212a is used as a displacement member, and provided with a spring 251 so that it will be given a tendency of rotating clockwise all the time. An outer case 212 holds a stoppage lever 252 using an axial support 252a in such a way that the stoppage lever 252 can swing freely, and gives the stoppage lever 252 a tendency of rotating counterclockwise by means of a spring 253. When a stoppage claw 252b of the lever 252 is fitted into a notch 250a formed on the inner circumference of the ring member 250, the rotation of the ring member 250 is stopped. On the outer circumference of a lower axis 221 of a spool 211, a claw 254 is provided to rotate the lever 252 in stoppage release direction. In association with the rotation of the spool 211, the ring member 250 can be displaced. 250b represents a protrusion protruding from the inner circumference of the ring member 250, and 255, a stopper pin standing on the bottom of the case 212. The stopper pin 255 works to limit the amount of rotation of the ring member 250 being pressed by the spring 251.

Figure 45A:
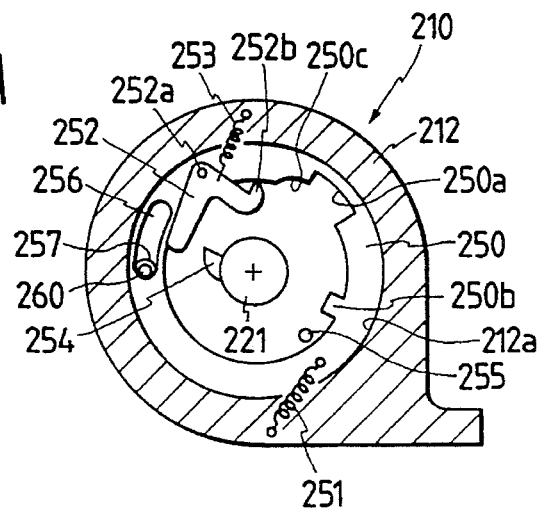
FIGS. 45A and 45B are the explanatory diagrams on the operations.
Figure 45B:
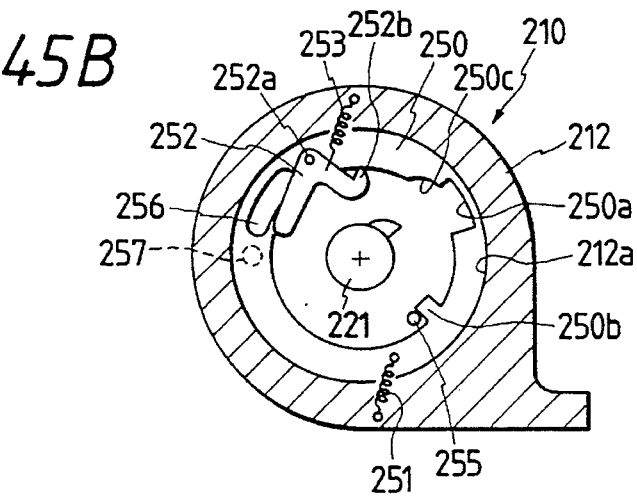
Figure 46A:
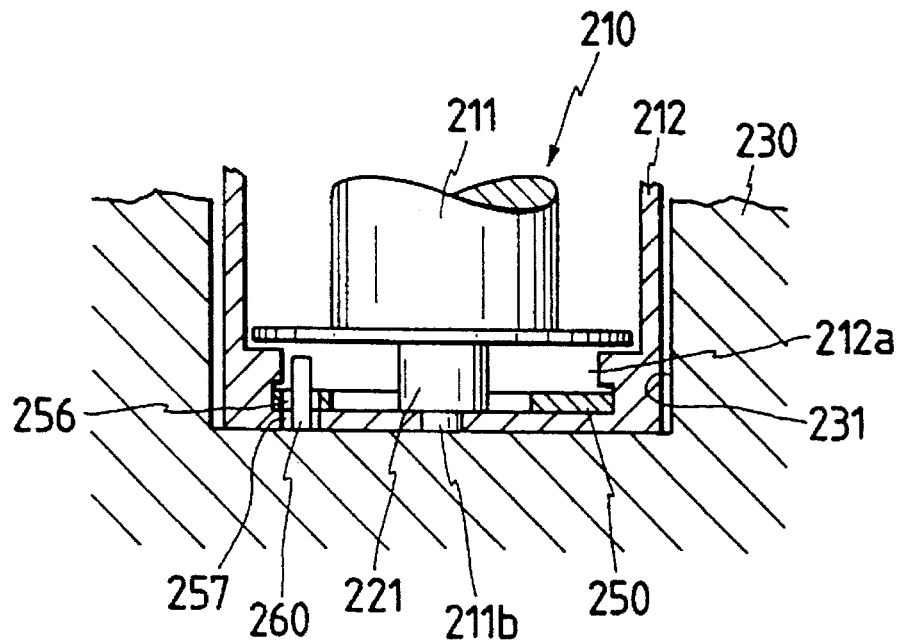
FIGS. 46A and 46B are explanatory diagrams on the operations, showing cross sections with respect to the XIII—XIII line of FIG. 44
Figure 46B:
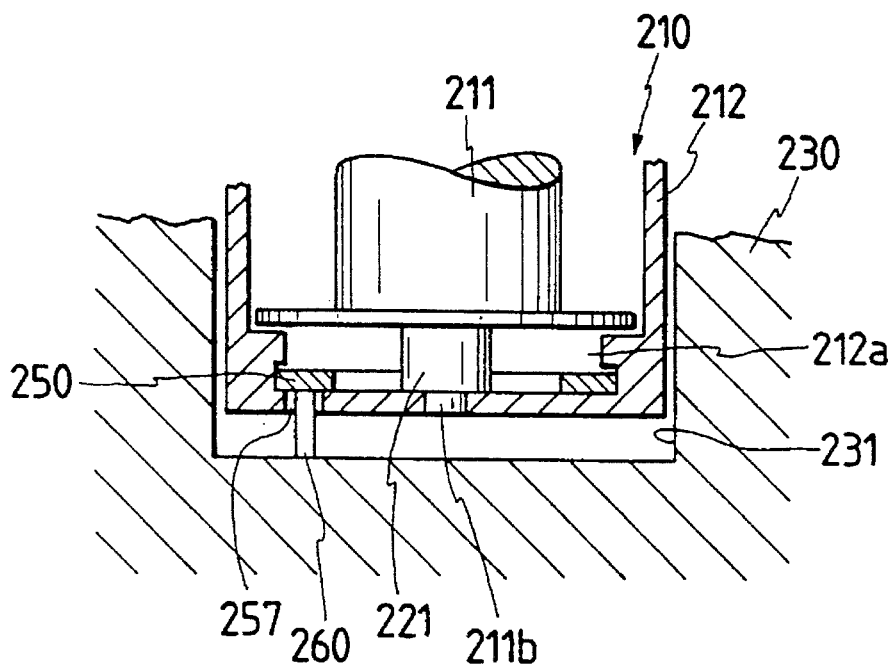

256 represents an arc groove formed on the ring member 250 circumferentially, and 257, the corresponding fitting hole provided on the case 212. An attachment inhibition pin 260 is standing on the bottom of a magazine chamber 231. Normally, when the attachment inhibition pin 260 is fitted to the fitting hole 257, it is permitted to attach a magazine 210 to the magazine chamber 231. When the fitting hole 257 to which the inhibit pin 260 is fitted is closed with the ring member 250 as shown in FIGS. 45B and 46B, it is disabled to attach the magazine 210 to the camera 230.

Figure 44:
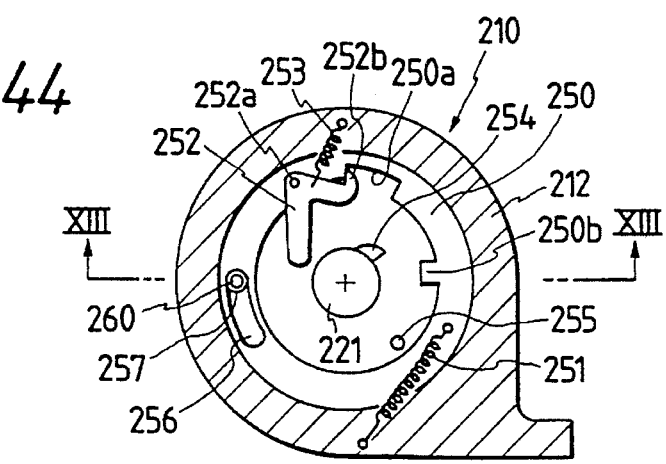
FIG. 44 is a cross-sectional view of major components showing the displacement member on the bottom of a magazine for another embodiment of the invention.

Next, the operations of the aforesaid configuration are described briefly. As shown in FIGS. 44 and 46A, when a magazine 210 is attached to a camera 230 and a spool 211 rotates, a claw 254 rotates a lever 252 in stoppage release direction whereby ring member 250 is rotated with the pressure of a spring 251. As shown in FIG. 45A, an inhibition pin 260 is rotated in an arc groove 256 to a position of restricting the rotation of the ring member 250. At this time, the lever 252 rotates to a position at which the claw 254 will not touch the lever 252. Therefore, no resistance will be applied to the rotation of the spool 11 during film feed and no noise will be generated. After photography completes, when the magazine 210 is extracted from the camera, the inhibition pin 260 pops out of the arc groove 256. Therefore, the ring member 250 further rotates clockwise due to the spring 251. Then, the fitting hole 257 to which the inhibition pin 260 of the camera fits is closed. "Unused" or "used" can be distinguished by viewing the fitting hole 257 externally of the magazine 210. Re-attachment of a used magazine 210 is inhibited definitely as shown in FIG. 46B.

In the aforesaid configuration, when a magazine is attached, only a resistance of moving the lever 252 from the ring member 250 in stoppage release direction is needed as a resistance for rotating the spool 211. Thus, a resistance or a load applied to the spool 211 can be diminished even more than in the preceding embodiment.

The present invention is not limited to the structure of the aforesaid embodiment. The framework of a magazine, as well as the shapes and structures of components can be modified freely. Various modified embodiments are possible. In the aforesaid embodiment, this invention has applied to a special type film magazine 210 which enables film feed or rewinding with the rotation of a spool, and a camera 230 which accommodates the film magazine 210. The invention is also applicable to a typical 35-mm rolled film magazine, and will prove effective. The film use status is not limited to two statuses of "unused" and "used" which are employed in the aforesaid embodiment.

As described previously, according to the invention, a film magazine comprises a displacement member for indicating a film use status which is displaceable to at least two positions within the magazine and indicates the displaced state externally of the magazine, and a means for displacing the displacement member from one position to another position in association with the rotation of a spool when the magazine is attached to a camera. In addition, a means is selectively provided to restrain the displacement member from shifting the position within the magazine and holds the displacement member at either of the displacement positions, when the magazine are attached to the camera. On the other hand, the camera is provided with a means to release the displacement member from the fitted state within the magazine and puts the displacement member into a displaceable state in association with the rotation of the spool. Therefore, the configuration is very simple and permits easy assembly. Nevertheless, it can be indicated accurately whether film in the magazine is unused or used (exposed). The status can be determined easily by merely viewing the display externally of the magazine. This permits optimal film management, and eliminates a problem that a used magazine is mistakenly attached to a camera and exposed double. In addition, a normal film feed operation is not hampered at all. Thus, a number of significant benefits are achieved. According to the invention, a displacement member for display is displaced in association with the movement of a spool in a magazine, and the displaced state can be stopped and held. Required display is done by merely attaching a magazine to a camera. An operator need not perform any special operation. A display error will not occur.

Also according to the invention, a displacement member which displaces depending on a film use status within a film magazine is provided with a fitting unit which assumes either of two states, fitted and unfitted, and permits or inhibits attachment of the magazine to a camera. The camera to which the magazine is attached comprises a means for permitting attachment of the magazine to a magazine chamber when the fitting unit of the displacement member is in unfitted state, or inhibiting the attachment when the fitting unit is in fitted state. Despite the simple configuration, when a magazine is attached to the camera, the fitting unit of the displacement member can be displaced selectively to the fitted or unfitted state depending on the film use of "unused" or "used." Thus, re-attachment of a used film magazine can be inhibited definitely. Moreover, a problem of a double exposure can be prevented without fail.

If the displacement member equipped with the fitting unit having a magazine attachment inhibit function is selectively provided with a display portion which indicates a film use status externally of the magazine depending on the displacement position, the use status of film in the magazine can be indicated very easily.

FIGS. 47 to 50 show another embodiment of a film magazine according to the invention. In this embodiment, a film magazine 310 has the structure disclosed, for example, in the specification of the U.S. Pat. No. 4,832,275. Therein, as apparent from FIGS. 49A and 49B, the film end F is caught in the magazine 310 from the beginning, and the film is fed or rewound starting with its end when a spool 311 is rotated. The magazine 311 has an outer case 312 consisting of a cylindrical main body and a lip-type film feeder protruding as part of the main body. Internally, a storage space 312a for film F to be wound around the spool 311 is formed, and a film feed mechanism (not illustrated) is built in. The details are omitted.

According to the present invention, in the aforesaid film magazine 310, a displacement member 320 which senses during film rewinding that film F has been wound up around a spool 311 and displaces from the first position to the second position is provided as part of the spool 311 to be movable freely. Also provided is a display portion 321 which shows the use status of film by indicating the displaced state of the displacement member 320 at the first or second position externally of the magazine 310.

Figure 47:
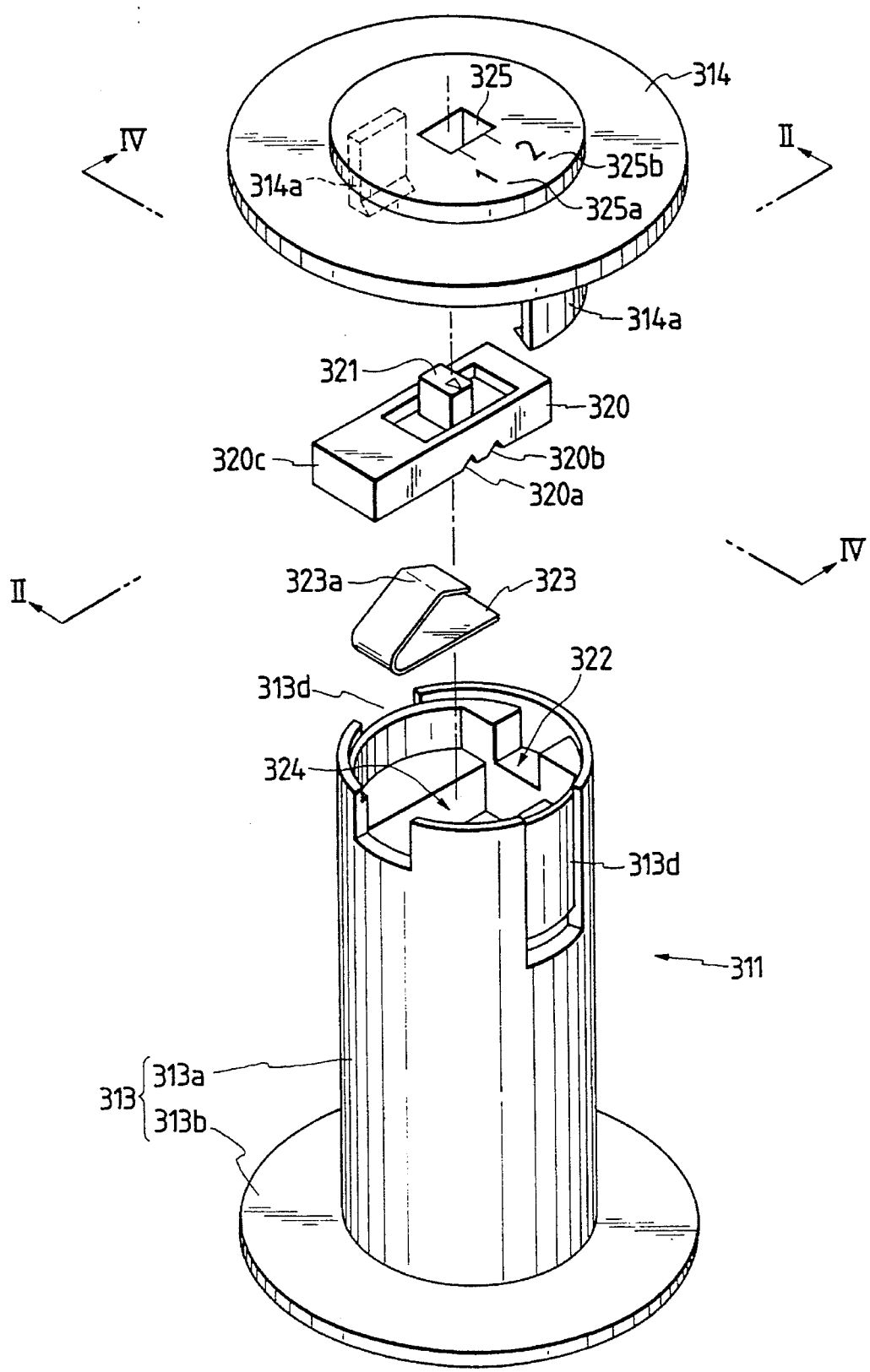
FIG. 47 is a schematic exploded perspective view for explaining the configuration of a spool and a display portion showing an embodiment of a film magazine relating to the invention.

According to the invention, as apparent from FIG. 47, a spool 311 comprises a spool main body 313 consisting of a film winding section 313a and a flange 313b on one end of the film winding section 313a, and a spool lid 314 including a flange to be united to another end of the spool main body. An axial end of the spool main body 313 to which the spool lid 314 is united is provided with a sliding groove 322 which holds a displacement member 320 having a substantial prism shape in such a way that one end of the displacement member 320 can be protruded from the film winding section 313a. On the bottom of the sliding groove 322, a storage groove 324 is formed to accommodate a spring means 323 having a latch 323a which selectively fits to a latch groove 320a or 320b arranged longitudinally on the bottom of the displacement member 320. The spring means 323 stops the displacement member 320 at a required displacement position elastically and restrains the displacement member so that it will not shift at either of the displacement positions with an external force other than that for winding up film F around the spool 311. Then, the aforesaid displacement member 320 clicks with the pressure of the spring means 323 and so is stopped and held at either of the displacement positions.

Figure 48A:
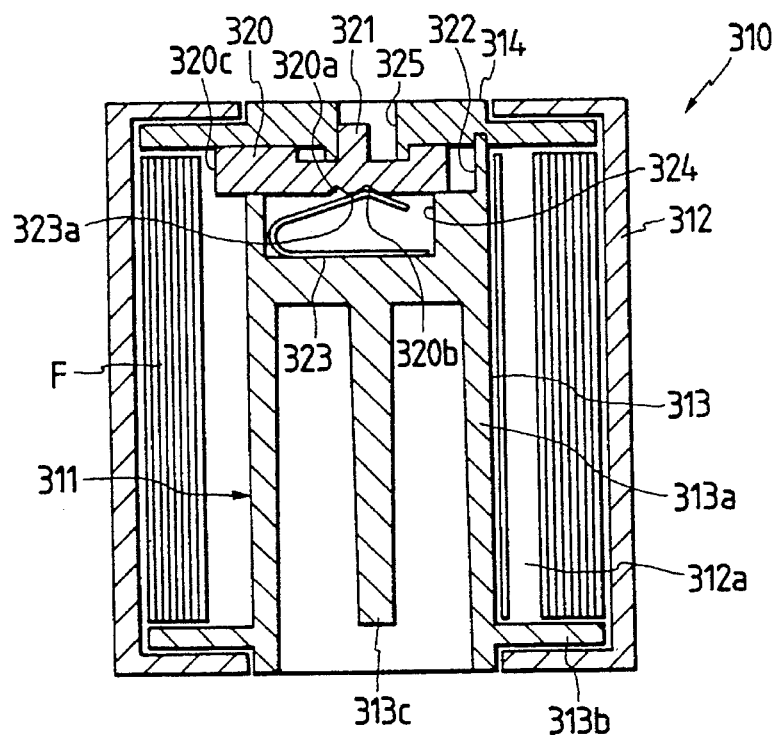
FIGS. 48A and 48B show longitudinal sections with respect to the II—II line of the assembled state and an explanatory diagram on the operations.

On the end of a display portion formed on the top of the displacement member 320, an arrow is displayed as a pointing means. Also provided are display means 325a and 325b assigned numbers 1 and 2 which are exposed from a guide groove 325 on the spool lid 314 externally of the magazine 310, displaceable to two positions across the guide groove 325, and pointed by the indication arrow. The display 1, as apparent from FIG. 48A, represents an unused status of film F or a state in which film F is not wound around the spool 311 and a film sense end 320c of the displacement member 320 is protruding radially from the spool 11. That is to say, when a new magazine 310 is unattached, film F is provided with a tendency of extending outward and stored within a space of the magazine 310. A displacement force for the displacement member 320 is not generated. When the magazine 310 is attached to a camera and then film F is wound to be fed, a tension applied to film F causes the film F to be wound around the winding section 313a of the spool 311. Then, with a winding force of the film F, the displacement member 320 displaces inward of the spool 311 within the sliding groove 322, and moves from one end to another end within the guide groove 325 so, that the display portion 321 will change the state shown in FIG. 49A into the one shown in FIG. 49B. Then, the display 2 appears. With 2 indicated, it can be determined if the magazine 310 is attached to the camera, and whether film F is extracted or rewound. Therefore, it can be distinguished whether film F is unused or used.

In this case, when film F is fed by a film feed mechanism of the camera, if a rotation resistance of the spool 311 is relatively small, film F is not wound up around the spool 311 and the displacement member 320 does not displace. Even under these conditions, when the mechanism of the camera is used to rewind the spool 311 at completion of photography, film F is always rewound around the spool 311. During the rewinding, the displacement member 320 displaces to indicate the film use status. Needless to say, this requires a spring means 323 having a pressure which allows the displacement member 320 to displace when film F is wound around the spool 311.

Figure 48B:
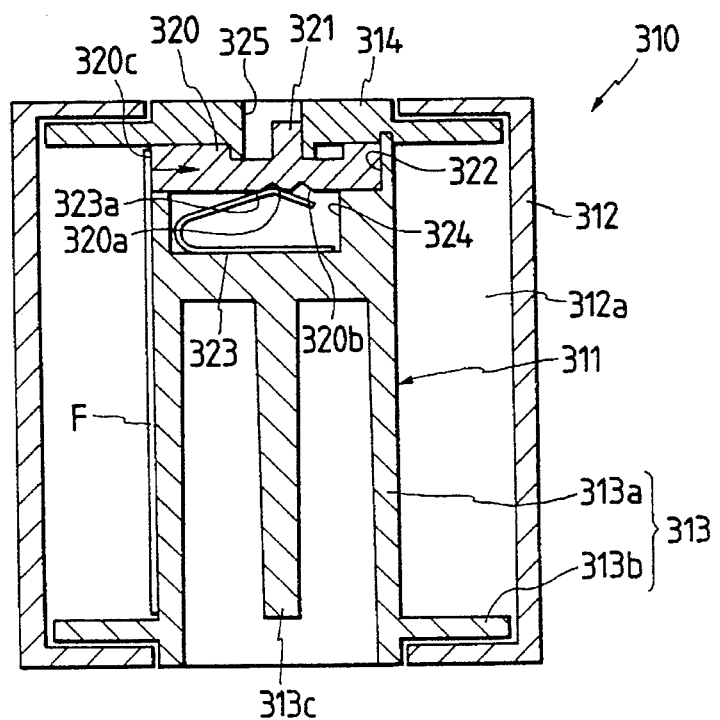

In FIGS. 48A and 48B, 313c is a key to receive the rotation transmitted from the film feed mechanism in the camera (not illustrated). 313d in FIG. 47 is a stoppage groove of the spool main body 313 with which a stoppage part 314a of the spool lid 314 is stopped, whereby, the spool 313 is assembled with the displacement member 320 and spring means 323 incorporated.

According to the aforesaid configuration, during film winding or rewinding, when film F is wound up around the spool 311, the displacement member 320 is displaced from the first position 1 to second position within the spool 311. The displaced position is indicated externally of the magazine 310 using the display portion 321. Then, the use status of film F in the magazine 310, that is, "unused" or "used up (exposed)", can be indicated properly and accurately.

The present invention is not limited to the structure of the aforesaid embodiment. The framework of a magazine 310, as well as the shapes and structures of a displacement member 320, a display portion 321, a spring means 323, and other components can be modified freely. In the aforesaid embodiment, the invention has applied to a special-type film magazine 310 which enables film F feed or rewinding with the rotation of a spool. The invention is also applicable to a typical 35-mm rolled film magazine, and will prove effective. In the aforesaid embodiment, a film use status is indicated as "unused" and "used." The invention is not limited to this method.

As described previously, according to a film magazine of the invention, a displacement member which displaces from the first position to the second position when it senses that film has been wound up around a spool is movable as part of the spool. A display portion for showing a film use status is provided to indicate the displaced state of the displacement member at the first or second position externally of the magazine. In addition, a means is selectively provided to elastically stop the movement of the displacement member within the magazine and restrains the displacement member at either of the displacement positions so that the member will not shift the position. Despite the very simple configuration, during film winding or rewinding, the displacement member can be displaced from the first position to the second position within the spool properly and accurately, whereby, depending on the position of the display portion due to the movement of the displacement member, a film use status, that is, "unused" or "used", can be distinguished externally of the magazine. As a result, film management can be performed optimally. In addition, a problem that a used magazine is attached to a camera and double exposed can be resolved. In the preceding embodiment the displacement member having a distinguishable display portion is displaced at the timing that film is wound up around the spool within the magazine. Therefore, once the magazine is attached to the camera, required display is performed. An operator need not do any special operation. Moreover, a display error will not occur.

I claim:

1. A camera which can accommodate a film magazine having a moving means which can freely move from a first position to a second position, comprising:

drive means which moves said moving means from said first position to said second position when film is exposed; and inhibition means for inhibiting loading of said film magazine when the moving means of the film magazine has moved to the second position;

said drive means including a photosensor for detecting whether said moving means is at the first position or second position.

2. A film magazine for a camera, comprising:

a spool around which film is wound;

displacement means freely displaceable from a first position indicating that the film is unused to a second position indicating that the film is used according to the rotation of said spool;

clutch means for moving said displacement means to a fitted position at which the rotation of said spool is transmitted to said displacement means or an unfitted position at which the rotation of said spool is not transmitted to said displacement means; and holding means for holding said displacement means at the first or second position when said film magazine is unattached to a camera; and wherein said displacement means includes a plate member which is provided in a lower part of said spool, and is displaceable in an axial line direction of said spool and rotatable around said axial line, said plate member engaging and rotating unitedly with said spool when positioned at an upper position, and disengaging from and not rotating with said spool when moved downward;

said clutch means includes a wavy spring for pressing said plate member downward; and release means is included to release the holding function of said holding means when said displacement means and said spool rotate unitedly.

3. A film magazine for a camera, comprising:

a spool around which film is wound;

displacement means freely displaceable from a first position indicating that the film is unused to a second position indicating that the film is used according to the rotation of said spool;

clutch means for moving said displacement means to a fitted position at which the rotation of said spool is transmitted to said displacement means or an unfitted position at which the rotation of said spool is not transmitted to said displacement means; and holding means for holding said displacement means at the first or second position when said film magazine is unattached to a camera; and wherein said displacement means includes a plate member which is provided in a lower part of said spool, and is displaceable along an axial line direction of said spool and rotatable around said axial line, said plate member engaging and rotating unitedly with said spool when positioned at an upper position, and disengaging from and not rotating with said spool when moved downward;

said clutch means includes a wavy spring for pressing said plate member downward; and said holding means is released from its holding function by a release means of a camera which accommodates said film magazine when said film magazine is loaded therein.

4. A camera system comprising:

a film magazine containing a film and having first, second and third states according to the status of use of said film;

a first camera capable of being loaded with said magazine when it is in said first and second states, said first camera including inhibition means for inhibiting the loading of said magazine when it is in said third state; and a second camera capable of being loaded with said magazine when it is in said first state, said second camera including inhibition means for inhibiting the loading of said magazine when it is in said second and third states.

5. A camera system according to claim 4, wherein said first state indicates that all the phototaking areas of the film in said magazine are unexposed, said second state indicates that the phototaking areas of the film in said magazine are partly exposed, and said third state indicates that all the phototaking areas of the film in said magazine are exposed.

6. A camera system according to claim 5, wherein said magazine comprises a rotary member capable of rotation for rewinding the film into said magazine, and each of said cameras comprises drive means for rotating said rotary member and control means for controlling said drive means, and wherein each said control means controls the corresponding said drive means, after causing that drive means to rewind the film into said magazine, in such a manner that said rotary member stops at one of three rotational positions according to the state of use of the film, and the three different stop positions of said rotary member respectively correspond to said first, second and third states.

7. A camera system according to claim 4, wherein said first camera comprises a first housing for being loaded with said magazine and said second camera comprises a second housing for being loaded with said magazine;

said inhibition means of the first camera comprises a first protrusion member capable of protruding by a predetermined length from an internal surface of said first housing, and said inhibition means of the second camera comprises a second protruding member capable of protruding by a length larger than said predetermined length from an internal surface of said second housing, said first and second protruding members being provided in mutually corresponding positions in said first and second housings;

said magazine comprises space forming means for forming a space capable of accommodating said second protruding member in said first state, a space capable of accommodating said first protruding member but incapable of accommodating said second protruding member in said second state, and a space incapable of accommodating said first and second protruding members in said third state; and the space formed by said space forming means corresponds in position to, said first and second protruding members.

8. A camera system according to claim 7, wherein said magazine comprises a rotary member capable of rotation for rewinding the film into said magazine, and said space forming means is so constructed as to rotate integrally with said rotary member.

9. A camera system according to claim 4, wherein said first camera comprises a first housing for being loaded with said magazine and said second camera comprises a second housing for being loaded with said magazine;

said inhibition means of the first camera comprises a first protrusion member capable of protruding from an internal surface of said first housing, and said inhibition means of the second camera comprises a second protrusion member capable of protruding from an internal surface of said second housing, said first and second protrusion members being provided in different positions of said first and second housings;

said magazine comprises first space forming means for forming a space capable of accommodating said first protrusion member in said first and second states but incapable of accommodating said first protrusion member in said third state, and second space forming means for forming a space capable of accommodating said second protrusion member in said first state but incapable of accommodating said second protrusion member in said second and third states; and the space formed by said first space forming means corresponds in position to said first protrusion member while that formed by said second space forming means corresponds in position to said second protrusion member.

10. A film magazine comprising:

a spool capable of being rotated to wind and feed a film; and indicating means which is fixed to said spool, said indicating means being rotatably movable, by rotation of said spool, between a first rotational position indicative of an unused condition of the film and a second rotational position indicative of a used condition of the film.

11. A film magazine according to claim 10, which further comprises limiting means having a first condition for limiting movement of said indicating means in said first position and in said second position and a second condition for allowing unrestricted movement of said indicating means.

12. A camera capable of loading a film magazine which has a spool capable of being rotated to wind and feed a film and indicating means, comprising:

a magazine chamber for loading said film magazine therein;

driving means for rotating said spool of the loaded film magazine so that said indicating means is rotated integrally with said spool;

discriminating means for discriminating a use status of said film; and control means responsive to said discriminating means for controlling said driving means, said control means causing said driving means to arrange said indicating means at a first position indicative of an unused condition of said film when said discriminating means discriminates that said film is unused, said control means causing said driving means to arrange said indicating means at a second position indicative of a used condition of said film when said discriminating means discriminates that said film is used.

13. A camera according to claim 12, wherein said film magazine comprises limiting means having a first condition for limiting movement of said indicating means in said first position and in said second position and a second condition for allowing unrestricted movement of said indicating means, and wherein said camera comprises means for shifting said limiting means from said first condition to said second condition when said film magazine is loaded in said magazine chamber and for shifting said limiting means from said second condition to said first condition when said film magazine is removed from said magazine chamber.

14. A camera capable of loading a film magazine which has a spool capable of being rotated to wind and feed a film and indicating means, comprising:

a magazine chamber for loading said film magazine therein, said indicating means being fixed to said spool and movable, by rotation of said spool, between a first position indicative of an unused condition of said film and a second position indicative of a used condition of said film; and means for permitting said magazine chamber to load said film magazine when said indicating means is at said first position, and inhibiting said magazine chamber from loading said film magazine when said indicating means is at said second position.

15. A film magazine comprising:

a spool capable of being rotated to wind and feed a film; and indicating means which is fixed to said spool and rotatable by said spool, said indicating means having a first position indicative of an unused condition of said film, a second position indicative of partially used condition of said film and a third position indicative of a fully used condition of said film.

16. A film magazine according to claim 15, which further comprises limiting means having a first condition for limiting rotation of said indicating means and a second condition for allowing unrestricted rotation of said indicating means.

17. A camera capable of loading a film magazine which has a spool capable of being rotated to wind and feed a film and indicating means, comprising:

a magazine chamber for loading said film magazine therein;

driving means for rotating said spool of the loaded film magazine so that said indicating means is rotated integrally with said spool;

discriminating means for discriminating a use status of said film; and control means responsive to said discriminating means for controlling said driving means, said control means causing said driving means to arrange said indicating means at a first position indicative of an unused condition of said film when said discriminating means discriminates that said film is unused, at a second position indicative of a partially used condition of said film when said discriminating means discriminates that said film is partially used, and at a third position indicative of a fully used condition of said film when said discriminating means discriminates that said film is fully used.

18. A camera according to claim 17, wherein said film magazine comprises limiting means having a first condition for limiting rotation of said indicating means and a second condition for allowing unrestricted rotation of said indicating means, and wherein said camera comprises means for shifting said limiting means from said first condition to said second condition when said film magazine is loaded in said magazine chamber and for shifting said limiting means from said second condition to said first condition when said film magazine is removed from said magazine chamber.

19. A camera capable of loading a film magazine which has a spool capable of being rotated to wind and feed a film and indicating means, comprising:

a magazine chamber for loading said film magazine therein, said indicating means being fixed to said spool and rotatable by said spool and having a first position indicative of an unused condition of said film, a second position indicative of a partially used condition of said film and a third position indicative of a fully used condition of said film; and means for permitting said magazine chamber to load said film magazine when said indicating means is at said first position and when said indicating means is at said second position, and for inhibiting said magazine chamber from loading said film magazine when said indicating means is at said third position.

20. A camera capable of loading a film magazine which has a spool capable of being rotated to wind and feed a film and indicating means, comprising:

a magazine chamber for loading said film magazine therein, said indicating means being fixed to said spool and rotatable by said spool and having a first position indicative of an unused condition of said film, a second position indicative of a partially used condition of said film and a third position indicative of a fully used condition of said film; and means for permitting said magazine chamber to load said film magazine when said indicating means is at said first position, and for inhibiting said magazine chamber from loading said film magazine when said indicating means is at said second position and when said indicating means is at said third position.

21. A film magazine comprising:

a spool capable of being rotated to wind and feed a film; and indicating means which is fixed to said spool and rotatable by said spool among a first position indicative of an unused condition of said film, a second position indicative of a partially used condition of said film and a third position indicative of a fully used condition of said film, said indicating means having a first surface and a second surface which may be exposed in predetermined fashion in order to inhibit and permit loading of the film magazine into a camera;

first exposing means for exposing said first surface when said indicating means is at said third position and exposing said second surface when said indicating means is at said first position and when said indicating means is at said second position; and second exposing means for exposing said first surface when said indicating means is at said second position and exposing said second surface when said indicating means is at said first position and when said indicating means is at said third position.

22. A camera system comprising:

a film magazine including a spool capable of being rotated to wind and feed a film, indicating means which is fixed to said spool and rotatable by said spool among a first position indicative of an unused condition of said film, a second position indicative of a partially used condition of said film and a third position indicative of a fully used condition of said film, said indicating means having a first surface and a second surface which may be exposed in predetermined fashion in order to inhibit and permit loading of the film magazine into a camera, first exposing means for exposing said first surface when said indicating means is at said third position and exposing said second surface when said indicating means is at said first position and when said indicating means is at said second position, and second exposing means for exposing said first surface when said indicating means is at said second position and exposing said second surface when said indicating means is at said first position and when said indicating means is at said third position; and a camera having a magazine chamber for loading said film magazine therein and means for permitting said magazine chamber to load said film magazine by cooperation with said second surface when said indicating means is at said first position and when said indicating means is at said second position, and for inhibiting said magazine chamber from loading said film magazine by cooperation with said first surface when said indicating means is at said third position.

23. A camera system comprising:

a film magazine including a spool capable of being rotated to wind and feed a film, indicating means which is fixed to said spool and rotatable by said spool among a first position indicative of an unused condition of said film, a second position indicative of a partially used condition of said film and a third position indicative of a fully used condition of said film, said indicating means having a first surface and a second surface which may be exposed in predetermined fashion in order to inhibit and permit loading of the film magazine into a camera, first exposing means for exposing said first surface when said indicating means is at said third position and exposing said second surface when said indicating means is at said first position and when said indicating means is at said second position, and second exposing means for exposing said first surface when said indicating means is at said second position and exposing said second surface when said indicating means is at said first position and when said indicating means is at said third position; and a camera having a magazine chamber for loading said film magazine therein, first inhibiting means arranged at a position corresponding to said first exposing means and second inhibiting means arranged at a position corresponding to said second exposing means, said first inhibiting means inhibiting said magazine chamber from loading said film magazine by cooperation with said first surface when said indicating means is at said third position, said second inhibiting means inhibiting said magazine chamber from loading said film magazine by cooperation with said first surface when said indicating means is at said second position.

24. A film magazine, comprising:

a spool capable of being rotated to wind and feed a film; and indicating means which is fixed to said spool and rotatable by said spool among a first position indicative of an unused condition of said film, a second position indicative of a partially used condition of said film and a third position indicative of a fully used condition of said film, said indicating means having a first surface and a second surface which may be exposed in predetermined fashion in order to inhibit and permit loading of the film magazine into a camera;

first exposing means for exposing said first surface when said indicating means is at said third position and exposing said second surface when said indicating means is at said first position and when said indicating means is at said second position; and second exposing means for exposing said first surface when said indicating means is at said second position and when said indicating means is at said third position and exposing said second surface when said indicating means is at said first position.

25. A camera system comprising:

a film magazine including a spool capable of being rotated to wind and feed a film, indicating means which is fixed to said spool and rotatable by said spool among a first position indicative of an unused condition of said film, a second position indicative of a partially used condition of said film and a third position indicative of a fully used condition of said film, said indicating means having a first surface and a second surface which may be exposed in predetermined fashion in order to inhibit and permit loading of the film magazine into a camera, first exposing means for exposing said first surface when said indicating means is at said third position and exposing said second surface when said indicating means is at said first position and when said indicating means is at said second position, and second exposing means for exposing said first surface when said indicating means is at said second position and when said indicating means is at said third position and exposing said second surface when said indicating means is at said first position; and a camera having a magazine chamber for loading said film magazine therein and means for permitting said magazine chamber to load said film magazine by cooperation with said second surface when said indicating means is at said first position and when said indicating means is at said second position, and for inhibiting said magazine chamber from loading said film magazine by cooperation with said first surface when said indicating means is at said third position.

26. A camera system comprising:

a film magazine including a spool capable of being rotated to wind and feed a film, indicating means which is fixed to said spool and rotatable by said spool among a first position indicative of an unused condition of said film, a second position indicative of a partially used condition of said film and a third position indicative of a fully used condition of said film, said indicating means having a first surface and a second surface which may be exposed in predetermined fashion in order to inhibit and permit loading of the film magazine into a camera, first exposing means for exposing said first surface when said indicating means is at said third position and exposing said second surface when said indicating means is at said first position and when said indicating means is at said second position, and second exposing means for exposing said first surface when said indicating means is at said second position and when said indicating means is at said third position and exposing said second surface when said indicating means is at said first position; and a camera having a magazine chamber for loading said film magazine therein and means for permitting said magazine chamber to load said film magazine by cooperation with said second surface when said indicating means is at said first position, and inhibiting said magazine chamber from loading said film magazine by cooperation with said first surface when said indicating means is at said second position and when said indicating means is at said third position.

27. A film magazine comprising:

a spool capable of being rotated to wind and feed a film;

indicating means which is fixed to said spool and rotatable by said spool among a first position indicative of an unused condition of said film, a second position indicative of a partially used condition of said film and a third position indicative of a fully used condition of said film, said indicating means having a first surface, a second surface and a third surface which may be exposed; and means for exposing said first surface when said indicating means is at said first position, exposing said second surface when said indicating means is at said second position and exposing said third surface when said indicating means is at said third position.

28. A film magazine comprising:

a spool capable of being rotated about an axis thereof to wind and feed a film;

a gear-like part rotatable with said spool about said axis and having a plurality of circumferentially spaced engagement portions corresponding to different use states of said film; and a limiting device having a first state in which said limiting device is cooperable, selectively, with engagement portions of said gear-like part corresponding to each said use state of said film for preventing rotation of said spool outside predetermined limits corresponding to that use state, and a second state for allowing unrestricted rotation of said spool.

29. A film magazine according to claim 28, wherein said gear-like part rotates integrally with said spool when said limiting device is in said second state.

30. A film magazine according to claim 28, wherein said limiting device includes a lock part cooperable with the engagement portions of said gear-like part, and a dimension of said lock part in a circumferential direction of said gear-like part is substantially less than a spacing between adjacent engagement portions of said gear-like part in said circumferential direction.

31. A camera capable of loading a film magazine which has a spool capable of being rotated to wind and feed a film and indicating means, comprising:

a magazine chamber for loading said film magazine, said film magazine including limiting means having a first condition for limiting the rotation of said spool and a second condition for allowing unrestricted rotation of said spool; and means for shifting said limiting means from said first condition to said second condition when said film magazine is loaded in said magazine chamber and for shifting said limiting means from said second condition to said first condition when said film magazine is removed from said magazine chamber.

32. A film magazine comprising:

a spool capable of being rotated to wind and feed a film;

moving means for moving between a first position indicating that said film is unused and a second position indicating that said film has been used;

clutch means for causing said spool to rotate integrally with said moving means when said moving means is at said first position, and for causing said spool to rotate independently of said moving means when said moving means is at said second position; and holding means for holding said moving means at said second position.

33. A film magazine according to claim 32, which further comprises limiting means having a first condition for limiting the movement of said moving means from said first position to said second position and a second condition for not limiting the movement of said moving means.

34. A camera system comprising:

a film magazine having a spool capable of being rotated to wind and feed a film, moving means for moving between a first position indicating that said film is unused and a second position indicating that said film has been used, clutch means for causing said spool to rotate integrally with said moving means when said moving means is at said first position, and causing said spool to rotate independently of said moving means when said moving means is at said second position, and holding means for holding said moving means at said second position; and a camera having a magazine chamber for loading said film magazine therein, and means for permitting said magazine chamber to load said film magazine when said moving means is at said first position, and for inhibiting said magazine chamber from loading said film magazine by cooperation with said moving means when said moving means is at said second position.

35. A camera system according to claim 34, wherein said film magazine comprises limiting means having a first condition for limiting the movement of said moving means from said first position to said second position and a second condition for not limiting the movement of said moving means, and wherein said camera comprises means responsive to the loading of said film magazine for switching said limiting means from said first condition to said second condition.

36. A film magazine comprising:

a spool capable of being rotated to wind and feed a film;

moving means for moving from a first position indicating that said film is unused to a second position indicating that said film has been used;

pressing means for pressing said moving means to move said moving means from said first position to said second position;

stopping means capable of moving between a stopping position for stopping said moving means at said first position and a releasing position for not stopping said moving means; and releasing means responsive to the rotation of said spool for moving said stopping means from said stopping position to said releasing position.

37. A camera system comprising:

a film magazine comprising a spool capable of being rotated to wind and feed a film, moving means for moving from a first position indicating that said film is unused to a second position indicating that said film has been used, pressing means for pressing said moving means to move said moving means from said first position to said second position, stopping means capable of moving between a stopping position for stopping said moving means at said first position and a releasing position for not stopping said moving means, and releasing means responsive to the rotation of said spool for moving said stopping means from said stopping position to said releasing position; and a camera comprising a magazine chamber for loading said film magazine therein, and means for permitting said magazine chamber to load said film magazine when said moving means is at said first position, and for inhibiting said magazine chamber from loading said film magazine when said moving means is at said second position.

38. A film magazine comprising:

a spool capable of being rotated to wind and feed a film;

indicating means for being moved from a first position indicative of an unused condition of said film to a second position indicative of a used condition of said film by the rotation of said spool;

moving means responsive to movement of said spool in a film winding direction for moving said indicating means from said first position to said second position; and holding means for holding said indicating means at said first position and for holding said indicating means at said second position.

39. A camera system comprising:

a film magazine including a spool capable of being rotated to wind and feed a film, indicating means which is fixed to said spool and rotatable by said spool among a first position indicative of an unused condition of said film, a second position indicative of a partially used condition of said film, and a third position indicative of a fully used condition of said film, said indicating means having a first surface, a second surface with a blocking portion and a non-blocking portion, and a third surface, and exposing means for exposing said first surface when said indicating means is at said first position, exposing said second surface when said indicating means is at said second position, and exposing said third surface when said indicating means is at said third position; and a camera having a magazine chamber for loading said film magazine therein and means for permitting said magazine chamber to load said film magazine by cooperation with said first surface when said indicating means is at said first position and by cooperation with said non-blocking portion of said second surface when said indicating means is at said second position, and inhibiting said magazine chamber from loading said film magazine by cooperation with said third surface when said indicating means is at said third position.

40. A camera system comprising:

a film magazine including a spool capable of being rotated to wind and feed a film, indicating means which is fixed to said spool and rotatable by said spool among a first position indicative of an unused condition of said film, a second position indicative of a partially used condition of said film, and a third position indicative of a fully used condition of said film, said indicating means having a first surface, a second surface with a blocking portion and a non-blocking portion, and a third surface, and exposing means for exposing said first surface when said indicating means is at said first position, exposing said second surface when said indicating means is at said second position, and exposing said third surface when said indicating means is at said third position; and a camera having a magazine chamber for loading said film magazine therein and means for permitting said magazine chamber to load said film by cooperation with said first surface when said indicating means is at said first position, and inhibiting said magazine chamber from loading said film magazine by cooperation with said blocking portion of said second surface when said indicating means is at said second position and by cooperation with said third surface when said indicating means is at said third position.

41. A camera system comprising:

a film magazine including a spool capable of being rotated about an axis thereof to wind and feed a film, a gear-like part rotatable with said spool about said axis and having a plurality of circumferentially spaced engagement portions corresponding to different use states of said film, and limiting device having a first state in which said limiting device is cooperable, selectively, with engagement portions of said gear-like part corresponding to each said use state of said film for preventing rotation of said spool outside predetermined limits corresponding to that use state, and a second state for allowing unrestricted rotation of said spool; and a camera including a magazine chamber for loading said film magazine, and device for changing said limiting device from said first state to said second state when said film magazine is loaded in said magazine chamber and for changing said limiting device from said second state to said first state when said film magazine is removed from said magazine chamber.

42. A camera which can accommodate a film magazine having a moving member which can freely move from a first position to a second position, comprising:

a drive unit which moves said moving member from said first position to said second position when film is exposed; and an inhibition device which inhibits loading of said film magazine when the moving member of the film magazine has moved to the second position;

said drive unit including a photosensor which detects whether said moving member is at the first position or second position.

43. A film magazine for a film loading device, comprising:

a spool around which film is wound;

a displacement member displaceable from a first position indicating that the film is unused to a second position indicating that the film is used according to the rotation of said spool;

a clutch member which enables said displacement member to assume a fitted position at which the rotation of said spool is transmitted to said displacement member or an unfitted position at which the rotation of said spool is not transmitted to said displacement member; and a holding member to hold said displacement member at the first or second position when said film magazine is unattached to a film loading device; and wherein said displacement member includes a plate member which is provided in a lower part of said spool, and is displaceable in an axial line direction of said spool and rotatable around said axial line, said plate member engaging and rotating unitedly with said spool when positioned at an upper position, and disengaging from and not rotating with said spool when moved downward; and said clutch member includes a wavy spring to press said plate member downward;

a release member is included to release the hold of said holding member when said displacement member and said spool rotate unitedly.

44. A film magazine for a film loading device, comprising:

a spool around which film is wound;

a displacement member displaceable from a first position indicating that the film is unused to a second position indicating that the film is used according to the rotation of said spool;

a clutch member to enable said displacement member to assume a fitted position at which the rotation of said spool is transmitted to said displacement member or an unfitted position at which the rotation of said spool is not transmitted to said displacement member; and a holding member to hold said displacement member at the first or second position when said film magazine is unattached to a film loading device; and wherein said displacement member includes a plate member which is provided in a lower part of said spool, and is displaceable along an axial line direction of said spool and rotatable around said axial line, said plate member engaging and rotating unitedly with said spool when positioned at an upper position, and disengaging from and not rotating with said spool when moved downward;

said clutch member includes a wavy spring to press said plate member downward; and the hold of said holding member is released by a release member of a film loading device which accommodates said film magazine when said film magazine is loaded therein.

45. A film loading system comprising:

a film magazine containing a film and having first, second and third states according to the status of use of said film;

a first loading device capable of being loaded with said magazine when it is in said first and second states, said first loading device including an inhibition device which inhibits the loading of said magazine when it is in said third state; and a second loading device capable of being loaded with said magazine when it is in said first state, said second loading device including an inhibition device which inhibits the loading of said magazine when it is in said second and third states.

46. A film loading system according to claim 45, wherein said first state indicates that all the phototaking areas of the film in said magazine are unexposed, said second state indicates that the phototaking areas of the film in said magazine are partly exposed, and said third state indicates that all the phototaking areas of the film in said magazine are exposed.

47. A film loading system according to claim 46, wherein said magazine comprises a rotary member capable of rotation for rewinding the film into said magazine, and each of said loading devices comprises a respective drive unit which rotates said rotary member and a controller to control said drive unit, and wherein each said controller controls the corresponding said drive unit, after causing that drive unit to rewind the film into said magazine, in such a manner that said rotary member stops at one of three rotational positions according to the state of use of the film, and the three different stop positions of said rotary member respectively correspond to said first, second and third states.

48. A film loading system according to claim 45, wherein said first loading device comprises a first housing to be loaded with said magazine and said second loading device comprises a second housing to be loaded with said magazine;

said inhibition device of the first loading device comprises a first protrusion member capable of protruding by a predetermined length from an internal surface of said first housing, and said inhibition device of the second loading device comprises a second protruding member capable of protruding by a length larger than said predetermined length from an internal surface of said second housing, said first and second protruding members being provided in mutually corresponding positions in said first and second housings;

said magazine comprises a space forming member to form a space capable of accommodating said second protruding member in said first state, a space capable of accommodating said first protruding member but incapable of accommodating said second protruding member in said second state, and a space incapable of accommodating said first and second protruding members in said third state; and the space formed by said space forming member corresponds in position to Said first and second protruding members.

49. A film loading system according to claim 48, wherein said magazine comprises a rotary member capable of rotation for rewinding the film into said magazine, and said space forming member is so constructed as to rotate integrally with said rotary member.

50. A film loading system according to claim 45, wherein said first loading device comprises a first housing to be loaded with said magazine and said second loading device comprises a second housing to be loaded with said magazine;

said inhibition device of the first loading device comprises a first protrusion member capable of protruding from an internal surface of said first housing, and said inhibition device of the second loading device comprises a second protrusion member capable of protruding from an internal surface of said second housing, said first and second protrusion members being provided in different positions of said first and second housings;

said magazine comprises a first space forming member to form a space capable of accommodating said first protrusion member in said first and second states but incapable of accommodating said first protrusion member in said third state, and a second space forming member to form a space capable of accommodating said second protrusion member in said first state but incapable of accommodating said second protrusion member in said second and third states; and the space formed by said first space forming member corresponds in position to said first protrusion member while that formed by said second space forming member corresponds in position to said second protrusion member.

51. A film magazine comprising:

a spool capable of being rotated to wind and feed a film; and an indicator which is fixed to said spool, said indicator being rotatably movable, by rotation of said spool, between a first rotational position indicative of an unused condition of the film and a second rotational position indicative of a used condition of the film.

52. A film magazine according to claim 51, which further comprises a limiting device having a first condition for limiting movement of said indicator in said first position and in said second position and a second condition for allowing unrestricted movement of said indicator.

53. A film loading device capable of loading a film magazine which has a spool capable of being rotated to wind and feed a film and an indicator, comprising:

a magazine chamber to load said film magazine therein;

a drive unit to rotate said spool of the loaded film magazine so that said indicator is rotated integrally with said spool;

a discriminating device to discriminate a use status of said film; and a controller responsive to said discriminating device to control said drive unit, said controller causing said drive unit to arrange said indicator at a first position indicative of an unused condition of said film when said discriminating device discriminates that said film is unused, said controller causing said drive unit to arrange said indicator at a second position indicative of a used condition of said film when said discriminating device discriminates that said film is used.

54. A film loading device according to claim 53, wherein said film magazine comprises a limiting device having a first condition to limit movement of said indicator in said first position and in said second position and a second condition to allow unrestricted movement of said indicator, and wherein said loading device comprises a shift member to shift said limiting device from said first condition to said second condition when said film magazine is loaded in said magazine chamber and to shift said limiting device from said second condition to said first condition when said film magazine is removed from said magazine chamber.

55. A film loading device capable of loading a film magazine which has a spool capable of being rotated to wind and feed a film and an indicator, comprising:

a magazine chamber which loads said film magazine therein, said indicator being fixed to said spool and movable, by rotation of said spool, between a first position indicative of an unused condition of said film and a second position indicative of a used condition of said film; and a load permitting/inhibiting device which permits said magazine chamber to load said film magazine when said indicator is at said first position, and which inhibits said magazine chamber from loading said film magazine when said indicator is at said second position.

56. A film magazine comprising:

a spool capable of being rotated to wind and feed a film; and an indicator which is fixed to said spool and rotatable by said spool, said indicator having a first position indicative of an unused condition of said film, a second position indicative of partially used condition of said film and a third position indicative of a fully used condition of said film.

57. A film magazine according to claim 56, which further comprises a limiting device having a first condition to limit rotation of said indicator and a second condition to allow unrestricted rotation of said indicator.

58. A film loading device capable of loading a film magazine which has a spool capable of being rotated to wind and feed a film and an indicator, comprising:

a magazine chamber to load said film magazine therein;

a drive unit to rotate said spool of the loaded film magazine so that said indicator is rotated integrally with said spool;

a discriminating device to discriminate a use status of said film; and a controller responsive to said discriminating device to control said drive unit, said controller causing said drive unit to arrange said indicator at a first position indicative of a unused condition of said film when said discriminating device discriminates that said film is unused, at a second position indicative of a partially used condition of said film when said discriminating device discriminates that said film is partially used, and at a third position indicative of a fully used condition of said film when said discriminating device discriminates that said film is fully used.

59. A film loading device according to claim 58, wherein said film magazine comprises a limiting device having a first condition to limit rotation of said indicator and a second condition to allow unrestricted rotation of said indicator, said loading device further comprising a shifting device to shift said limiting device from said first condition to said second condition when said film magazine is loaded in said magazine chamber and to shift said limiting device from said second condition to said first condition when said film magazine is removed from said magazine chamber.

60. A film loading device capable of loading a film magazine which has a spool capable of being rotated to wind and feed a film and an indicator, comprising:

a magazine chamber to load said film magazine therein, said indicator being fixed to said spool and rotatable by said spool and having a first position indicative of an unused condition of said film, a second position indicative of a partially used condition of said film and a third position indicative of a fully used condition of said film; and a load permitting/inhibiting member to permit said magazine chamber to load said film magazine when said indicator is at said first position and when said indicator is at said second position, and to inhibit said magazine chamber from loading said film magazine when said indicator is at said third position.

61. A film loading device capable of loading a film magazine which has a spool capable of being rotated to wind and feed a film and an indicator, comprising:

a magazine chamber to load said film magazine therein, said indicator being fixed to said spool and rotatable by said spool and having a first position indicative of an unused condition of said film, a second position indicative of a partially used condition of said film and a third position indicative of a fully used condition of said film; and a load permitting/inhibiting member to permit said magazine chamber to load said film magazine when said indicator is at said first position, and to inhibit said magazine chamber from loading said film magazine when said indicator is at said second position and when said indicator is at said third position.

62. A film magazine comprising:

a spool capable of being rotated to wind and feed a film; and an indicator which is fixed to said spool and rotatable by said spool among a first position indicative of an unused condition of said film, a second position indicative of a partially used condition of said film and a third position indicative of a fully used condition of said film, said indicator having a first surface and a second surface which may be exposed in predetermined fashion in order to inhibit and permit loading of the film magazine into a film loading device;

a first exposing device to expose said first surface when said indicator is at said third position and to expose said second surface when said indicator is at said first position and when said indicator is at said second position; and a second exposing device to expose said first surface when said indicator is at said second position and to expose said second surface when said indicator is at said first position and when said indicator is at said third position.

63. A film loading system comprising:

a film magazine including a spool capable of being rotated to wind and feed a film, an indicator which is fixed to said spool and rotatable by said spool among a first position indicative of an unused condition of said film, a second position indicative of a partially used condition of said film and a third position indicative of a fully used condition of said film, said indicator having a first surface and a second surface which may be exposed in predetermined fashion in order to inhibit and permit loading of the film magazine into a film loading device, a first exposing device to expose said first surface when said indicator is at said third position and to expose said second surface when said indicator is at said first position and when said indicator is at said second position, and a second exposing device to expose said first surface when said indicator is at said second position and to expose said second surface when said indicator is at said first position and when said indicator is at said third position; and a film loading device having a magazine chamber to load said film magazine therein and a load permitting/inhibiting member to permit said magazine chamber to load said film magazine by cooperation with said second surface when said indicator is at said first position and when said indicator is at said second position, and to inhibit said magazine chamber from loading said film magazine by cooperation with said first surface when said indicator is at said third position.

64. A film loading system comprising:

a film magazine including a spool capable of being rotated to wind and feed a film, an indicator which is fixed to said spool and rotatable by said spool among a first position indicative of an unused condition of said film, a second position indicative of a partially used condition of said film and a third position indicative of a fully used condition of said film, said indicator having a first surface and a second surface which may be exposed in predetermined fashion in order to inhibit and permit loading of the film magazine into a film loading device, a first exposing device to expose said first surface when said indicator is at said third position and to expose said second surface when said indicator is at said first position and when said indicator is at said second position, and a second exposing device to expose said first surface when said indicator is at said second position and to expose said second surface when said indicator is at said first position and when said indicator is at said third position; and a film loading device having a magazine chamber to load said film magazine therein, a first inhibiting member arranged at a position corresponding to said first exposing device and a second inhibiting member arranged at a position corresponding to said second exposing device, said first inhibiting member inhibiting said magazine chamber from loading said film magazine by cooperation with said first surface when said indicator is at said third position, said second inhibiting member inhibiting said magazine chamber from loading said film magazine by cooperation with said first surface when said indicator is at said second position.

65. A film magazine, comprising:

a spool capable of being rotated to wind and feed a film; and an indicator which is fixed to said spool and rotatable by said spool among a first position indicative of an unused condition of said film, a second position indicative of a partially used condition of said film and a third position indicative of a fully used condition of said film, said indicator having a first surface and a second surface which may be exposed in predetermined fashion in order to inhibit and permit loading of the film magazine into a film loading device;

a first exposing device to expose said first surface when said indicator is at said third position and to expose said second surface when said indicator is at said first position and when said indicator is at said second position; and a second exposing device to expose said first surface when said indicator is at said second position and when said indicator is at said third position and to expose said second surface when said indicator is at said first position.

66. A film loading system comprising:

a film magazine including a spool capable of being rotated to wind and feed a film, an indicator which is fixed to said spool and rotatable by said spool among a first position indicative of an unused condition of said film, a second position indicative of a partially used condition of said film and a third position indicative of a fully used condition of said film, said indicator having a first surface and a second surface which may be exposed in predetermined fashion in order to inhibit and permit loading of the film magazine into a film loading device, a first exposing device to expose said first surface when said indicator is at said third position and to expose said second surface when said indicator is at said first position, and when said indicator is at said second position, and a second exposing device to expose said first surface when said indicator is at said second position and when said indicator is at said third position and to expose said second surface when said indicator is at said first position; and a film loading device having a magazine chamber to load said film magazine therein and a load permitting/inhibiting member to permit said magazine chamber to load said film magazine by cooperation with said second surface when said indicator is at said first position and when said indicator is at said second position, and to inhibit said magazine chamber from loading said film magazine by cooperation with said first surface when said indicator is at said third position.

67. A film loading system comprising:

a film magazine including a spool capable of being rotated to wind and feed a film, an indicator which is fixed to said spool and rotatable by said spool among a first position indicative of an unused condition of said film, a second position indicative of a partially used condition of said film and a third position indicative of a fully used condition of said film, said indicator having a first surface and a second surface which may be exposed in predetermined fashion in order to inhibit and permit loading of the film magazine into a film loading device, a first exposing device to expose said first surface when said indicator is at said third position and to expose said second surface when said indicator is at said first position and when said indicator is at said second position, and a second exposing device to,expose said first surface when said indicator is at said second position and when said indicator is at said third position and to expose said second surface when said indicator is at said first position; and a film loading device having a magazine chamber to load said film magazine therein and a load permitting/inhibiting member to permit said magazine chamber to load said film magazine by cooperation with said second surface when said indicator is at said first position, and to inhibit said magazine chamber from loading said film magazine by cooperation with said first surface when said indicator is at said third position.

68. A film magazine comprising:

a spool capable of being rotated to wind and feed a film;

an indicator which is fixed to said spool and rotatable by said spool among a first position indicative of an unused condition of said film, a second position indicative of a partially used condition of said film and a third position indicative of a fully used condition of said film, said indicator having a first surface, a second surface and a third surface which may be exposed; and an exposing device to expose said first surface when said indicator is at said first position, to expose said second surface when said indicator is at said second position and to expose said third surface when said indicator is at said third position.

69. A film loading device capable of loading a film magazine which has a spool capable of being rotated to wind and feed a film and an indicator, comprising:

a magazine chamber to load said film magazine, said film magazine including a limiting device having a first condition for limiting the rotation of said spool and a second condition for allowing unrestricted rotation of said spool; and a shifting member to shift said limiting device from said first condition to said second condition when said film magazine is loaded in said magazine chamber and to shift said limiting device from said second condition to said first condition when said film magazine is removed from said magazine chamber.

70. A film magazine comprising:

a spool capable of being rotated to wind and feed a film;

a moving member to move between a first position indicating that said film is unused and a second position indicating that said film has been used;

a clutch member to enable said spool to rotate integrally with said moving member when said moving member is at said first position, and to enable said spool to rotate independently of said moving member when said moving member is at said second position; and a holding member to hold said moving member at said second position.

71. A film magazine according to claim 70, which further comprises a limiting device having a first condition for limiting the movement of said moving member from said first position to said second position and a second condition for not limiting the movement of said moving member.

72. A film loading system comprising:

a film magazine having a spool capable of being rotated to wind and feed a film, a moving member to move between a first position indicating that said film is unused and a second position indicating that said film has been used, a clutch member to enable said spool to rotate integrally with said moving member when said moving member is at said first position, and to enable said spool to rotate independently of said moving member when said moving member is at said second position, and a holding member to hold said moving member at said second position; and a film loading device having a magazine chamber to load said film magazine therein, and a load permitting/inhibiting member to permit said magazine chamber to load said film magazine when said moving member is at said first position, and to inhibit said magazine chamber from loading said film magazine by cooperation with said moving member when said moving member is at said second position.

73. A film loading system according to claim 72, wherein said film magazine comprises a limiting device having a first condition to limit the movement of said moving member from said first position to said second position and a second condition not to limit the movement of said moving member, and wherein said film loading device comprises a member responsive to the loading of said film magazine to switch said limiting device from said first condition to said second condition.

74. A film magazine comprising:

a spool capable of being rotated to wind and feed a film;

a moving member to move from a first position indicating that said film is unused to a second position indicating that said film has been used;

a pressing member to press said moving member to move said moving member from said first position to said second position;

a stopping member capable of moving between a stopping position for stopping said moving member at said first position and a releasing position for not stopping said moving member; and a releasing member responsive to the rotation of said spool to move said stopping member from said stopping position to said releasing position.

75. A film loading system comprising:

a film magazine including a spool capable of being rotated to wind and feed a film, a moving member to move from a first position indicating that said film is unused to a second position indicating that said film has been used, a pressing member to press said moving member to move said moving member from said first position to said second position, a stopping member capable of moving between a stopping position to stop said moving member at said first position and a releasing position not to stop said moving member, and a releasing member responsive to the rotation of said spool to move said stopping member from said stopping position to said releasing position; and a film loading device having a magazine chamber to load said film magazine therein and a load permitting/ inhibiting member to permit said magazine chamber to load said film magazine when said moving member is at said first position, and to inhibit said magazine chamber from loading said film magazine when said moving member is at said second position.

76. A film magazine comprising:

a spool capable of being rotated to wind and feed a film;

an indicator to be moved from a first position indicative of an unused condition of said film to a second position indicative of a used condition of said film by the rotation or said spool;

a moving member responsive to movement of said spool in a film winding direction to move said indicator from said first position to said second position; and a holding member to hold said indicator at said first position and to hold said indicator at said second position.

77. A film loading system comprising:

a film magazine including a spool capable of being rotated to wind and feed a film, an indicator which is fixed to said spool and rotatable by said spool among a first position indicative of an unused condition of said film, a second position indicative of a partially used condition of said film, and a third position indicative of a fully used condition of said film, said indicator having a first surface, a second surface with a blocking portion and a non-blocking portion, and a third surface, and an exposing device to expose said first surface when said indicator is at said first position, to expose said second surface when said indicator is at said second position, and to expose said third surface when said indicator is at said third position; and a film loading device having a magazine chamber to load said film magazine therein and a load permitting/ inhibiting member to permit said magazine chamber to load said film magazine by cooperation with said first surface when said indicator is at said first position and by cooperation with said non-blocking portion of said second surface when said indicator is at said second position, and to inhibit said magazine chamber from loading said film magazine by cooperation with said third surface when said indicator is at said third position.

78. A film loading system comprising:

a film magazine including a spool capable of being rotated to wind and feed a film, an indicator which is fixed to said spool and rotatable by said spool among a first position indicative of an unused condition of said film, a second position indicative of a partially used condition of said film, and a third position indicative of a fully used condition of said film, said indicator having a first surface, a second surface with a blocking portion and a non-blocking portion, and a third surface, and an exposing device to expose said first surface when said indicator is at said first position, to expose said second surface when said indicator is at said second position, and to expose said third surface when said indicator is at said third position; and a film loading device having a magazine chamber to load said film magazine therein and a load permitting/ inhibiting member to permit said magazine chamber to load said film by cooperation with said first surface when said indicator is at said first position, and to inhibit said magazine chamber from loading said film magazine by cooperation with said blocking portion of said second surface when said indicator is at said second position and by cooperation with said third surface when said indicator is at said third position.

79. A film loading system comprising:

a film magazine including a spool capable of being rotated about an axis thereof to wind and feed a film, a gear-like part rotatable with said spool about said axis and having a plurality of circumferentially spaced engagement portions corresponding to different use states of said film, and a limiting device having a first state in which said limiting device is cooperable, selectively, with engagement portions of said gear-like part corresponding to each said use state of said film for preventing rotation of said spool outside predetermined limits corresponding to that use state, and a second state for allowing unrestricted rotation of said spool; and a film loading device including a magazine chamber to load said film magazine, and a member to change said limiting device from said first state to said second state when said film magazine is loaded in said magazine chamber and to change said limiting device from said second state to said first state when said film magazine is removed from said magazine chamber.

* * * * *